United States Patent
Kondiles et al.

(10) Patent No.: US 11,580,102 B2
(45) Date of Patent: Feb. 14, 2023

(54) IMPLEMENTING LINEAR ALGEBRA FUNCTIONS VIA DECENTRALIZED EXECUTION OF QUERY OPERATOR FLOWS

(71) Applicant: Ocient Holdings LLC, Chicago, IL (US)

(72) Inventors: George Kondiles, Chicago, IL (US); Jason Arnold, Chicago, IL (US); S. Christopher Gladwin, Chicago, IL (US); Joseph Jablonski, Chicago, IL (US); Daniel Coombs, Chicago, IL (US); Andrew D. Baptist, Mt. Pleasant, WI (US)

(73) Assignee: Ocient Holdings LLC, Chicago, IL (US)

( * ) Notice: Subject to any disclaimer, the term of this patent is extended or adjusted under 35 U.S.C. 154(b) by 38 days.

(21) Appl. No.: 16/838,459

(22) Filed: Apr. 2, 2020

(65) Prior Publication Data
US 2021/0311943 A1 Oct. 7, 2021

(51) Int. Cl.
*G06F 16/24* (2019.01)
*G06F 16/2453* (2019.01)
*G06F 16/2457* (2019.01)
*G06F 11/34* (2006.01)
(Continued)

(52) U.S. Cl.
CPC .... *G06F 16/24537* (2019.01); *G06F 11/3409* (2013.01); *G06F 16/2246* (2019.01); *G06F 16/2456* (2019.01); *G06F 16/24578* (2019.01)

(58) Field of Classification Search
CPC .......... G06F 16/24537; G06F 16/2246; G06F 16/2456; G06F 11/3409; G06F 16/24578; G06F 16/2455; G06F 16/24553
See application file for complete search history.

(56) References Cited

U.S. PATENT DOCUMENTS

| 5,548,770 A | 8/1996 | Bridges |
| 6,230,200 B1 | 5/2001 | Forecast et al. |
| 6,633,772 B2 | 10/2003 | Ford et al. |

(Continued)

OTHER PUBLICATIONS

A new high performance fabric for HPC, Michael Feldman, May 2016, Intersect360 Research.

(Continued)

*Primary Examiner* — Alicia M Willoughby
(74) *Attorney, Agent, or Firm* — Garlick & Markison; Katherine C. Stuckman; Bruce E. Stuckman

(57) ABSTRACT

A method for execution by a query processing system includes determining a query request that indicates a plurality of operators, where the plurality of operators includes at least one relational algebra operator and further includes at least one non-relational operator. A query operator execution flow is generated from the query request that indicates a serialized ordering of the plurality of operators. A query resultant of the query is generated by facilitating execution of the query via a set of nodes of a database system that each perform a plurality of operator executions in accordance with the query operator execution flow, where a subset of the set of nodes each execute at least one operator execution corresponding to the at least one non-relational operator in accordance with the execution of the query.

19 Claims, 48 Drawing Sheets

(51) Int. Cl.
*G06F 16/22* (2019.01)
*G06F 16/2455* (2019.01)

(56) References Cited

U.S. PATENT DOCUMENTS

| | | | |
|---|---|---|---|
| 7,499,907 | B2 | 3/2009 | Brown et al. |
| 7,908,242 | B1 | 3/2011 | Achanta |
| 9,384,244 | B1* | 7/2016 | Garg ................. G06F 16/90324 |
| 10,078,661 | B1* | 9/2018 | Roitman ........... G06F 16/24578 |
| 2001/0051949 | A1 | 12/2001 | Carey et al. |
| 2002/0032676 | A1 | 3/2002 | Reiner et al. |
| 2004/0162853 | A1 | 8/2004 | Brodersen et al. |
| 2008/0133456 | A1 | 6/2008 | Richards et al. |
| 2008/0228697 | A1* | 9/2008 | Adya ..................... G06F 16/212 |
| 2009/0063893 | A1 | 3/2009 | Bagepalli et al. |
| 2009/0183167 | A1 | 7/2009 | Kupferschmidt et al. |
| 2010/0082577 | A1 | 4/2010 | Mirchandani et al. |
| 2010/0241646 | A1 | 9/2010 | Friedman et al. |
| 2010/0274983 | A1 | 10/2010 | Murphy et al. |
| 2010/0312756 | A1 | 12/2010 | Zhang et al. |
| 2011/0219169 | A1 | 9/2011 | Zhang et al. |
| 2011/0258179 | A1* | 10/2011 | Weissman ......... G06F 16/24544 707/714 |
| 2012/0109888 | A1 | 5/2012 | Zhang et al. |
| 2012/0151118 | A1 | 6/2012 | Flynn et al. |
| 2012/0185866 | A1 | 7/2012 | Couvee et al. |
| 2012/0254252 | A1 | 10/2012 | Jin et al. |
| 2012/0311246 | A1 | 12/2012 | McWilliams et al. |
| 2013/0332484 | A1 | 12/2013 | Gajic |
| 2014/0047095 | A1 | 2/2014 | Breternitz et al. |
| 2014/0136510 | A1 | 5/2014 | Parkkinen et al. |
| 2014/0172914 | A1* | 6/2014 | Elnikety ............. G06F 16/9024 707/774 |
| 2014/0188841 | A1 | 7/2014 | Sun et al. |
| 2015/0205607 | A1 | 7/2015 | Lindholm |
| 2015/0234894 | A1* | 8/2015 | Dageville ........... H04L 67/1095 707/718 |
| 2015/0244804 | A1 | 8/2015 | Warfield et al. |
| 2015/0248366 | A1 | 9/2015 | Bergsten et al. |
| 2015/0293966 | A1 | 10/2015 | Cai et al. |
| 2015/0310045 | A1 | 10/2015 | Konik et al. |
| 2015/0347508 | A1* | 12/2015 | Lang ................. G06F 16/24542 707/718 |
| 2015/0363463 | A1* | 12/2015 | Mindnich ........... G06F 16/2453 707/718 |
| 2016/0034547 | A1 | 2/2016 | Lerios et al. |
| 2016/0140174 | A1* | 5/2016 | Weyerhaeuser .. G06F 16/24542 707/718 |
| 2016/0140175 | A1* | 5/2016 | Weyerhaeuser .. G06F 16/24542 707/718 |
| 2016/0350368 | A1* | 12/2016 | Weyerhaeuser .... G06F 16/2453 |
| 2017/0046391 | A1* | 2/2017 | Pestana ................... G06F 16/28 |
| 2017/0262502 | A1* | 9/2017 | Rastunkov ............. G06N 20/00 |
| 2017/0322988 | A1* | 11/2017 | Weyerhaeuser .. G06F 16/24554 |
| 2018/0357565 | A1* | 12/2018 | Syed ................. G06F 16/24578 |
| 2018/0373755 | A1* | 12/2018 | Welton ................ G06F 16/2453 |
| 2020/0065342 | A1* | 2/2020 | Panuganty .......... G06F 16/9535 |
| 2020/0065420 | A1* | 2/2020 | Scodary ................ G06F 40/205 |
| 2020/0134070 | A1* | 4/2020 | Sidoti ..................... G06F 16/23 |
| 2021/0303574 | A1* | 9/2021 | Brown .................... G06F 17/16 |

OTHER PUBLICATIONS

Alechina, N. (2006-2007). B-Trees School of Computer Science, University of Nottingham, http://www cs.nott.ac.uk/~psznza/G5BADS06/lecture13-print.pdf. 41 pages.

Amazon DynamoDB: ten things you really should know, Nov. 13, 2015, Chandan Patra, http://cloudacademy. . . com/blog/amazon-dynamodb-ten-thing.

An Inside Look at Google BigQuery, by Kazunori Sato, Solutions Architect, Cloud Solutions team, Google Inc., 2012.

Big Table, a NoSQL massively parallel table, Paul Krzyzanowski, Nov. 2011, https://www.cs.rutgers.edu/pxk/417/notes/contentlbigtable.html.

Distributed Systems, Fall2012, Mohsen Taheriyan, http://www-scf.usc.edu/-csci57212011Spring/presentations/Taheriyan.pptx.

International Searching Authority; International Search Report and Written Opinion; International Application No. PCT/US2017/054773; dated Feb. 13, 2018; 17 pgs.

International Searching Authority; International Search Report and Written Opinion; International Application No. PCT/US2017/054784; dated Dec. 28, 2017; 10 pgs.

International Searching Authority; International Search Report and Written Opinion; International Application No. PCT/US2017/066169; dated Mar. 6, 2018; 15 pgs.

International Searching Authority; International Search Report and Written Opinion; International Application No. PCT/US2017/066145; dated Mar. 5, 2018; 13 pgs.

International Searching Authority; International Search Report and Written Opinion; International Application No. PCT/US2018/025729; dated Jun. 27, 2018; 9 pgs.

International Searching Authority; International Search Report and Written Opinion; International Application No. PCT/US2018/034859; dated Oct. 30, 2018; 8 pgs.

MapReduce: Simplied Data Processing on Large Clusters, OSDI 2004, Jeffrey Dean and Sanjay Ghemawat, Google, Inc.

Rodero-Merino, L.; Storage of Structured Data: Big Table and HBase, New Trends in Distributed Systems, MSc Software and Systems, Distributed Systems Laboratory; Oct. 17, 2012; 24 pages.

Step 2: Examine the data model and implementation details, 2016, Amazon Web Services, Inc., http://docs.aws.amazon.com/amazondynamodb/latestldeveloperguideTi . . . .

\* cited by examiner database system 10 computing device 18 computing device 18 computing device 18 node 37 node 37 node 37 node 37

FIG. 20 query processing module 2510

2950

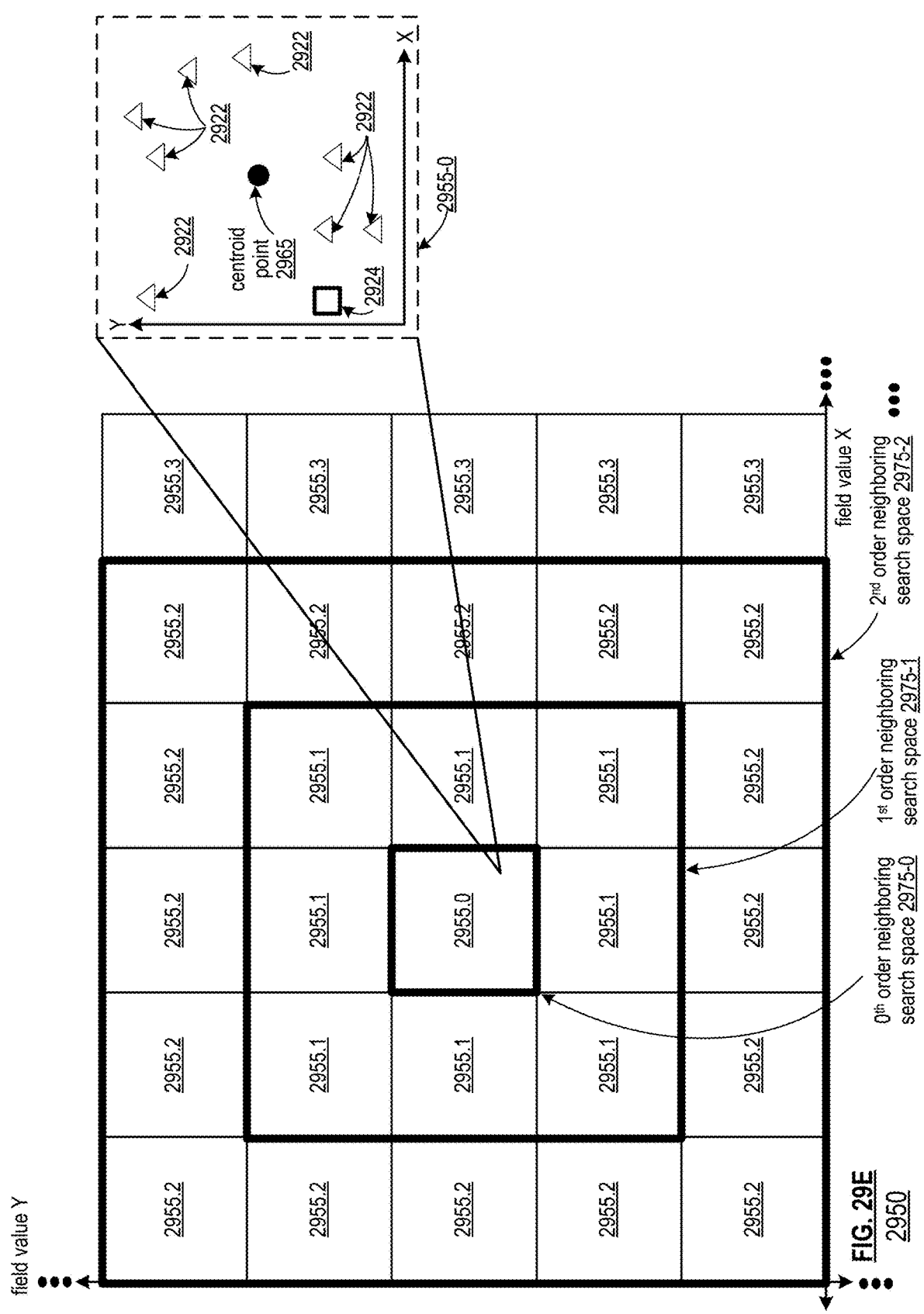

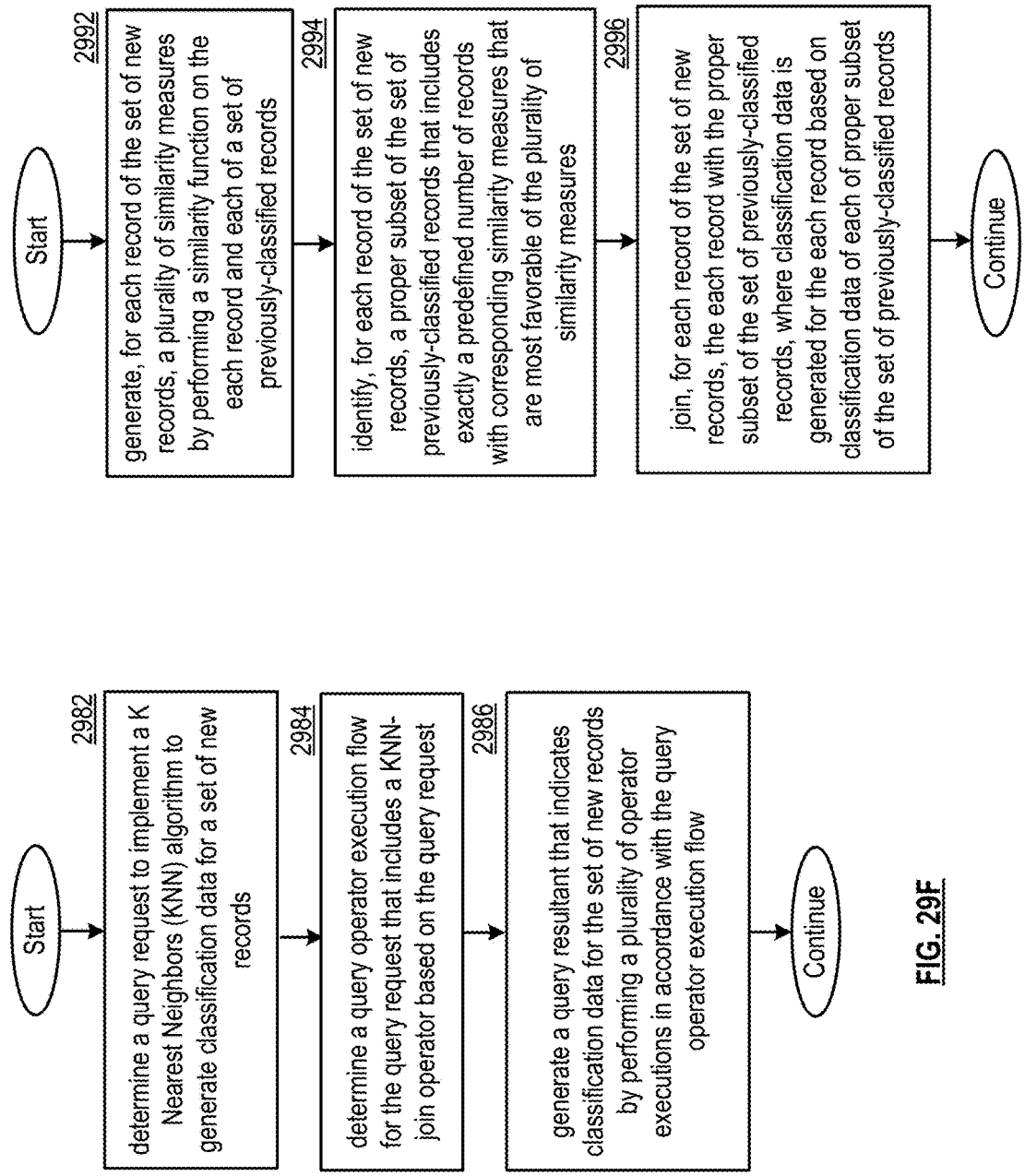

IMPLEMENTING LINEAR ALGEBRA FUNCTIONS VIA DECENTRALIZED EXECUTION OF QUERY OPERATOR FLOWS

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networking and more particularly to database system and operation.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function.

Of the many applications a computer can perform, a database system is one of the largest and most complex applications. In general, a database system stores a large amount of data in a particular way for subsequent processing. In some situations, the hardware of the computer is a limiting factor regarding the speed at which a database system can process a particular function. In some other instances, the way in which the data is stored is a limiting factor regarding the speed of execution. In yet some other instances, restricted co-process options are a limiting factor regarding the speed of execution.

BRIEF DESCRIPTION OF THE SEVERAL VIEWS OF THE DRAWING (S)

FIGS. 15-23 are schematic block diagrams of an example of processing a table or data set for storage in the database system in accordance with the present invention;

FIG. 29E is a schematic block diagram illustrating radial expansion of neighboring search spaces of pre-designated record groupings in the two-dimensional case in accordance with various embodiments of the present invention; and FIGS. 29F and 29G are logic diagrams illustrating a method of executing a query that includes a KNN join operator to classify new records in accordance with various embodiments of the present invention.

DETAILED DESCRIPTION OF THE INVENTION

Figure 1:
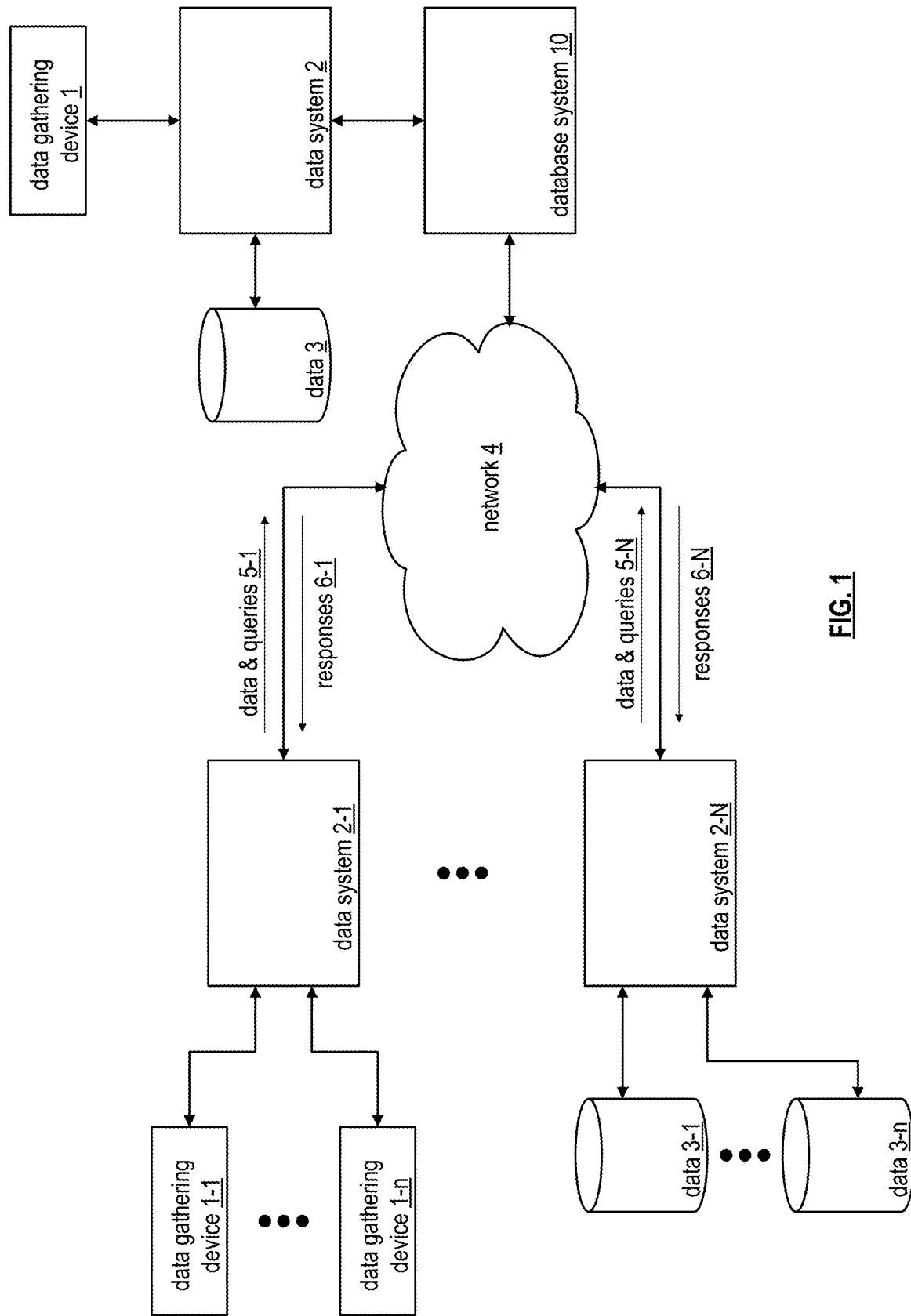
FIG. 1 is a schematic block diagram of an embodiment of a large scale data processing network that includes a database system in accordance with the present invention.

FIG. 1 is a schematic block diagram of an embodiment of a large-scale data processing network that includes data gathering devices (1, 1-1 through 1-n), data systems (2, 2-1 through 2-N), data storage systems (3, 3-1 through 3-n), a network 4, and a database system 10. The data gathering devices are computing devices that collect a wide variety of data and may further include sensors, monitors, measuring instruments, and/or other instrument for collecting data. The data gathering devices collect data in real-time (i.e., as it is happening) and provides it to data system 2-1 for storage and real-time processing of queries 5-1 to produce responses 6-1. As an example, the data gathering devices are computing in a factory collecting data regarding manufacturing of one or more products and the data system is evaluating queries to determine manufacturing efficiency, quality control, and/or product development status.

The data storage systems 3 store existing data. The existing data may originate from the data gathering devices or other sources, but the data is not real time data. For example, the data storage system stores financial data of a bank, a credit card company, or like financial institution. The data system 2-N processes queries 5-N regarding the data stored in the data storage systems to produce responses 6-N.

Data system 2 processes queries regarding real time data from data gathering devices and/or queries regarding non-real time data stored in the data storage system 3. The data system 2 produces responses in regard to the queries. Storage of real time and non-real time data, the processing of queries, and the generating of responses will be discussed with reference to one or more of the subsequent figures.

Figure 1A:
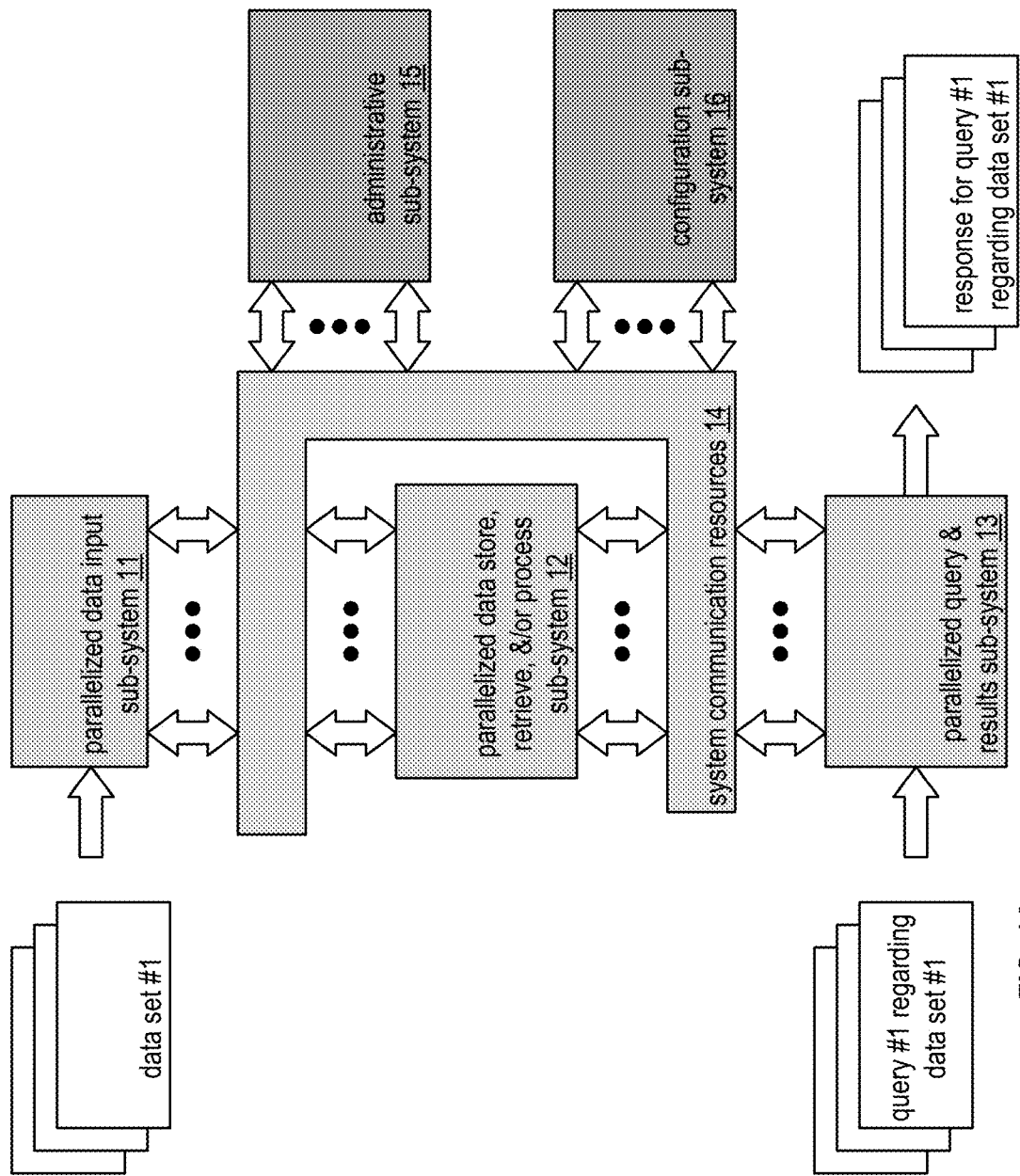
FIG. 1A is a schematic block diagram of an embodiment of a database system in accordance with the present invention.

FIG. 1A is a schematic block diagram of an embodiment of a database system 10 that includes a parallelized data input sub-system 11, a parallelized data store, retrieve, and/or process sub-system 12, a parallelized query and response sub-system 13, system communication resources 14, an administrative sub-system 15, and a configuration sub-system 16. The system communication resources 14 include one or more of wide area network (WAN) connections, local area network (LAN) connections, wireless connections, wireline connections, etc. to couple the sub-systems 11, 12, 13, 15, and 16 together.

Each of the sub-systems 11, 12, 13, 15, and 16 include a plurality of computing devices; an example of which is discussed with reference to one or more of FIGS. 7-9. Hereafter, the parallelized data input sub-system 11 may also be referred to as a data input sub-system, the parallelized data store, retrieve, and/or process sub-system may also be referred to as a data storage and processing sub-system, and the parallelized query and response sub-system 13 may also be referred to as a query and results sub-system.

In an example of operation, the parallelized data input sub-system 11 receives a data set (e.g., a table) that includes a plurality of records. A record includes a plurality of data fields. As a specific example, the data set includes tables of data from a data source. For example, a data source includes one or more computers. As another example, the data source is a plurality of machines. As yet another example, the data source is a plurality of data mining algorithms operating on one or more computers.

As is further discussed with reference to FIG. 15, the data source organizes its records of the data set into a table that includes rows and columns. The columns represent data fields of data for the rows. Each row corresponds to a record of data. For example, a table include payroll information for a company's employees. Each row is an employee's payroll record. The columns include data fields for employee name, address, department, annual salary, tax deduction information, direct deposit information, etc.

The parallelized data input sub-system 11 processes a table to determine how to store it. For example, the parallelized data input sub-system 11 divides the data set into a plurality of data partitions. For each partition, the parallelized data input sub-system 11 divides it into a plurality of data segments based on a segmenting factor. The segmenting factor includes a variety of approaches divide a partition into segments. For example, the segment factor indicates a number of records to include in a segment. As another example, the segmenting factor indicates a number of segments to include in a segment group. As another example, the segmenting factor identifies how to segment a data partition based on storage capabilities of the data store and processing sub-system. As a further example, the segmenting factor indicates how many segments for a data partition based on a redundancy storage encoding scheme.

As an example of dividing a data partition into segments based on a redundancy storage encoding scheme, assume that it includes a 4 of 5 encoding scheme (meaning any 4 of 5 encoded data elements can be used to recover the data). Based on these parameters, the parallelized data input sub-system 11 divides a data partition into 5 segments: one corresponding to each of the data elements).

The parallelized data input sub-system 11 restructures the plurality of data segments to produce restructured data segments. For example, the parallelized data input sub-system 11 restructures records of a first data segment of the plurality of data segments based on a key field of the plurality of data fields to produce a first restructured data segment. The key field is common to the plurality of records. As a specific example, the parallelized data input sub-system 11 restructures a first data segment by dividing the first data segment into a plurality of data slabs (e.g., columns of a segment of a partition of a table). Using one or more of the columns as a key, or keys, the parallelized data input sub-system 11 sorts the data slabs. The restructuring to produce the data slabs is discussed in greater detail with reference to FIG. 4 and FIGS. 16-18.

The parallelized data input sub-system 11 also generates storage instructions regarding how sub-system 12 is to store the restructured data segments for efficient processing of subsequently received queries regarding the stored data. For example, the storage instructions include one or more of: a naming scheme, a request to store, a memory resource requirement, a processing resource requirement, an expected access frequency level, an expected storage duration, a required maximum access latency time, and other requirements associated with storage, processing, and retrieval of data.

A designated computing device of the parallelized data store, retrieve, and/or process sub-system 12 receives the restructured data segments and the storage instructions. The designated computing device (which is randomly selected, selected in a round robin manner, or by default) interprets the storage instructions to identify resources (e.g., itself, its components, other computing devices, and/or components thereof) within the computing device's storage cluster. The designated computing device then divides the restructured data segments of a segment group of a partition of a table into segment divisions based on the identified resources and/or the storage instructions. The designated computing device then sends the segment divisions to the identified resources for storage and subsequent processing in accordance with a query. The operation of the parallelized data store, retrieve, and/or process sub-system 12 is discussed in greater detail with reference to FIG. 6.

The parallelized query and response sub-system 13 receives queries regarding tables (e.g., data sets) and processes the queries prior to sending them to the parallelized data store, retrieve, and/or process sub-system 12 for execution. For example, the parallelized query and response sub-system 13 generates an initial query plan based on a data processing request (e.g., a query) regarding a data set (e.g., the tables). Sub-system 13 optimizes the initial query plan based on one or more of the storage instructions, the engaged resources, and optimization functions to produce an optimized query plan.

For example, the parallelized query and response sub-system 13 receives a specific query no. 1 regarding the data set no. 1 (e.g., a specific table). The query is in a standard query format such as Open Database Connectivity (ODBC), Java Database Connectivity (JDBC), and/or SPARK. The query is assigned to a node within the parallelized query and response sub-system 13 for processing. The assigned node identifies the relevant table, determines where and how it is stored, and determines available nodes within the parallelized data store, retrieve, and/or process sub-system 12 for processing the query.

In addition, the assigned node parses the query to create an abstract syntax tree. As a specific example, the assigned node converts an SQL (Standard Query Language) statement into a database instruction set. The assigned node then validates the abstract syntax tree. If not valid, the assigned node generates a SQL exception, determines an appropriate correction, and repeats. When the abstract syntax tree is validated, the assigned node then creates an annotated abstract syntax tree. The annotated abstract syntax tree includes the verified abstract syntax tree plus annotations regarding column names, data type(s), data aggregation or not, correlation or not, sub-query or not, and so on.

The assigned node then creates an initial query plan from the annotated abstract syntax tree. The assigned node optimizes the initial query plan using a cost analysis function (e.g., processing time, processing resources, etc.) and/or other optimization functions. Having produced the optimized query plan, the parallelized query and response sub-system 13 sends the optimized query plan to the parallelized data store, retrieve, and/or process sub-system 12 for execution. The operation of the parallelized query and response sub-system 13 is discussed in greater detail with reference to FIG. 5.

The parallelized data store, retrieve, and/or process sub-system 12 executes the optimized query plan to produce resultants and sends the resultants to the parallelized query and response sub-system 13. Within the parallelized data store, retrieve, and/or process sub-system 12, a computing device is designated as a primary device for the query plan (e.g., optimized query plan) and receives it. The primary device processes the query plan to identify nodes within the parallelized data store, retrieve, and/or process sub-system 12 for processing the query plan. The primary device then sends appropriate portions of the query plan to the identified nodes for execution. The primary device receives responses from the identified nodes and processes them in accordance with the query plan.

The primary device of the parallelized data store, retrieve, and/or process sub-system 12 provides the resulting response (e.g., resultants) to the assigned node of the parallelized query and response sub-system 13. For example, the assigned node determines whether further processing is needed on the resulting response (e.g., joining, filtering, etc.). If not, the assigned node outputs the resulting response as the response to the query (e.g., a response for query no. 1 regarding data set no. 1). If, however, further processing is determined, the assigned node further processes the resulting response to produce the response to the query. Having received the resultants, the parallelized query and response sub-system 13 creates a response from the resultants for the data processing request.

Figure 2:
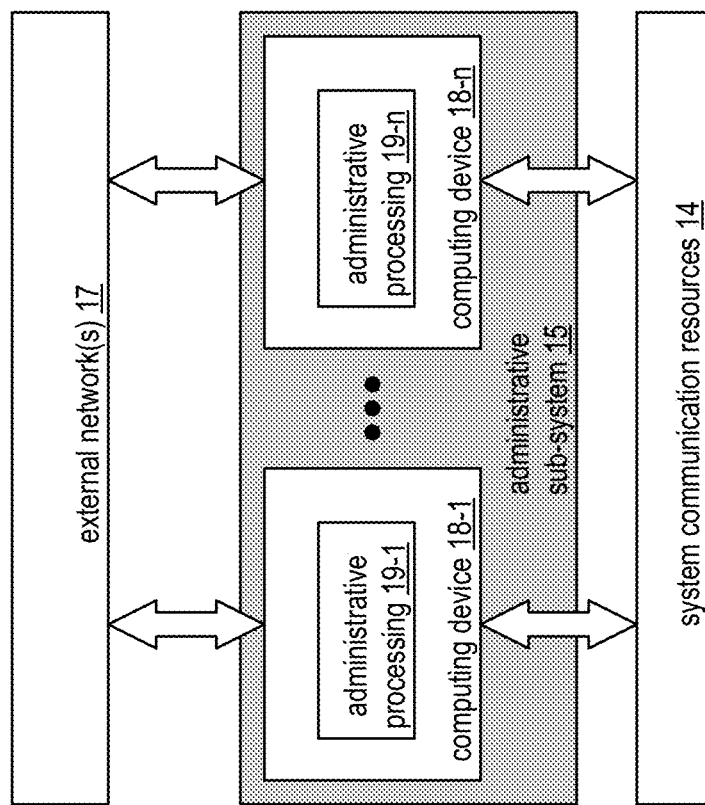
FIG. 2 is a schematic block diagram of an embodiment of an administrative sub-system in accordance with the present invention.

FIG. 2 is a schematic block diagram of an embodiment of the administrative sub-system 15 of FIG. 1A that includes one or more computing devices 18-1 through 18-n. Each of the computing devices executes an administrative processing function utilizing a corresponding administrative processing of administrative processing 19-1 through 19-n (which includes a plurality of administrative operations) that coordinates system level operations of the database system. Each computing device is coupled to an external network 17, or networks, and to the system communication resources 14 of FIG. 1A.

As will be described in greater detail with reference to one or more subsequent figures, a computing device includes a plurality of nodes and each node includes a plurality of processing core resources. Each processing core resource is capable of executing at least a portion of an administrative operation independently. This supports lock free and parallel execution of one or more administrative operations.

The administrative sub-system 15 functions to store metadata of the data set described with reference to FIG. 1A. For example, the storing includes generating the metadata to include one or more of an identifier of a stored table, the size of the stored table (e.g., bytes, number of columns, number of rows, etc.), labels for key fields of data segments, a data type indicator, the data owner, access permissions, available storage resources, storage resource specifications, software for operating the data processing, historical storage information, storage statistics, stored data access statistics (e.g., frequency, time of day, accessing entity identifiers, etc.) and any other information associated with optimizing operation of the database system 10.

Figure 3:
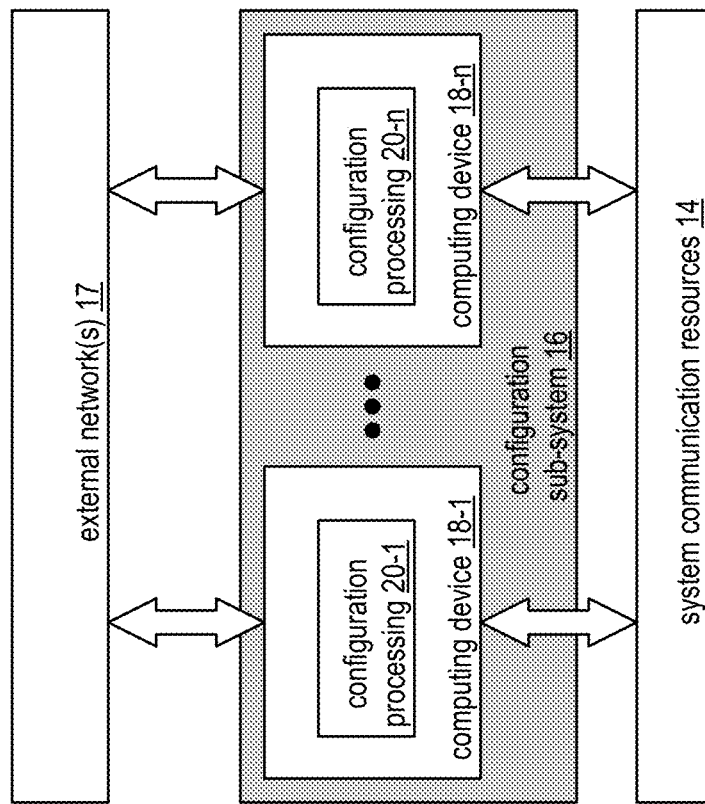
FIG. 3 is a schematic block diagram of an embodiment of a configuration sub-system in accordance with the present invention.

FIG. 3 is a schematic block diagram of an embodiment of the configuration sub-system 16 of FIG. 1A that includes one or more computing devices 18-1 through 18-n. Each of the computing devices executes a configuration processing function 20-1 through 20-n (which includes a plurality of configuration operations) that coordinates system level configurations of the database system. Each computing device is coupled to the external network 17 of FIG. 2, or networks, and to the system communication resources 14 of FIG. 1A.

Figure 4:
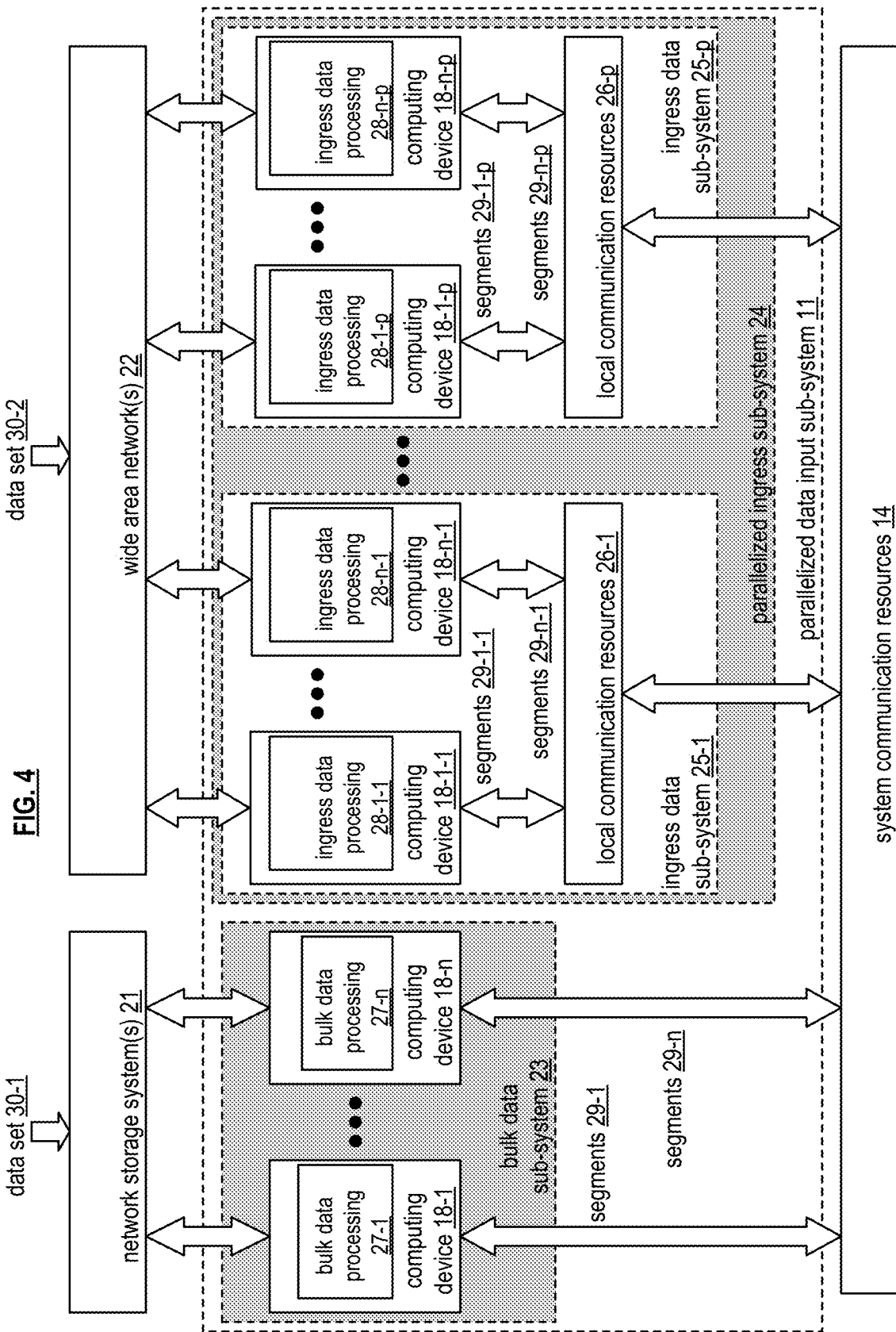
FIG. 4 is a schematic block diagram of an embodiment of a parallelized data input sub-system in accordance with the present invention.

FIG. 4 is a schematic block diagram of an embodiment of the parallelized data input sub-system 11 of FIG. 1A that includes a bulk data sub-system 23 and a parallelized ingress sub-system 24. The bulk data sub-system 23 includes a plurality of computing devices 18-1 through 18-n. A computing device includes a bulk data processing function (e.g., 27-1) for receiving a table from a network storage system 21 (e.g., a server, a cloud storage service, etc.) and processing it for storage as generally discussed with reference to FIG. 1A.

The parallelized ingress sub-system 24 includes a plurality of ingress data sub-systems 25-1 through 25-p that each include a local communication resource of local communication resources 26-1 through 26-p and a plurality of computing devices 18-1 through 18-n. A computing device executes an ingress data processing function (e.g., 28-1) to receive streaming data regarding a table via a wide area network 22 and processing it for storage as generally discussed with reference to FIG. 1A. With a plurality of ingress data sub-systems 25-1 through 25-p, data from a plurality of tables can be streamed into the database system 10 at one time.

In general, the bulk data processing function is geared towards receiving data of a table in a bulk fashion (e.g., the table exists and is being retrieved as a whole, or portion thereof). The ingress data processing function is geared towards receiving streaming data from one or more data sources (e.g., receive data of a table as the data is being generated). For example, the ingress data processing function is geared towards receiving data from a plurality of machines in a factory in a periodic or continual manner as the machines create the data.

Figure 5:
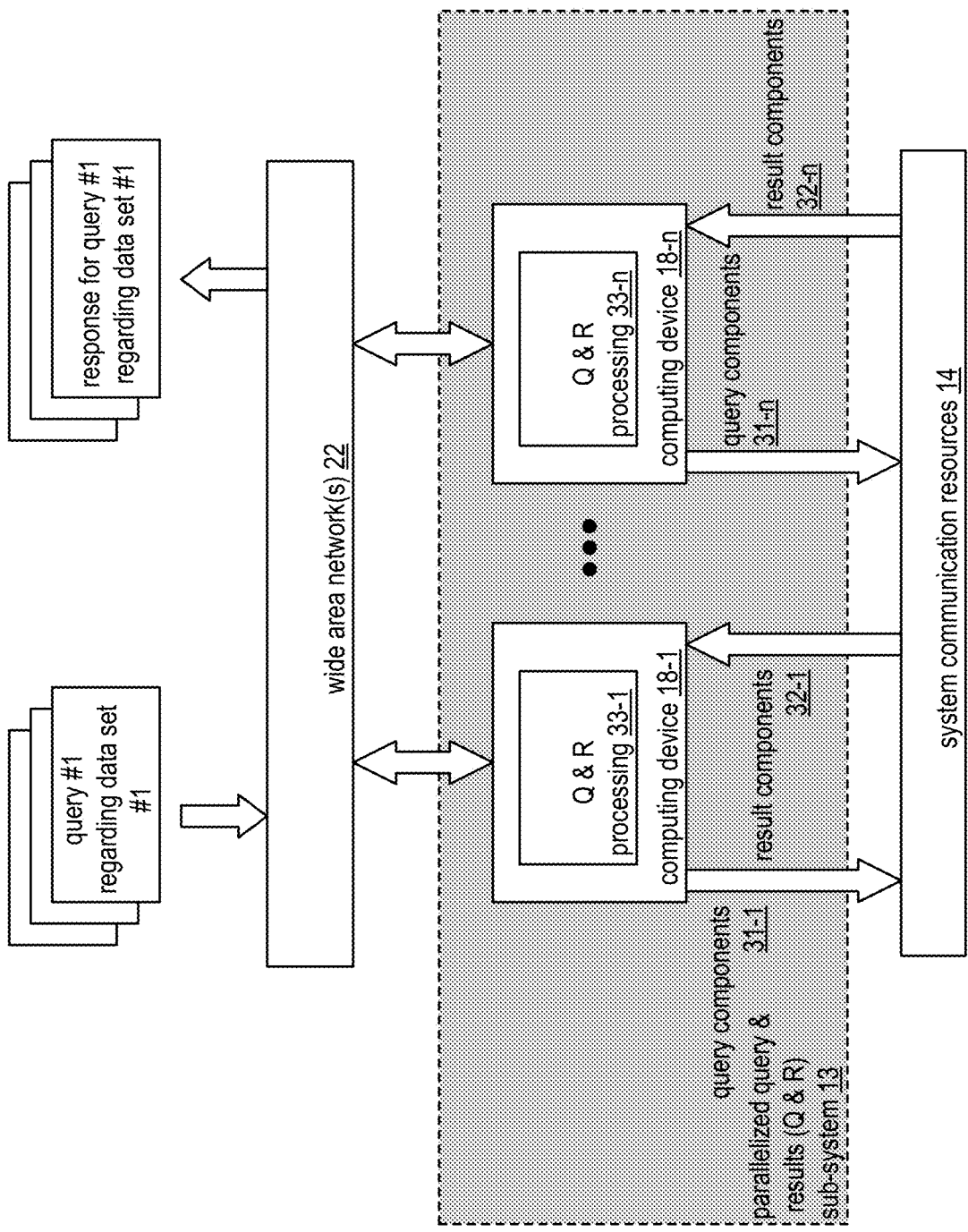
FIG. 5 is a schematic block diagram of an embodiment of a parallelized query and response (Q&R) sub-system in accordance with the present invention.

FIG. 5 is a schematic block diagram of an embodiment of a parallelized query and results sub-system 13 that includes a plurality of computing devices 18-1 through 18-n. Each of the computing devices executes a query (Q) & response (R) processing function 33-1 through 33-n. The computing devices are coupled to the wide area network 22 to receive queries (e.g., query no. 1 regarding data set no. 1) regarding tables and to provide responses to the queries (e.g., response for query no. 1 regarding the data set no. 1). For example, a computing device (e.g., 18-1) receives a query, creates an initial query plan therefrom, and optimizes it to produce an optimized plan. The computing device then sends components (e.g., one or more operations) of the optimized plan to the parallelized data store, retrieve, &/or process sub-system 12.

Processing resources of the parallelized data store, retrieve, &/or process sub-system 12 processes the components of the optimized plan to produce results components 32-1 through 32-n. The computing device of the Q&R sub-system 13 processes the result components to produce a query response.

The Q&R sub-system 13 allows for multiple queries regarding one or more tables to be processed concurrently. For example, a set of processing core resources of a computing device (e.g., one or more processing core resources) processes a first query and a second set of processing core resources of the computing device (or a different computing device) processes a second query.

As will be described in greater detail with reference to one or more subsequent figures, a computing device includes a plurality of nodes and each node includes multiple processing core resources such that a plurality of computing devices includes pluralities of multiple processing core resources A processing core resource of the pluralities of multiple processing core resources generates the optimized query plan and other processing core resources of the pluralities of multiple processing core resources generates other optimized query plans for other data processing requests. Each processing core resource is capable of executing at least a portion of the Q & R function. In an embodiment, a plurality of processing core resources of one or more nodes executes the Q & R function to produce a response to a query. The processing core resource is discussed in greater detail with reference to FIG. 13.

Figure 6:
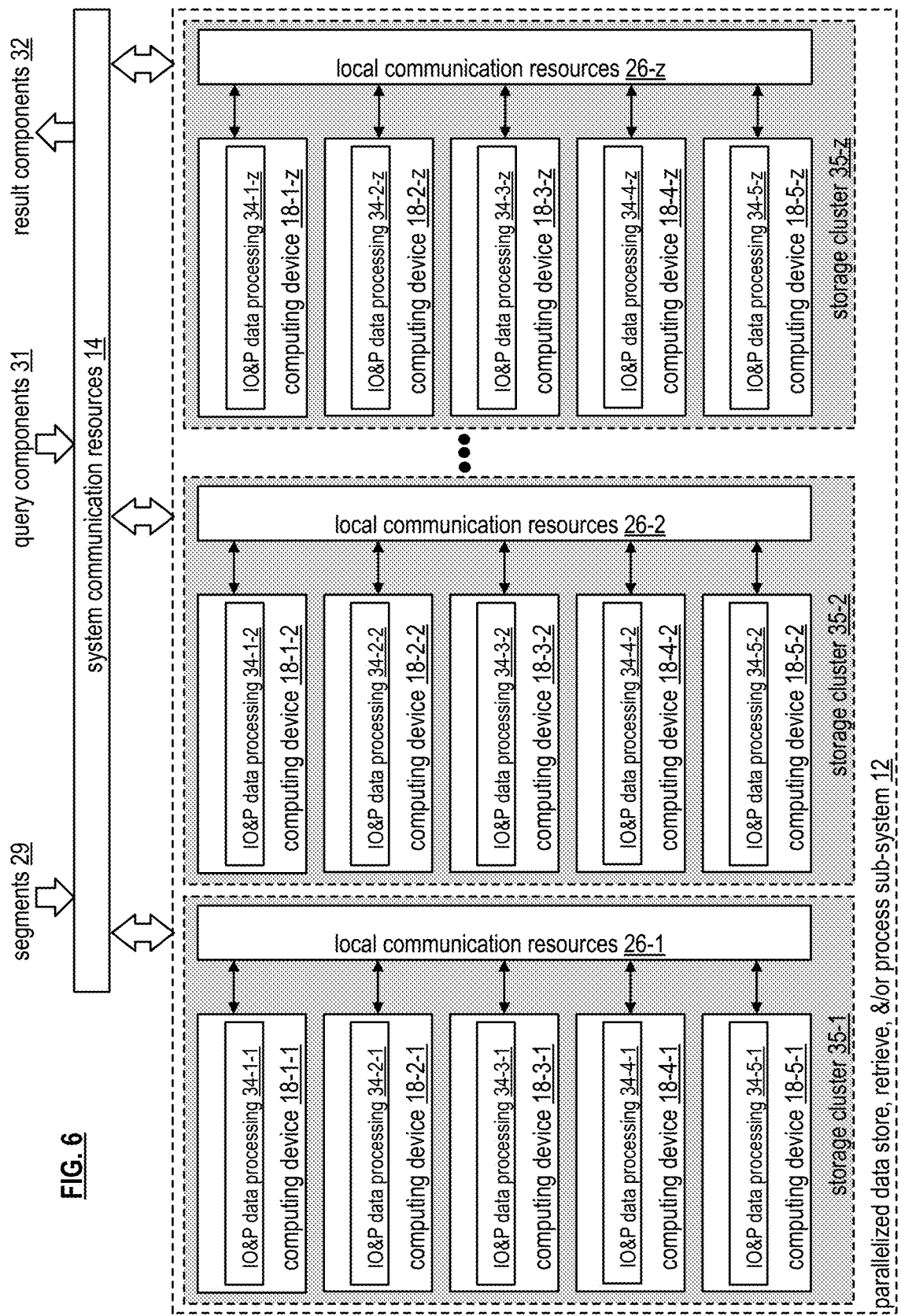
FIG. 6 is a schematic block diagram of an embodiment of a parallelized data store, retrieve, and/or process (IO& P) sub-system in accordance with the present invention.

FIG. 6 is a schematic block diagram of an embodiment of a parallelized data store, retrieve, and/or process sub-system 12 that includes a plurality of computing devices, where each computing device includes a plurality of nodes and each node includes multiple processing core resources. Each processing core resource is capable of executing at least a portion of the function of the parallelized data store, retrieve, and/or process sub-system 12. The plurality of computing devices is arranged into a plurality of storage clusters. Each storage cluster includes a number of computing devices.

In an embodiment, the parallelized data store, retrieve, and/or process sub-system 12 includes a plurality of storage clusters 35-1 through 35-z. Each storage cluster includes a corresponding local communication resource 26-1 through 26-z and a number of computing devices 18-1 through 18-5. Each computing device executes an input, output, and processing (TO &P) processing function 34-1 through 34-5 to store and process data.

The number of computing devices in a storage cluster corresponds to the number of segments (e.g., a segment group) in which a data partitioned is divided. For example, if a data partition is divided into five segments, a storage cluster includes five computing devices. As another example, if the data is divided into eight segments, then there are eight computing devices in the storage clusters.

To store a segment group of segments 29 within a storage cluster, a designated computing device of the storage cluster interprets storage instructions to identify computing devices (and/or processing core resources thereof) for storing the segments to produce identified engaged resources. The designated computing device is selected by a random selection, a default selection, a round-robin selection, or any other mechanism for selection.

The designated computing device sends a segment to each computing device in the storage cluster, including itself. Each of the computing devices stores their segment of the segment group. As an example, five segments 29 of a segment group are stored by five computing devices of storage cluster 35-1. The first computing device 18-1-1 stores a first segment of the segment group; a second computing device 18-2-1 stores a second segment of the segment group; and so on. With the segments stored, the computing devices are able to process queries (e.g., query components from the Q&R sub-system 13) and produce appropriate result components.

While storage cluster 35-1 is storing and/or processing a segment group, the other storage clusters 35-2 through 35-n are storing and/or processing other segment groups. For example, a table is partitioned into three segment groups. Three storage clusters store and/or process the three segment groups independently. As another example, four tables are independently storage and/or processed by one or more storage clusters. As yet another example, storage cluster 35-1 is storing and/or processing a second segment group while it is storing/or and processing a first segment group.

Figure 7:
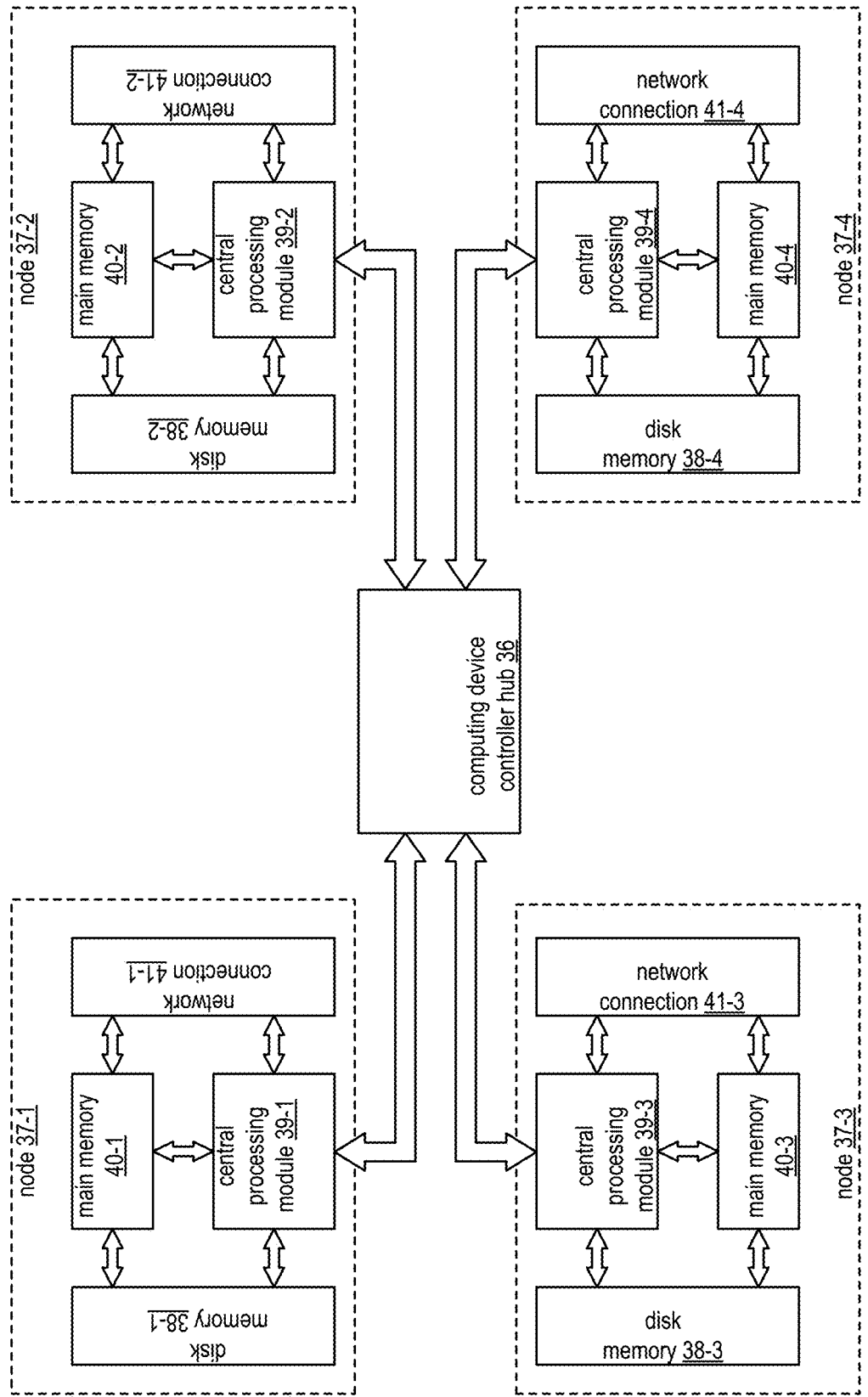
FIG. 7 is a schematic block diagram of an embodiment of a computing device in accordance with the present invention.

FIG. 7 is a schematic block diagram of an embodiment of a computing device 18 that includes a plurality of nodes 37-1 through 37-4 coupled to a computing device controller hub 36. The computing device controller hub 36 includes one or more of a chipset, a quick path interconnect (QPI), and an ultra path interconnection (UPI). Each node 37-1 through 37-4 includes a central processing module 39-1 through 39-4, a main memory 40-1 through 40-4 (e.g., volatile memory), a disk memory 38-1 through 38-4 (non-volatile memory), and a network connection 41-1 through 41-4. In an alternate configuration, the nodes share a network connection, which is coupled to the computing device controller hub 36 or to one of the nodes as illustrated in subsequent figures.

In an embodiment, each node is capable of operating independently of the other nodes. This allows for large scale parallel operation of a query request, which significantly reduces processing time for such queries. In another embodiment, one or more node function as co-processors to share processing requirements of a particular function, or functions.

Figure 8:
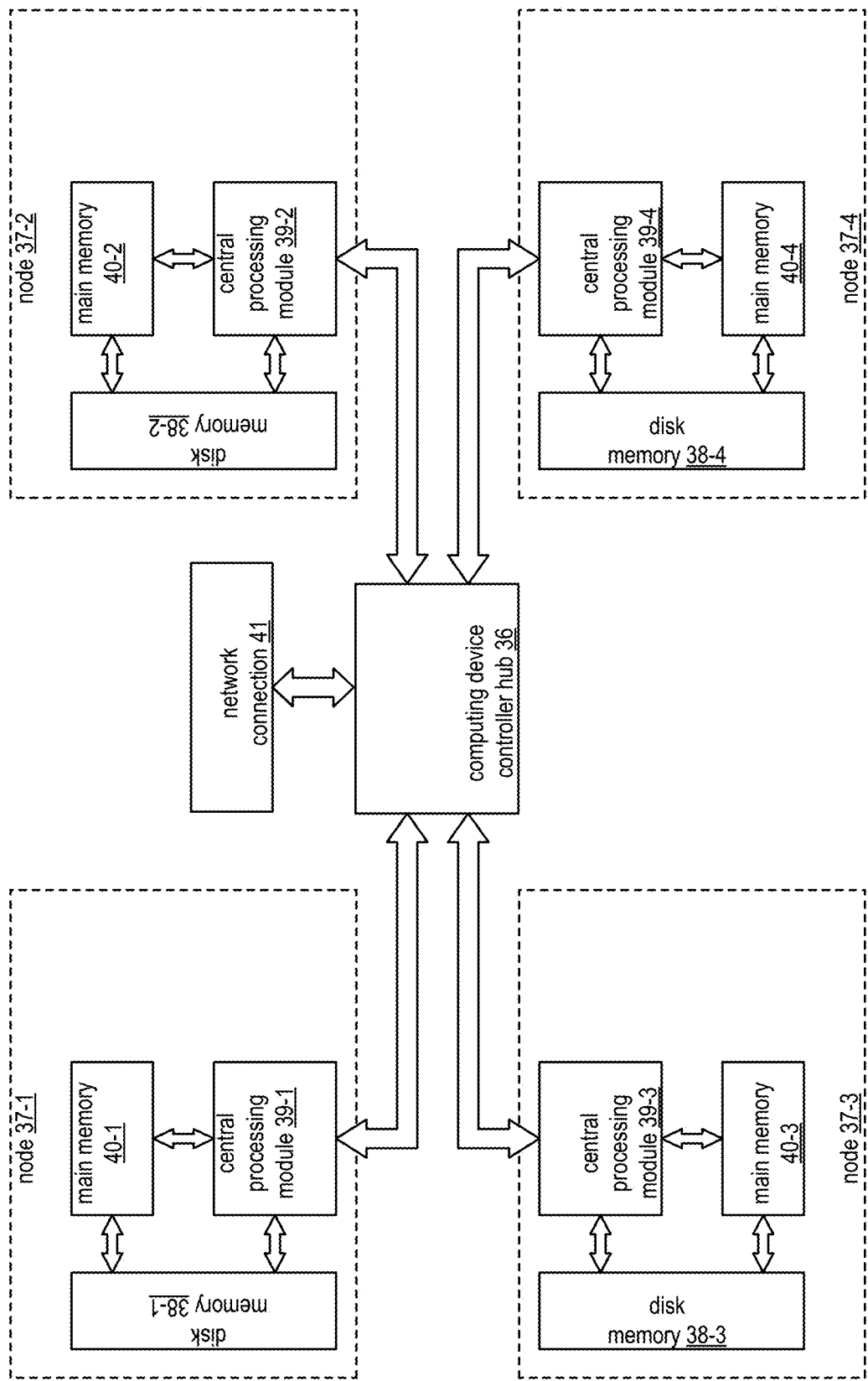
FIG. 8 is a schematic block diagram of another embodiment of a computing device in accordance with the present invention.

FIG. 8 is a schematic block diagram of another embodiment of a computing device is similar to the computing device of FIG. 7 with an exception that it includes a single network connection 41, which is coupled to the computing device controller hub 36. As such, each node coordinates with the computing device controller hub to transmit or receive data via the network connection.

Figure 9:
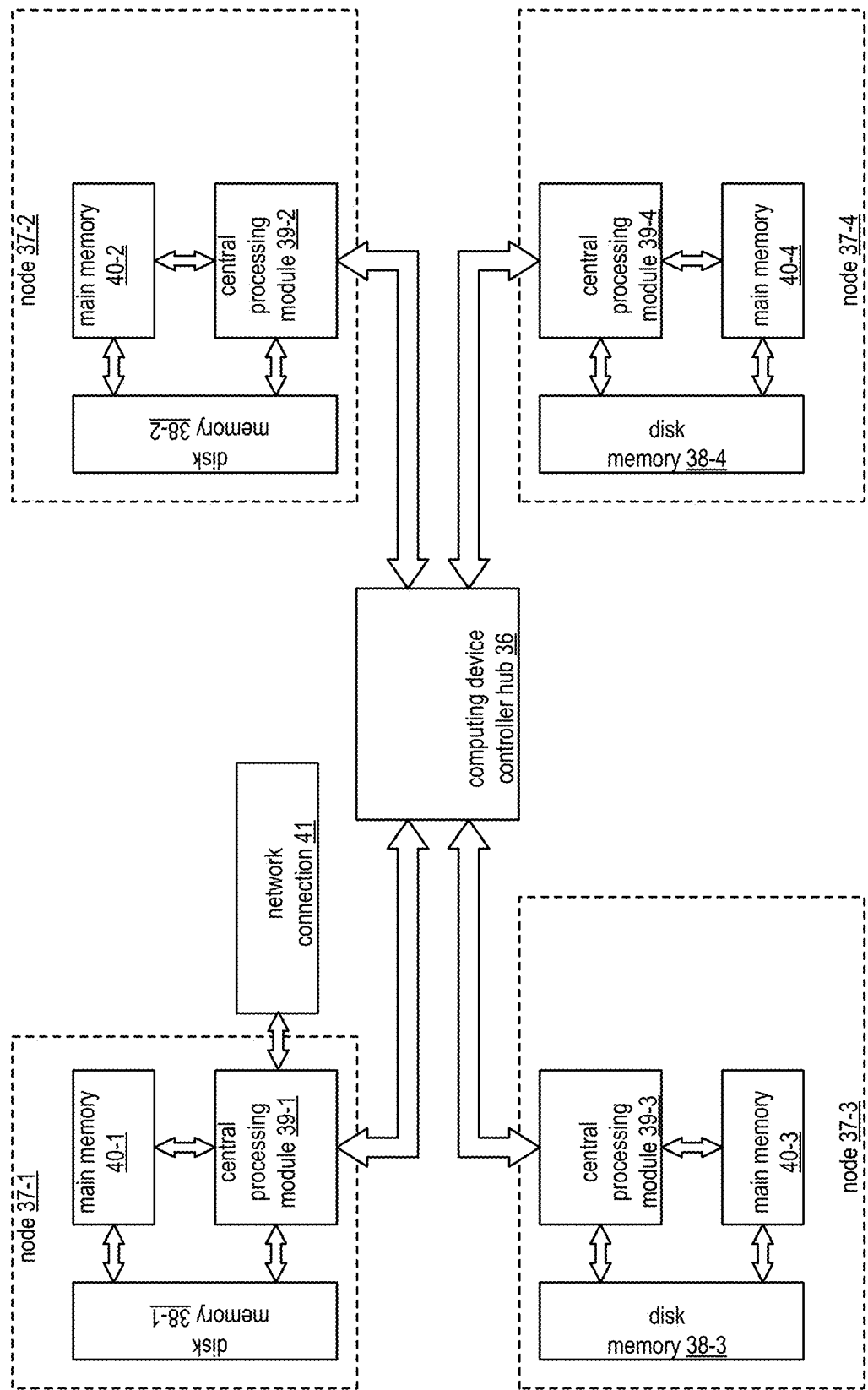
FIG. 9 is a schematic block diagram of another embodiment of a computing device in accordance with the present invention.

FIG. 9 is a schematic block diagram of another embodiment of a computing device is similar to the computing device of FIG. 7 with an exception that it includes a single network connection 41, which is coupled to a central processing module of a node (e.g., to central processing module 39-1 of node 37-1). As such, each node coordinates with the central processing module via the computing device controller hub 36 to transmit or receive data via the network connection.

Figure 10:
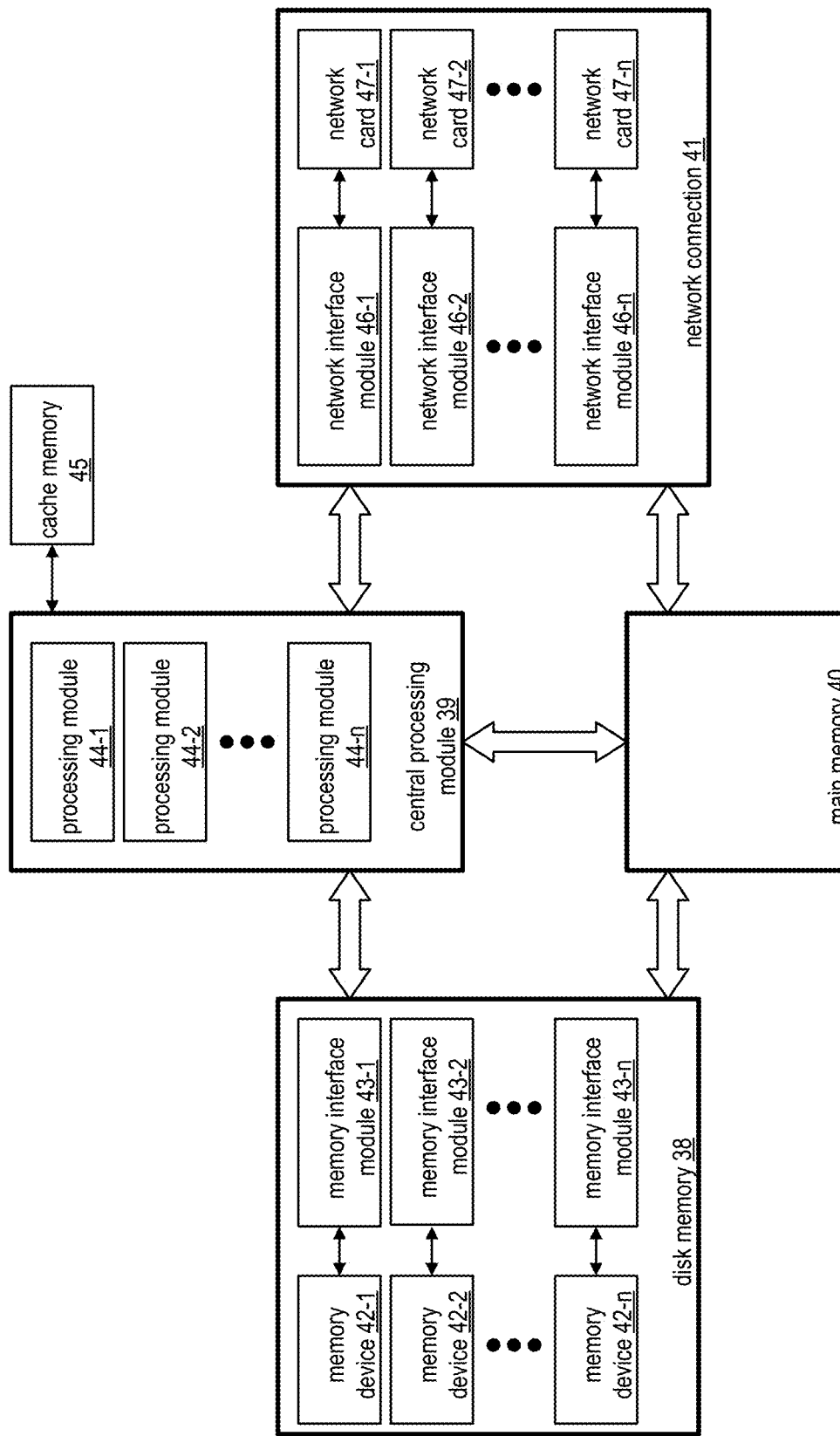
FIG. 10 is a schematic block diagram of an embodiment of a node of a computing device in accordance with the present invention.

FIG. 10 is a schematic block diagram of an embodiment of a node 37 of computing device 18. The node 37 includes the central processing module 39, the main memory 40, the disk memory 38, and the network connection 41. The main memory 40 includes read only memory (RAM) and/or other form of volatile memory for storage of data and/or operational instructions of applications and/or of the operating system. The central processing module 39 includes a plurality of processing modules 44-1 through 44-n and an associated one or more cache memory 45. A processing module is as defined at the end of the detailed description.

The disk memory 38 includes a plurality of memory interface modules 43-1 through 43-n and a plurality of memory devices 42-1 through 42-n (e.g., non-volatile memory). The memory devices 42-1 through 42-n include, but are not limited to, solid state memory, disk drive memory, cloud storage memory, and other non-volatile memory. For each type of memory device, a different memory interface module 43-1 through 43-n is used. For example, solid state memory uses a standard, or serial, ATA (SATA), variation, or extension thereof, as its memory interface. As another example, disk drive memory devices use a small computer system interface (SCSI), variation, or extension thereof, as its memory interface.

In an embodiment, the disk memory 38 includes a plurality of solid state memory devices and corresponding memory interface modules. In another embodiment, the disk memory 38 includes a plurality of solid state memory devices, a plurality of disk memories, and corresponding memory interface modules.

The network connection 41 includes a plurality of network interface modules 46-1 through 46-n and a plurality of network cards 47-1 through 47-n. A network card includes a wireless LAN (WLAN) device (e.g., an IEEE 802.11n or another protocol), a LAN device (e.g., Ethernet), a cellular device (e.g., CDMA), etc. The corresponding network interface modules 46-1 through 46-n include a software driver for the corresponding network card and a physical connection that couples the network card to the central processing module 39 or other component(s) of the node.

The connections between the central processing module 39, the main memory 40, the disk memory 38, and the network connection 41 may be implemented in a variety of ways. For example, the connections are made through a node controller (e.g., a local version of the computing device controller hub 36). As another example, the connections are made through the computing device controller hub 36.

Figure 11:
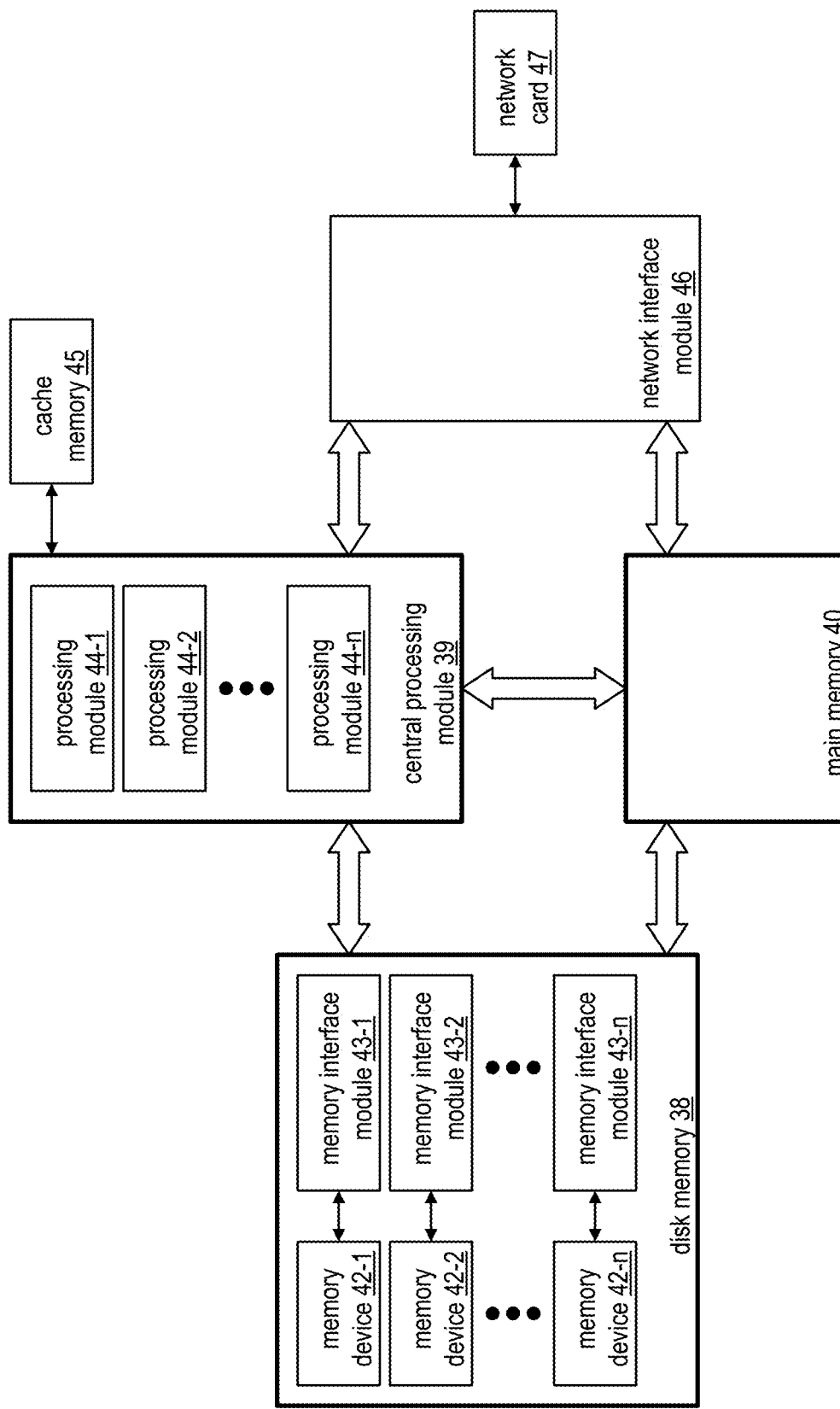
FIG. 11 is a schematic block diagram of an embodiment of a node of a computing device in accordance with the present invention.

FIG. 11 is a schematic block diagram of an embodiment of a node 37 of a computing device 18 that is similar to the node of FIG. 10, with a difference in the network connection. In this embodiment, the node 37 includes a single network interface module 46 and a corresponding network card 47 configuration.

Figure 12:
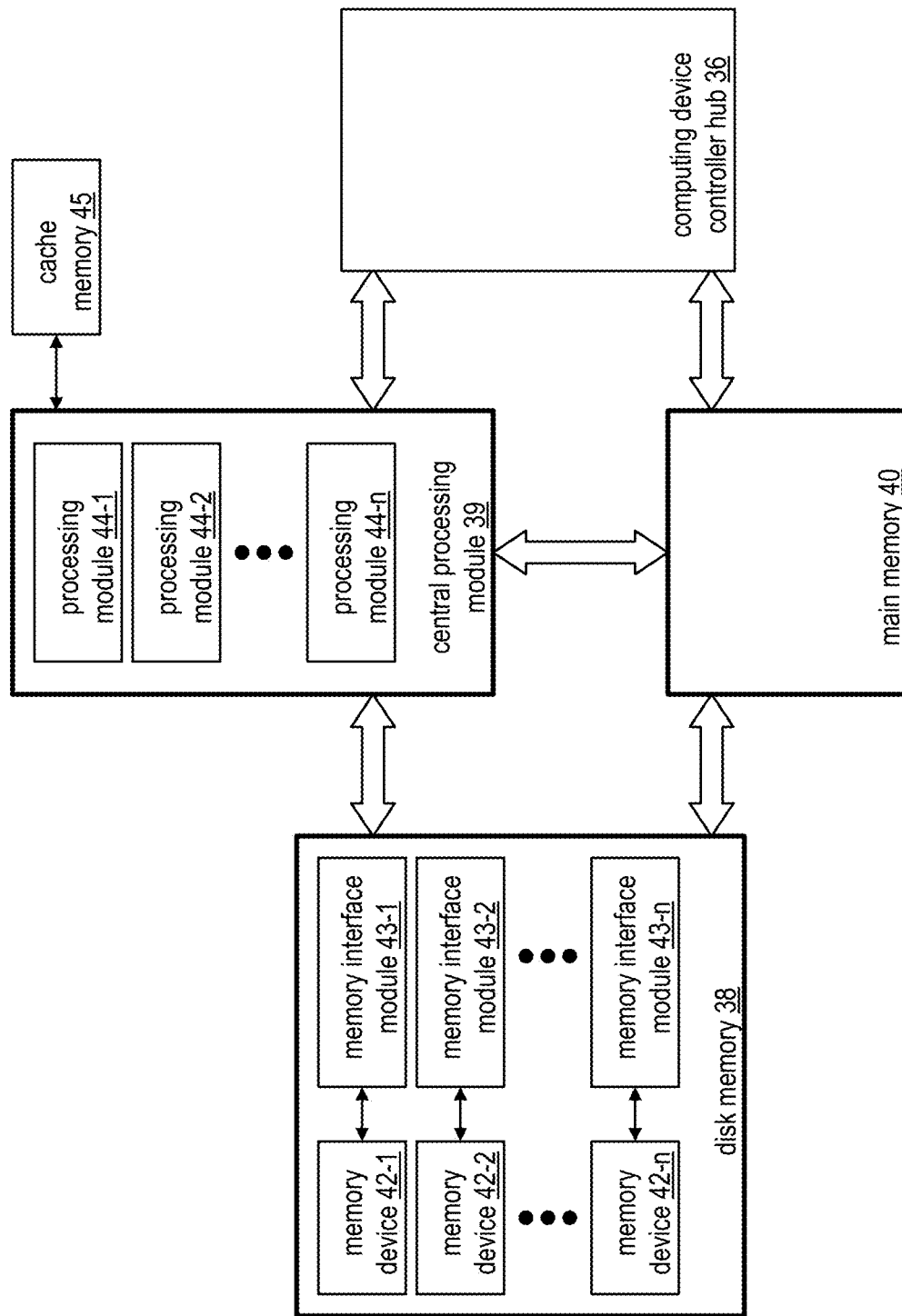
FIG. 12 is a schematic block diagram of an embodiment of a node of a computing device in accordance with the present invention.

FIG. 12 is a schematic block diagram of an embodiment of a node 37 of a computing device 18 that is similar to the node of FIG. 10, with a difference in the network connection. In this embodiment, the node 37 connects to a network connection via the computing device controller hub 36.

Figure 13:
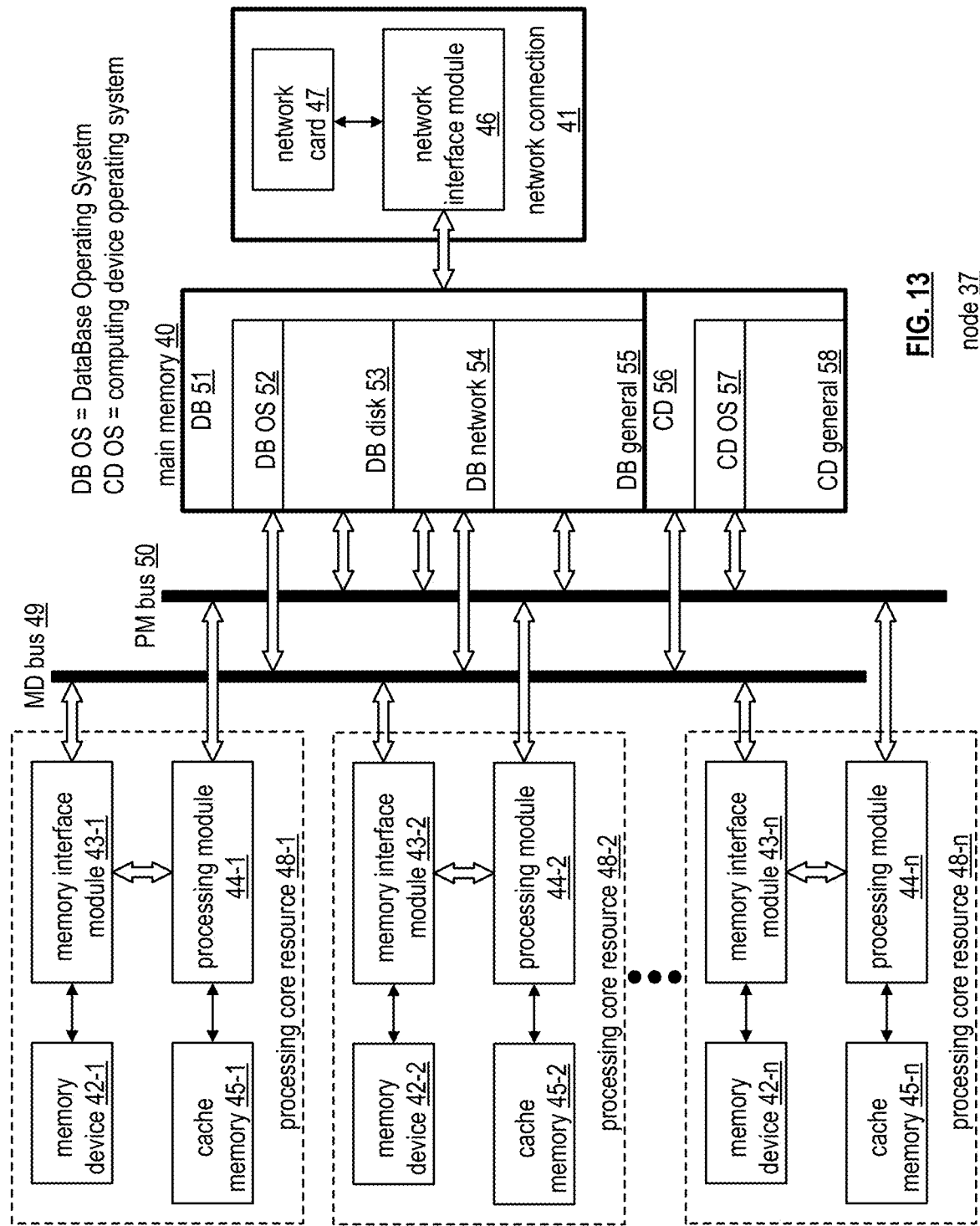
FIG. 13 is a schematic block diagram of an embodiment of a node of a computing device in accordance with the present invention.

FIG. 13 is a schematic block diagram of another embodiment of a node 37 of computing device 18 that includes processing core resources 48-1 through 48-*n*, a memory device (MD) bus 49, a processing module (PM) bus 50, a main memory 40 and a network connection 41. The network connection 41 includes the network card 47 and the network interface module 46 of FIG. 10. Each processing core resource 48 includes a corresponding processing module 44-1 through 44-*n*, a corresponding memory interface module 43-1 through 43-*n*, a corresponding memory device 42-1 through 42-*n*, and a corresponding cache memory 45-1 through 45-*n*. In this configuration, each processing core resource can operate independently of the other processing core resources. This further supports increased parallel operation of database functions to further reduce execution time.

The main memory 40 is divided into a computing device (CD) 56 section and a database (DB) 51 section. The database section includes a database operating system (OS) area 52, a disk area 53, a network area 54, and a general area 55. The computing device section includes a computing device operating system (OS) area 57 and a general area 58. Note that each section could include more or less allocated areas for various tasks being executed by the database system.

In general, the database OS 52 allocates main memory for database operations. Once allocated, the computing device OS 57 cannot access that portion of the main memory 40. This supports lock free and independent parallel execution of one or more operations.

Figure 14:
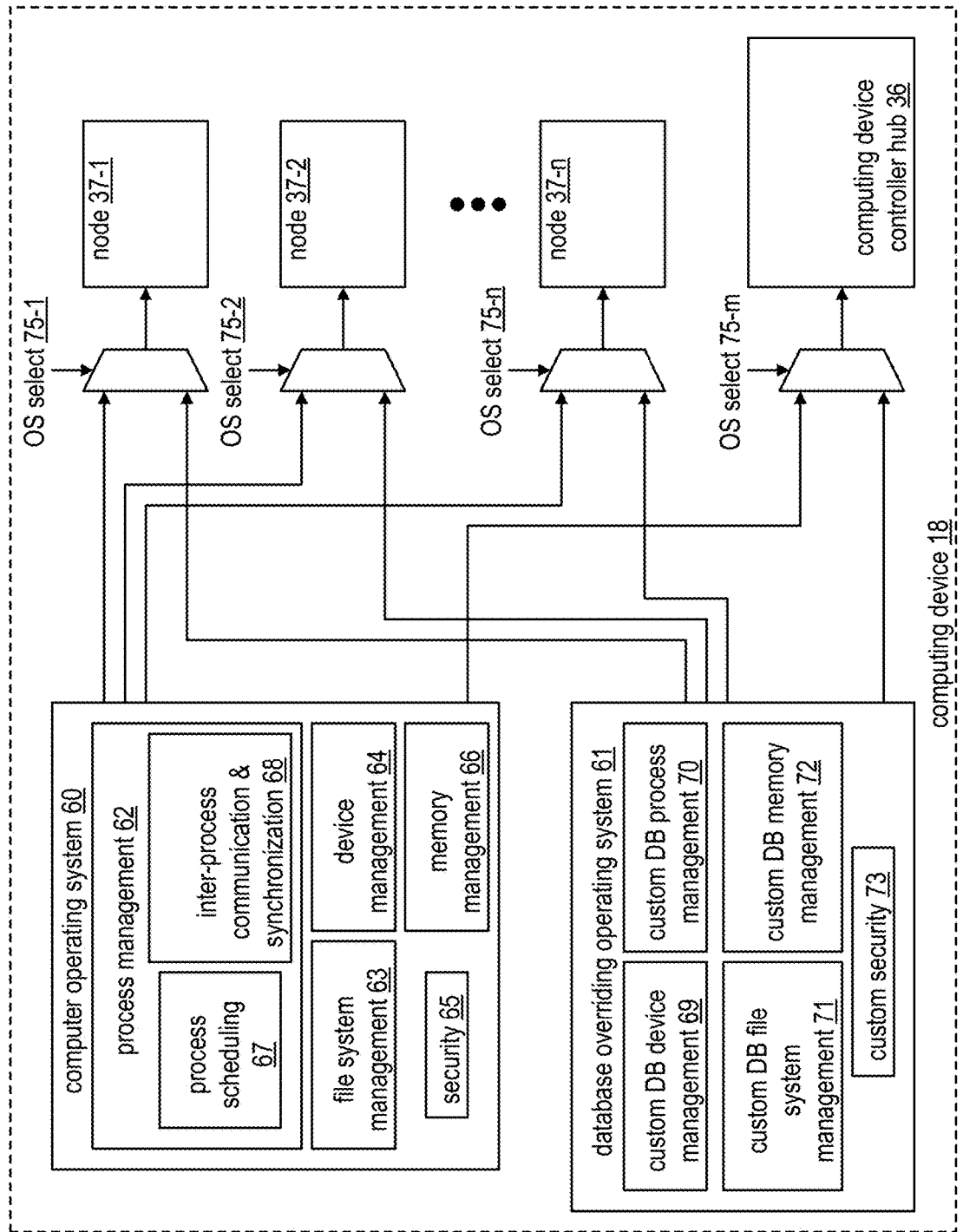
FIG. 14 is a schematic block diagram of an embodiment of operating systems of a computing device in accordance with the present invention.

FIG. 14 is a schematic block diagram of an embodiment of operating systems of a computing device 18. The computing device 18 includes a computer operating system 60 and a database overriding operating system (DB OS) 61. The computer OS 60 includes process management 62, file system management 63, device management 64, memory management 66, and security 65. The processing management 62 generally includes process scheduling 67 and inter-process communication and synchronization 68. In general, the computer OS 60 is a conventional operating system used by a variety of types of computing devices. For example, the computer operating system is a personal computer operating system, a server operating system, a tablet operating system, a cell phone operating system, etc.

The database overriding operating system (DB OS) 61 includes custom DB device management 69, custom DB process management 70 (e.g., process scheduling and/or inter-process communication & synchronization), custom DB file system management 71, custom DB memory management 72, and/or custom security 73. In general, the database overriding OS 61 provides hardware components of a node for more direct access to memory, more direct access to a network connection, improved independency, improved data storage, improved data retrieval, and/or improved data processing than the computing device OS.

In an example of operation, the database overriding OS 61 controls which operating system, or portions thereof, operate with each node and/or computing device controller hub of a computing device (e.g., via OS select 75-1 through 75-*n* when communicating with nodes 37-1 through 37-*n* and via OS select 75-*m* when communicating with the computing device controller hub 36). For example, device management of a node is supported by the computer operating system, while process management, memory management, and file system management are supported by the database overriding operating system. To override the computer OS, the database overriding OS provides instructions to the computer OS regarding which management tasks will be controlled by the database overriding OS. The database overriding OS also provides notification to the computer OS as to which sections of the main memory it is reserving exclusively for one or more database functions, operations, and/or tasks. One or more examples of the database overriding operating system are provided in subsequent figures.

Figure 15:
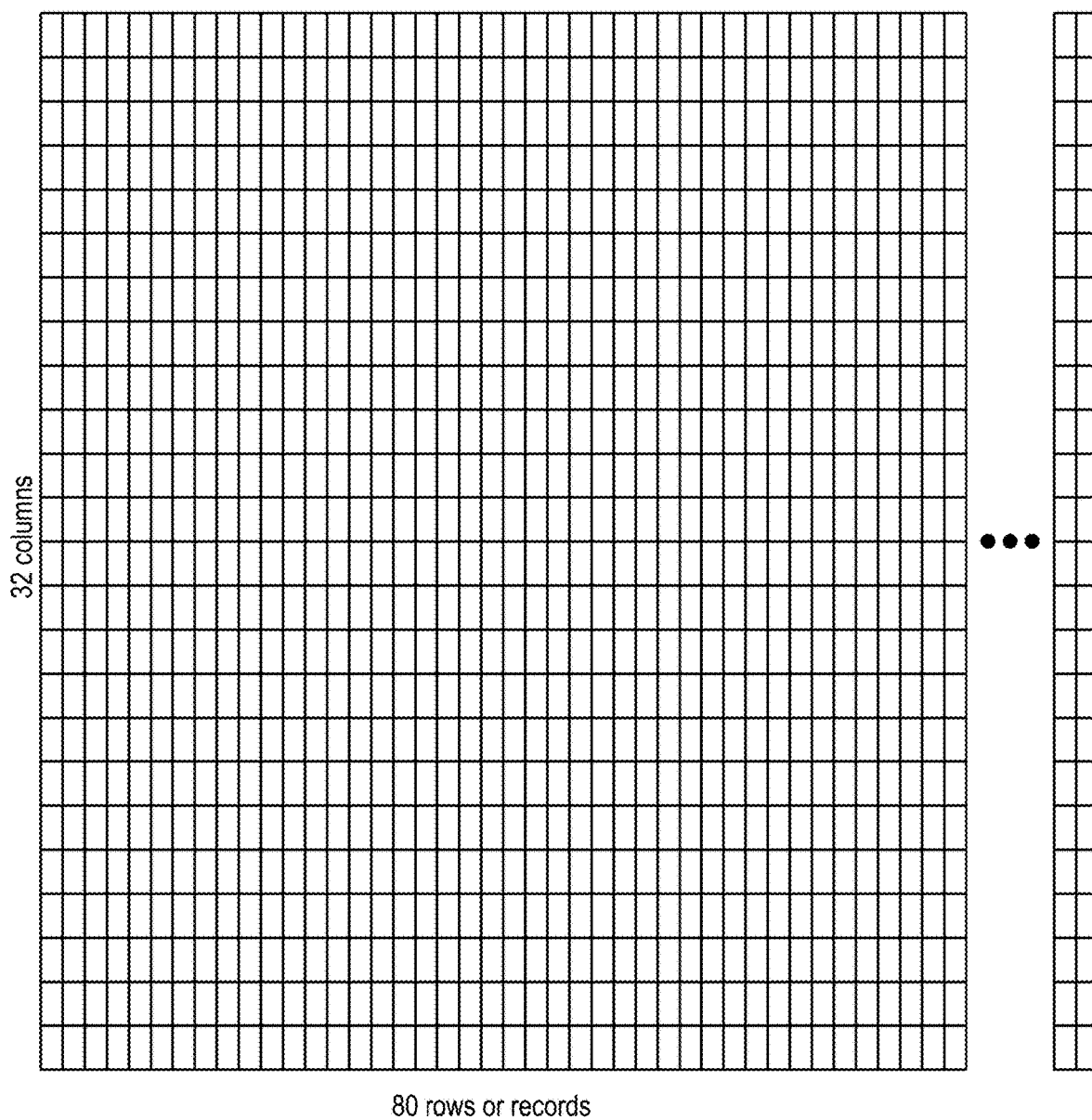

FIGS. 15-23 are schematic block diagrams of an example of processing a table or data set for storage in the database system 10. FIG. 15 illustrates an example of a data set or table that includes 32 columns and 80 rows, or records, that is received by the parallelized data input-subsystem. This is a very small table, but is sufficient for illustrating one or more concepts regarding one or more aspects of a database system. The table is representative of a variety of data ranging from insurance data, to financial data, to employee data, to medical data, and so on.

Figure 16:
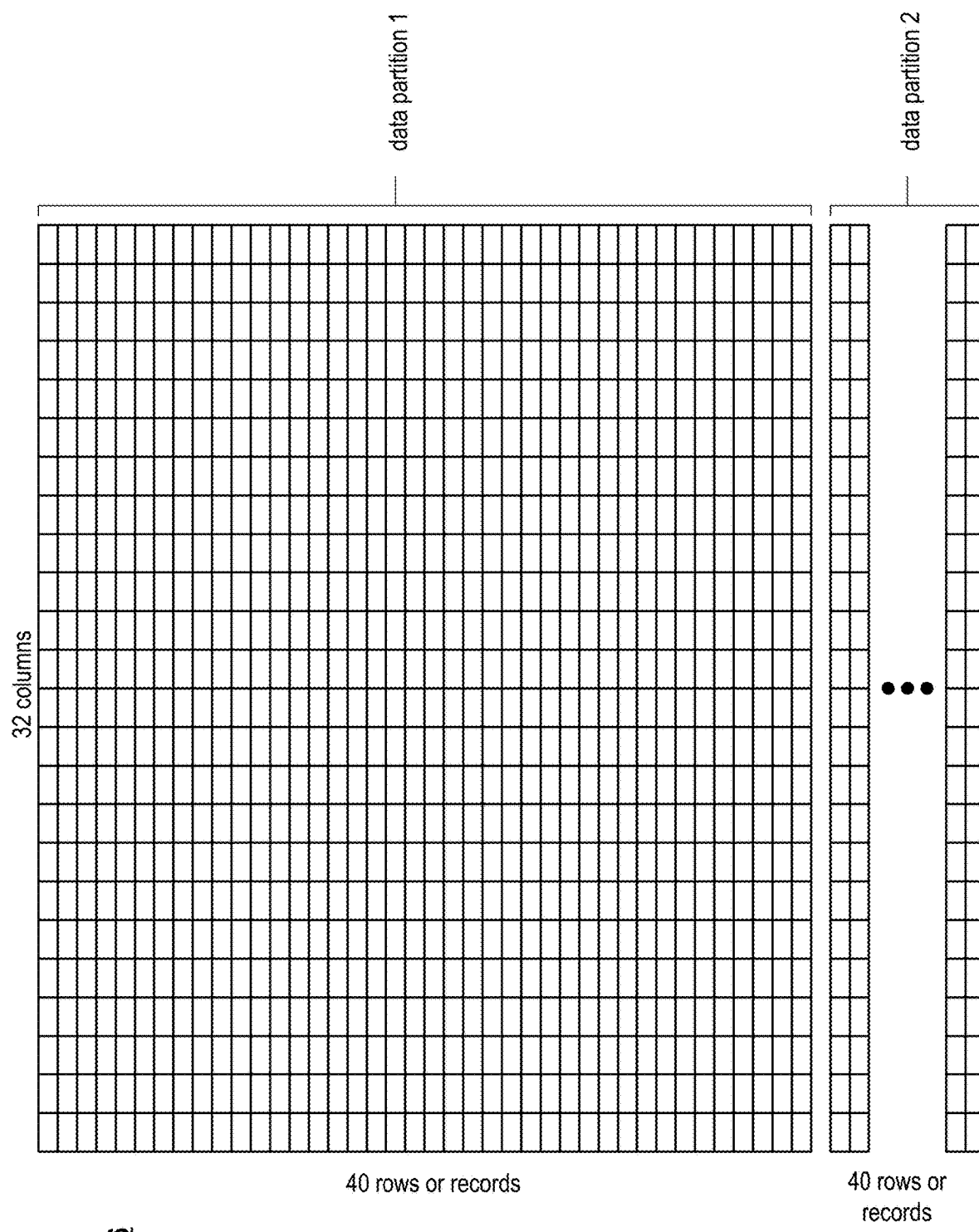

FIG. 16 illustrates an example of the parallelized data input-subsystem dividing the data set into two partitions. Each of the data partitions includes 40 rows, or records, of the data set. In another example, the parallelized data input-subsystem divides the data set into more than two partitions. In yet another example, the parallelized data input-subsystem divides the data set into many partitions and at least two of the partitions have a different number of rows.

Figure 17:
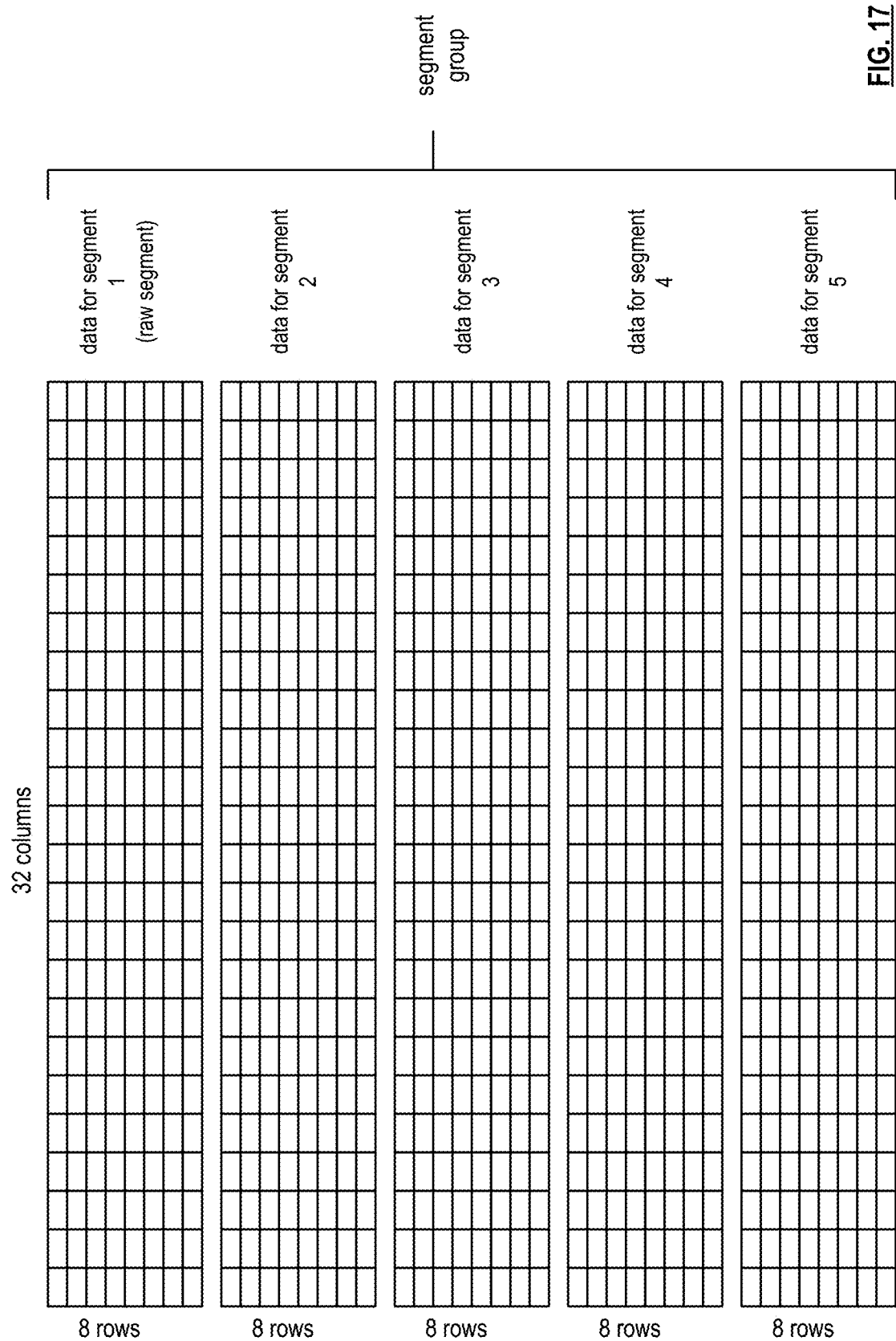

FIG. 17 illustrates an example of the parallelized data input-subsystem dividing a data partition into a plurality of segments to form a segment group. The number of segments in a segment group is a function of the data redundancy encoding. In this example, the data redundancy encoding is single parity encoding from four data pieces; thus, five segments are created. In another example, the data redundancy encoding is a two parity encoding from four data pieces; thus, six segments are created. In yet another example, the data redundancy encoding is single parity encoding from seven data pieces; thus, eight segments are created.

Figures 18, 19, 20:
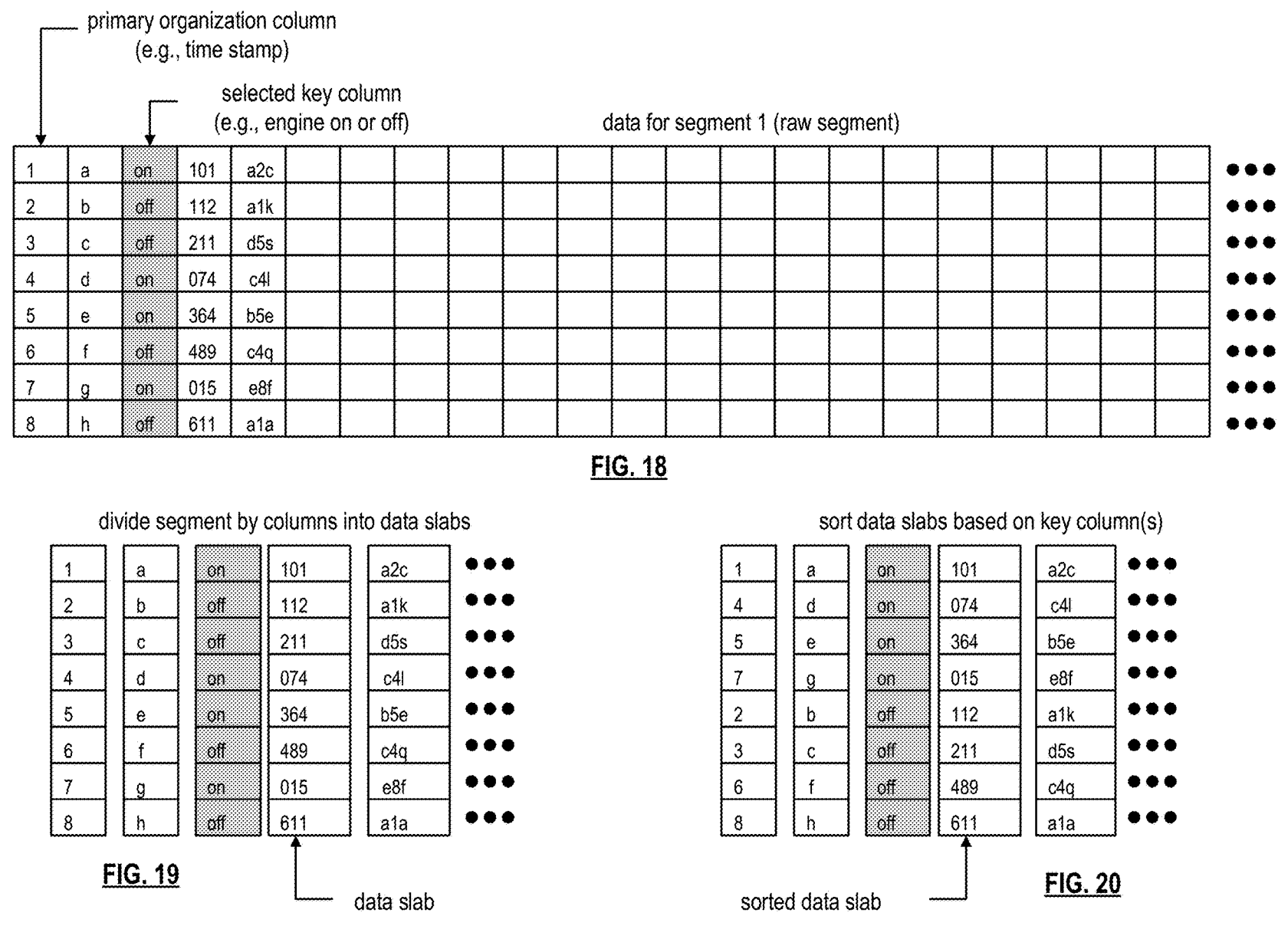

FIG. 18 illustrates an example of data for segment 1 of the segments of FIG. 17. The segment is in a raw form since it has not yet been key column sorted. As shown, segment 1 includes 8 rows and 32 columns. The third column is selected as the key column and the other columns stored various pieces of information for a given row (i.e., a record). The key column may be selected in a variety of ways. For example, the key column is selected based on a type of query (e.g., a query regarding a year, where a data column is selected as the key column). As another example, the key column is selected in accordance with a received input command that identified the key column. As yet another example, the key column is selected as a default key column (e.g., a date column, an ID column, etc.)

As an example, the table is regarding a fleet of vehicles. Each row represents data regarding a unique vehicle. The first column stores a vehicle ID, the second column stores make and model information of the vehicle. The third column stores data as to whether the vehicle is on or off. The remaining columns store data regarding the operation of the vehicle such as mileage, gas level, oil level, maintenance information, routes taken, etc.

With the third column selected as the key column, the other columns of the segment are to be sorted based on the key column. Prior to sorted, the columns are separated to form data slabs. As such, one column is separated out to form one data slab.

FIG. 19 illustrates an example of the parallelized data input-subsystem dividing segment 1 of FIG. 18 into a plurality of data slabs. A data slab is a column of segment 1. In this figure, the data of the data slabs has not been sorted. Once the columns have been separated into data slabs, each data slab is sorted based on the key column. Note that more than one key column may be selected and used to sort the data slabs based on two or more other columns.

FIG. 20 illustrates an example of the parallelized data input-subsystem sorting the each of the data slabs based on the key column. In this example, the data slabs are sorted based on the third column which includes data of "on" or "off". The rows of a data slab are rearranged based on the key column to produce a sorted data slab. Each segment of the segment group is divided into similar data slabs and sorted by the same key column to produce sorted data slabs.

Figure 21:
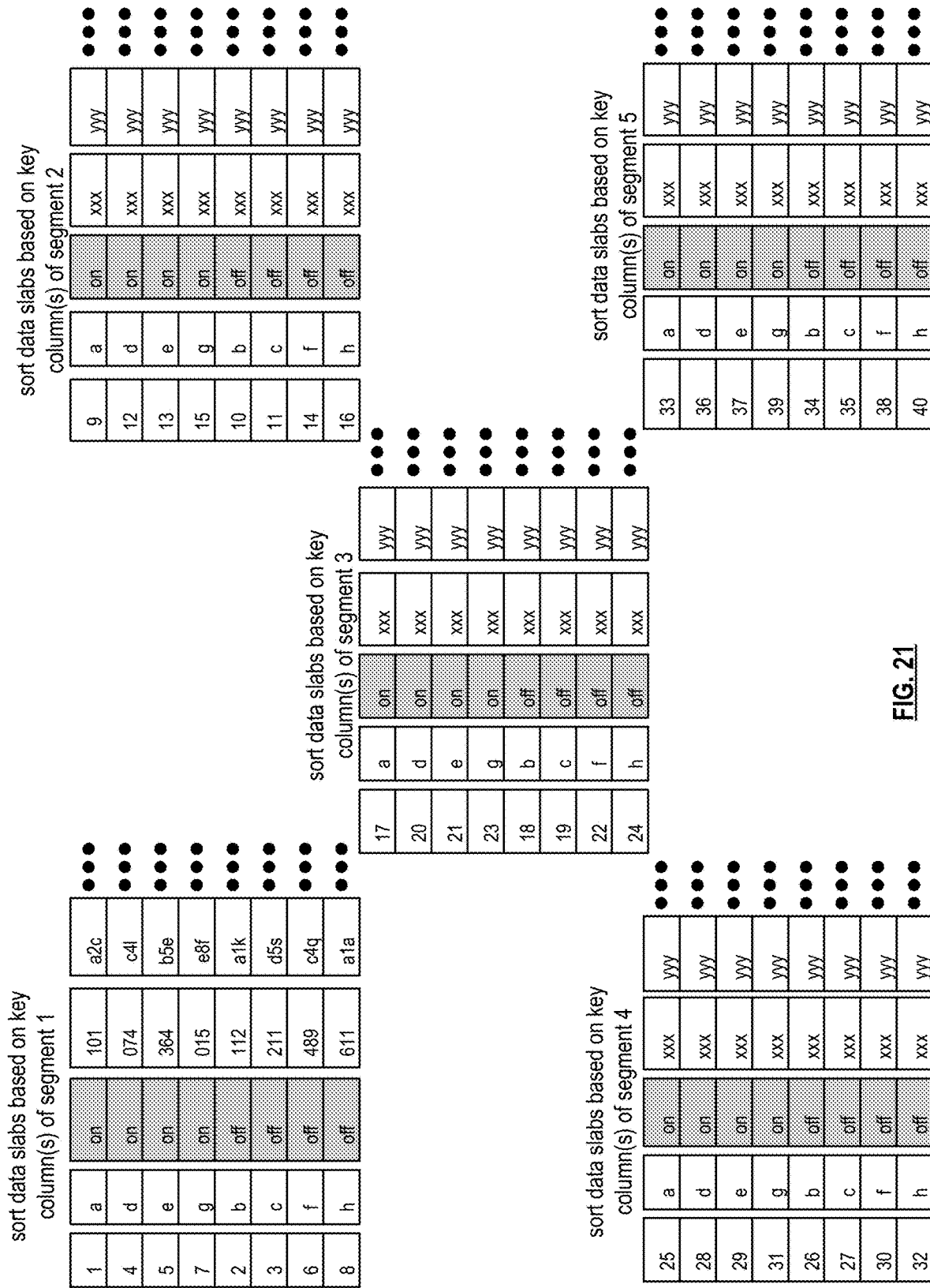

FIG. 21 illustrates an example of each segment of the segment group sorted into sorted data slabs. The similarity of data from segment to segment is for the convenience of illustration. Note that each segment has its own data, which may or may not be similar to the data in the other sections.

Figure 22:
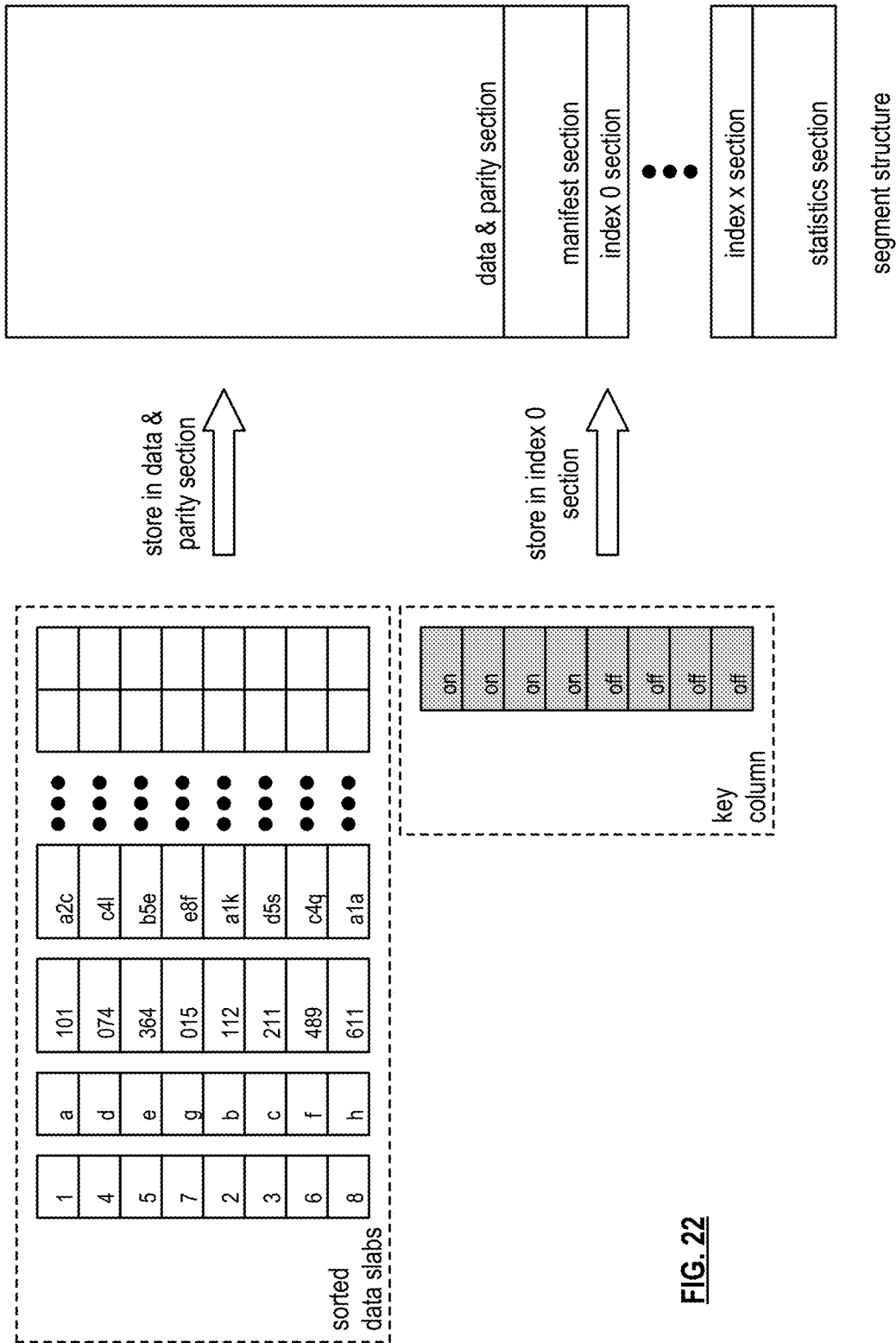

FIG. 22 illustrates an example of a segment structure for a segment of the segment group. The segment structure for a segment includes the data & parity section, a manifest section, one or more index sections, and a statistics section. The segment structure represents a storage mapping of the data (e.g., data slabs and parity data) of a segment and associated data (e.g., metadata, statistics, key column(s), etc.) regarding the data of the segment. The sorted data slabs of FIG. 16 of the segment are stored in the data & parity section of the segment structure. The sorted data slabs are stored in the data & parity section in a compressed format or as raw data (i.e., non-compressed format). Note that a segment structure has a particular data size (e.g., 32 Giga-Bytes) and data is stored within in coding block sizes (e.g., 4 Kilo-Bytes).

Before the sorted data slabs are stored in the data & parity section, or concurrently with storing in the data & parity section, the sorted data slabs of a segment are redundancy encoded. The redundancy encoding may be done in a variety of ways. For example, the redundancy encoding is in accordance with RAID 5, RAID 6, or RAID 10. As another example, the redundancy encoding is a form of forward error encoding (e.g., Reed Solomon, Trellis, etc.). As another example, the redundancy encoding utilizes an erasure coding scheme. An example of redundancy encoding is discussed in greater detail with reference to one or more of FIGS. 29-36.

The manifest section stores metadata regarding the sorted data slabs. The metadata includes one or more of, but is not limited to, descriptive metadata, structural metadata, and/or administrative metadata. Descriptive metadata includes one or more of, but is not limited to, information regarding data such as name, an abstract, keywords, author, etc. Structural metadata includes one or more of, but is not limited to, structural features of the data such as page size, page ordering, formatting, compression information, redundancy encoding information, logical addressing information, physical addressing information, physical to logical addressing information, etc. Administrative metadata includes one or more of, but is not limited to, information that aids in managing data such as file type, access privileges, rights management, preservation of the data, etc.

The key column is stored in an index section. For example, a first key column is stored in index #0. If a second key column exists, it is stored in index #1. As such, for each key column, it is stored in its own index section. Alternatively, one or more key columns are stored in a single index section.

The statistics section stores statistical information regarding the segment and/or the segment group. The statistical information includes one or more of, but is not limited, to number of rows (e.g., data values) in one or more of the sorted data slabs, average length of one or more of the sorted data slabs, average row size (e.g., average size of a data value), etc. The statistical information includes information regarding raw data slabs, raw parity data, and/or compressed data slabs and parity data.

Figure 23:
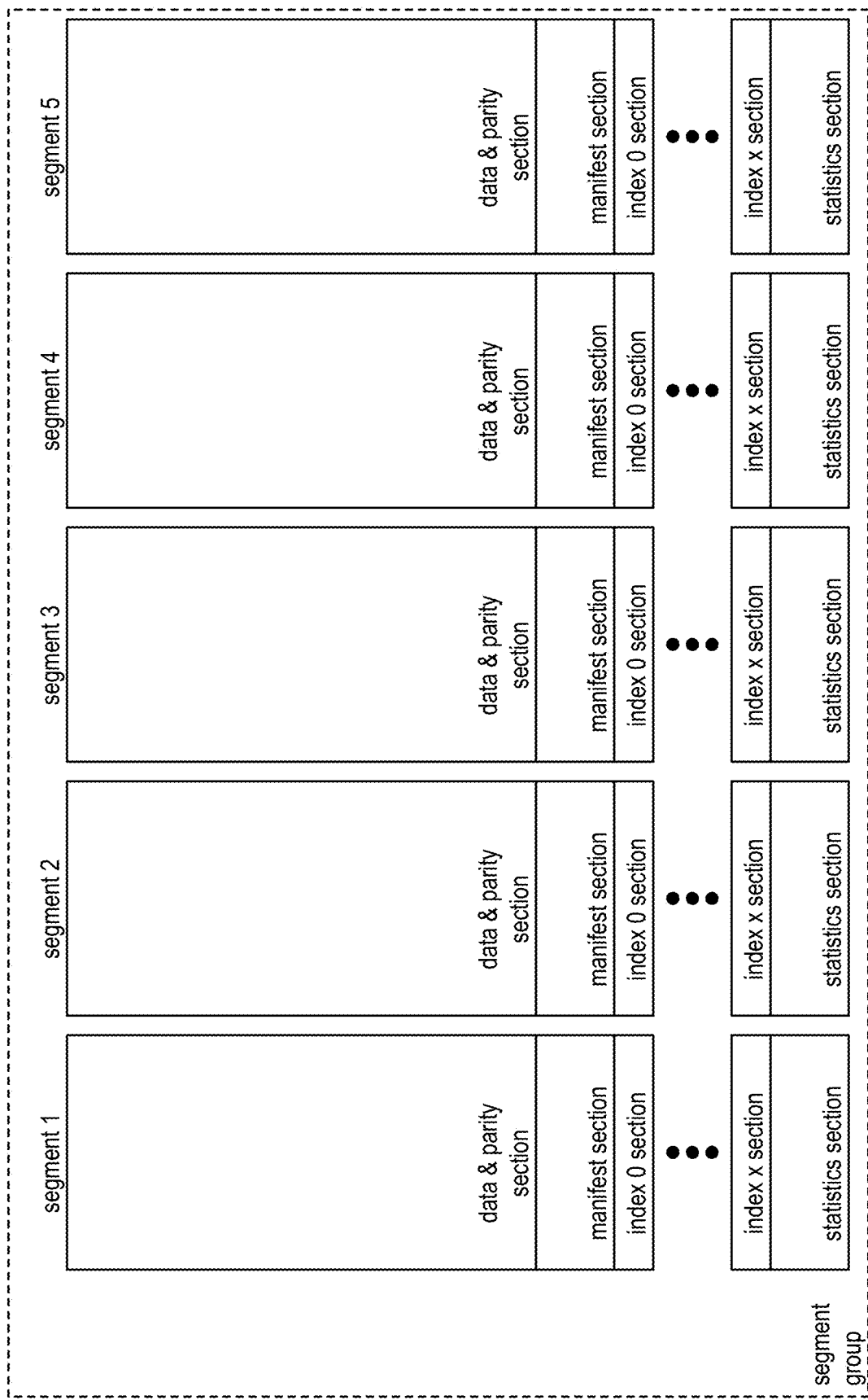

FIG. 23 illustrates the segment structures for each segment of a segment group having five segments. Each segment includes a data & parity section, a manifest section, one or more index sections, and a statistic section. Each segment is targeted for storage in a different computing device of a storage cluster. The number of segments in the segment group corresponds to the number of computing devices in a storage cluster. In this example, there are five computing devices in a storage cluster. Other examples include more or less than five computing devices in a storage cluster.

Figure 24A:
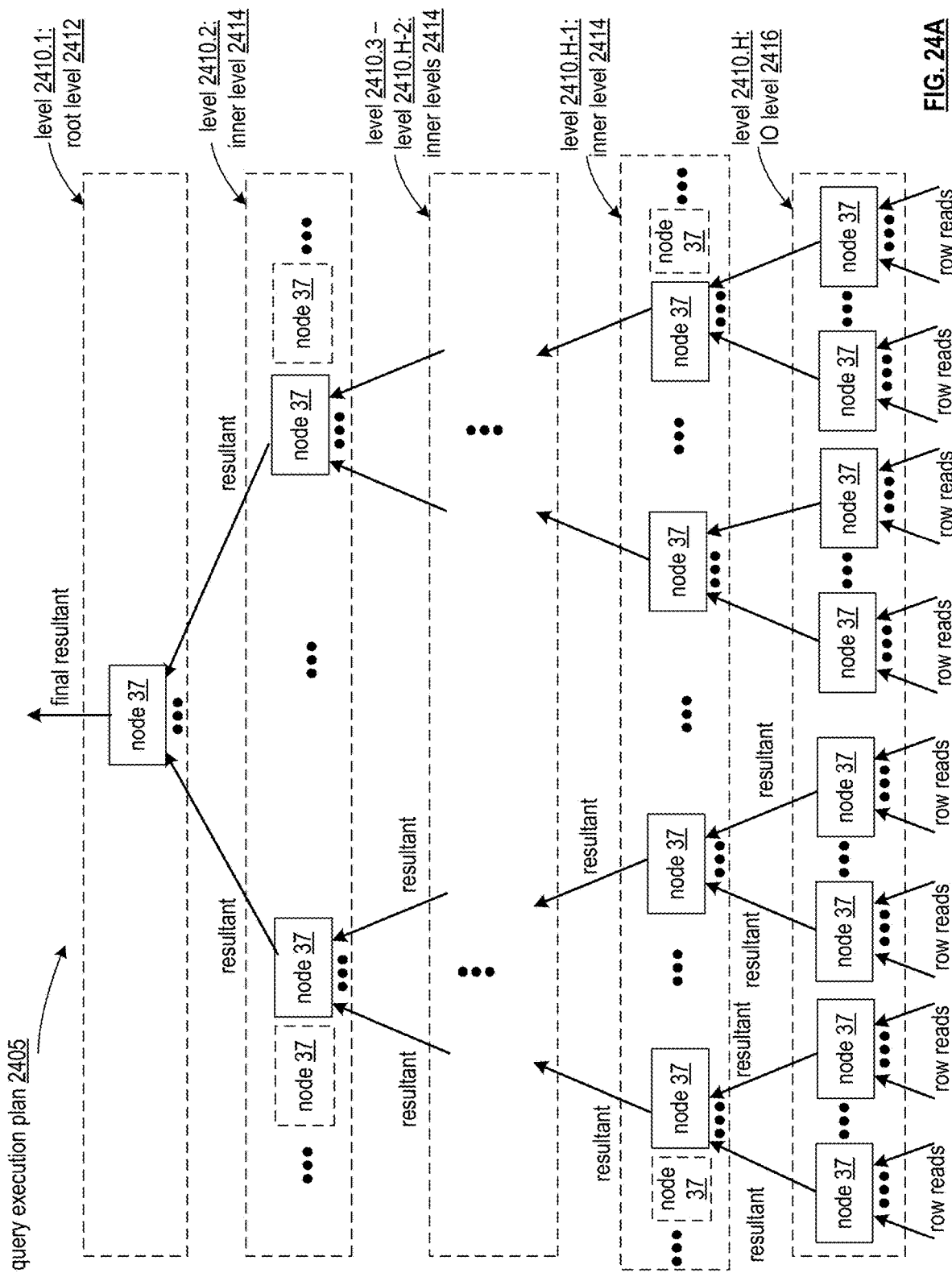
FIG. 24A is a schematic block diagram of a query execution plan implemented via a plurality of nodes in accordance with various embodiments of the present invention.

FIG. 24A illustrates an example of a query execution plan 2405 implemented by the database system 10 to execute one or more queries by utilizing a plurality of nodes 37. Each node 37 can be utilized to implement some or all of the plurality of nodes 37 of some or all computing devices 18-1-18-n, for example, of the of the parallelized data store, retrieve, and/or process sub-system 12, and/or of the parallelized query and results sub-system 13. The query execution plan can include a plurality of levels 2410. In this example, a plurality of H levels in a corresponding tree structure of the query execution plan 2405 are included. The plurality of levels can include a top, root level 2412; a bottom, IO level 2416, and one or more inner levels 2414. In some embodiments, there is exactly one inner level 2414, resulting in a tree of exactly three levels 2410.1, 2410.2, and 2410.3, where level 2410.H corresponds to level 2410.3. In such embodiments, level 2410.2 is the same as level 2410.H-1, and there are no other inner levels 2410.3-2410.H-2. Alternatively, any number of multiple inner levels 2414 can be implemented to result in a tree with more than three levels.

This illustration of query execution plan 2405 illustrates the flow of execution of a given query by utilizing a subset of nodes across some or all of the levels 2410. In this illustration, nodes 37 with a solid outline are nodes involved in executing a given query. Nodes 37 with a dashed outline are other possible nodes that are not involved in executing the given query, but could be involved in executing other queries in accordance with their level of the query execution plan in which they are included.

Each of the nodes of IO level 2416 can be operable to, for a given query, perform the necessary row reads for gathering corresponding rows of the query. These row reads can correspond to the segment retrieval to read some or all of the rows of retrieved segments determined to be required for the given query. Thus, the nodes 37 in level 2416 can include any nodes 37 operable to retrieve segments for query execution from its own storage or from storage by one or more other nodes; to recover segment for query execution via other segments in the same segment grouping by utilizing the redundancy error encoding scheme; and/or to determine which exact set of segments is assigned to the node for retrieval to ensure queries are executed correctly.

IO level 2416 can include all nodes in a given storage cluster 35 and/or can include some or all nodes in multiple storage clusters 35, such as all nodes in a subset of the storage clusters 35-1-35-z and/or all nodes in all storage clusters 35-1-35-z. For example, all nodes 37 and/or all currently available nodes 37 of the database system 10 can be included in level 2416. As another example, IO level 2416 can include a proper subset of nodes in the database system, such as some or all nodes that have access to stored segments and/or that are included in a segment set 35. In some cases, nodes 37 that do not store segments included in segment sets, that do not have access to stored segments, and/or that are not operable to perform row reads are not included at the IO level, but can be included at one or more inner levels 2414 and/or root level 2412.

The query executions discussed herein by nodes in accordance with executing queries at level 2416 can include retrieval of segments; extracting some or all necessary rows from the segments with some or all necessary columns; and sending these retrieved rows to a node at the next level 2410.H-1 as the query resultant generated by the node 37. For each node 37 at IO level 2416, the set of raw rows retrieved by the node 37 can be distinct from rows retrieved from all other nodes, for example, to ensure correct query execution. The total set of rows and/or corresponding columns retrieved by nodes 37 in the IO level for a given query can be dictated based on the domain of the given query, such as one or more tables indicated in one or more SELECT statements of the query, and/or can otherwise include all data blocks that are necessary to execute the given query.

Each inner level 2414 can include a subset of nodes 37 in the database system 10. Each level 2414 can include a distinct set of nodes 37 and/or some or more levels 2414 can include overlapping sets of nodes 37. The nodes 37 at inner levels are implemented, for each given query, to execute queries in conjunction with operators for the given query. For example, a query operator execution flow can be generated for a given incoming query, where an ordering of execution of its operators is determined, and this ordering is utilized to assign one or more operators of the query operator execution flow to each node in a given inner level 2414 for execution. For example, each node at a same inner level can be operable to execute a same set of operators for a given query, in response to being selected to execute the given query, upon incoming resultants generated by nodes at a directly lower level to generate its own resultants sent to a next higher level. In particular, each node at a same inner level can be operable to execute a same portion of a same query operator execution flow for a given query. In cases where there is exactly one inner level, each node selected to execute a query at a given inner level performs some or all of the given query's operators upon the raw rows received as resultants from the nodes at the IO level, such as the entire query operator execution flow and/or the portion of the query operator execution flow performed upon data that has already been read from storage by nodes at the IO level. In some cases, some operators beyond row reads are also performed by the nodes at the IO level. Each node at a given inner level 2414 can further perform a gather function to collect, union, and/or aggregate resultants sent from a previous level, for example, in accordance with one or more corresponding operators of the given query.

The root level 2412 can include exactly one node for a given query that gathers resultants from every node at the top-most inner level 2414. The node 37 at root level 2412 can perform additional query operators of the query and/or can otherwise collect, aggregate, and/or union the resultants from the top-most inner level 2414 to generate the final resultant of the query, which includes the resulting set of rows and/or one or more aggregated values, in accordance with the query, based on being performed on all rows required by the query. The root level node can be selected from a plurality of possible root level nodes, where different root nodes are selected for different queries. Alternatively, the same root node can be selected for all queries.

As depicted in FIG. 24A, resultants are sent by nodes upstream with respect to the tree structure of the query execution plan as they are generated, where the root node generates a final resultant of the query. While not depicted in FIG. 24A, nodes at a same level can share data and/or send resultants to each other, for example, in accordance with operators of the query at this same level dictating that data is sent between nodes.

In some cases, the IO level 2416 always includes the same set of nodes 37, such as a full set of nodes and/or all nodes that are in a storage cluster 35 that stores data required to process incoming queries. In some cases, the lowest inner level corresponding to level 2410.H-1 includes at least one node from the IO level 2416 in the possible set of nodes. In such cases, while each selected node in level 2410.H-1 is depicted to process resultants sent from other nodes 37 in FIG. 24A, each selected node in level 2410.H-1 that also operates as a node at the IO level further performs its own row reads in accordance with its query execution at the IO level, and gathers the row reads received as resultants from other nodes at the IO level with its own row reads for processing via operators of the query. One or more inner levels 2414 can also include nodes that are not included in IO level 2416, such as nodes 37 that do not have access to stored segments and/or that are otherwise not operable and/or selected to perform row reads for some or all queries.

The node 37 at root level 2412 can be fixed for all queries, where the set of possible nodes at root level 2412 includes only one node that executes all queries at the root level of the query execution plan. Alternatively, the root level 2412 can similarly include a set of possible nodes, where one node selected from this set of possible nodes for each query and where different nodes are selected from the set of possible nodes for different queries. In such cases, the nodes at inner level 2410.2 determine which of the set of possible root nodes to send their resultant to. In some cases, the single node or set of possible nodes at root level 2412 is a proper subset of the set of nodes at inner level 2410.2, and/or is a proper subset of the set of nodes at the IO level 2416. In cases where the root node is included at inner level 2410.2, the root node generates its own resultant in accordance with inner level 2410.2, for example, based on multiple resultants received from nodes at level 2410.3, and gathers its resultant that was generated in accordance with inner level 2410.2 with other resultants received from nodes at inner level 2410.2 to ultimately generate the final resultant in accordance with operating as the root level node.

In some cases where nodes are selected from a set of possible nodes at a given level for processing a given query, the selected node must have been selected for processing this query at each lower level of the query execution tree. For example, if a particular node is selected to process a node at a particular inner level, it must have processed the query to generate resultants at every lower inner level and the IO level. In such cases, each selected node at a particular level will always use its own resultant that was generated for processing at the previous, lower level, and will gather this resultant with other resultants received from other child nodes at the previous, lower level. Alternatively, nodes that have not yet processed a given query can be selected for processing at a particular level, where all resultants being gathered are therefore received from a set of child nodes that do not include the selected node.

The configuration of query execution plan 2405 for a given query can be determined in a downstream fashion, for example, where the tree is formed from the root downwards. Nodes at corresponding levels are determined from configuration information received from corresponding parent nodes and/or nodes at higher levels, and can each send configuration information to other nodes, such as their own child nodes, at lower levels until the lowest level is reached. This configuration information can include assignment of a particular subset of operators of the set of query operators that each level and/or each node will perform for the query. The execution of the query is performed upstream in accordance with the determined configuration, where IO reads are performed first, and resultants are forwarded upwards until the root node ultimately generates the query result.

Execution of queries via a query execution plan 2405 can be ideal as processing of the query is distributed across a plurality of nodes 37 to enable decentralized query execution. At scale, this is ideal as retrieval of large numbers of records required for a query's execution and/or processing of this large number of records via query operators required for a query's execution can be dispersed across many distinct processing modules implemented by the separate nodes 37. This reduces coordination required for query execution, where some nodes 37 do not need to coordinate with and/or do not require knowledge of other nodes 37 of the query execution plan 2405 in performing their respective portion of a query's execution. This also enables queries to be executed upon data stored in separate memories of database system 10, while not requiring all required records to be first centralized prior to query execution, as nodes 37 at IO level 2416 can retrieve records from their own memory and/or from assigned memory devices with which they communicate. This mechanism of maintaining decentralization and/or reducing coordination via implementing a query execution plan 2405 increases query efficiency.

Figure 24B:
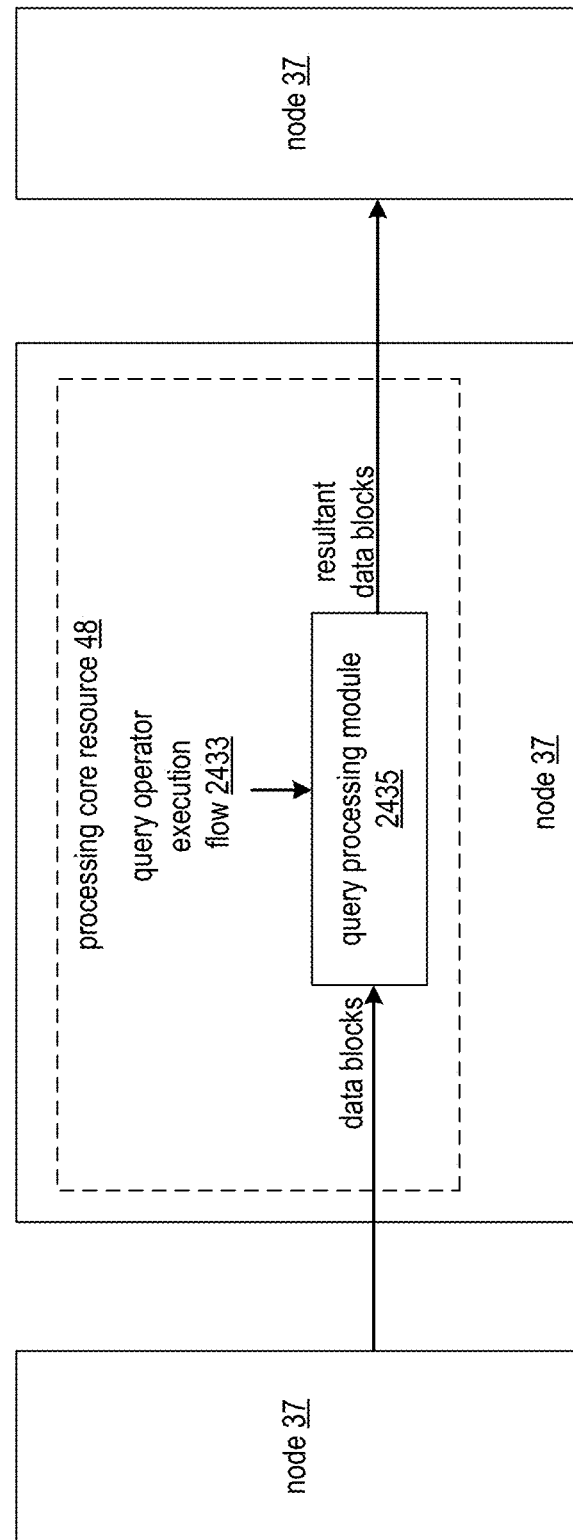
FIGS. 24B-24D are schematic block diagrams of embodiments of a node that implements a query processing module in accordance with various embodiments of the present invention.

FIG. 24B illustrates an embodiment of a node 37 executing a query in accordance with the query execution plan 2405 by implementing a query processing module 2435. The query processing module 2435 can operable to execute a query operator execution flow 2433 determined by the node 37, where the query operator execution flow 2433 corresponds to the entirety of processing of the query upon incoming data assigned to the corresponding node 37 in accordance with its role in the query execution plan 2405. This embodiment of node 37 that utilizes a query processing module 2435 can be utilized to implement some or all of the plurality of nodes 37 of some or all computing devices 18-1-18-n, for example, of the of the parallelized data store, retrieve, and/or process sub-system 12, and/or of the parallelized query and results sub-system 13.

As used herein, execution of a particular query by a particular node 37 can correspond to the execution of the portion of the particular query assigned to the particular node in accordance with full execution of the query by the plurality of nodes involved in the query execution plan 2405. This portion of the particular query assigned to a particular node can correspond to execution plurality of operators indicated by a query operator execution flow 2433. In particular, the execution of the query for a node 37 at an inner level 2414 and/or root level 2412 corresponds to generating a resultant by processing all incoming resultants received from nodes at a lower level of the query execution plan 2405 that send their own resultants to the node 37. The execution of the query for a node 37 at the IO level corresponds to generating all resultant data blocks by retrieving and/or recovering all segments assigned to the node 37.

Thus, as used herein, a node 37's full execution of a given query corresponds to only a portion of the query's execution across all nodes in the query execution plan 2405. In particular, a resultant generated by an inner level node 37's execution of a given query may correspond to only a portion of the entire query result, such as a subset of rows in a final result set, where other nodes generate their own resultants to generate other portions of the full resultant of the query. In such embodiments, a plurality of nodes at this inner level can fully execute queries on different portions of the query domain independently in parallel by utilizing the same query operator execution flow 2433. Resultants generated by each of the plurality of nodes at this inner level 2414 can be gathered into a final result of the query, for example, by the node 37 at root level 2412 if this inner level is the top-most inner level 2414 or the only inner level 2414. As another example, resultants generated by each of the plurality of nodes at this inner level 2414 can be further processed via additional operators of a query operator execution flow 2433 being implemented by another node at a consecutively higher inner level 2414 of the query execution plan 2405, where all nodes at this consecutively higher inner level 2414 all execute their own same query operator execution flow 2433.

As discussed in further detail herein, the resultant generated by a node 37 can include a plurality of resultant data blocks generated via a plurality of partial query executions. As used herein, a partial query execution performed by a node corresponds to generating a resultant based on only a subset of the query input received by the node 37. In particular, the query input corresponds to all resultants generated by one or more nodes at a lower level of the query execution plan that send their resultants to the node. However, this query input can correspond to a plurality of input data blocks received over time, for example, in conjunction with the one or more nodes at the lower level processing their own input data blocks received over time to generate their resultant data blocks sent to the node over time. Thus, the resultant generated by a node's full execution of a query can include a plurality of resultant data blocks, where each resultant data block is generated by processing a subset of all input data blocks as a partial query execution upon the subset of all data blocks via the query operator execution flow 2433.

As illustrated in FIG. 24B, the query processing module 2435 can be implemented by a single processing core resource 48 of the node 37. In such embodiments, each one of the processing core resources 48-1-48-n of a same node 37 can be executing at least one query concurrently via their own query processing module 2435, where a single node 37 implements each of set of operator processing modules 2435-1-2435-*n* via a corresponding one of the set of processing core resources 48-1-48-*n*. A plurality of queries can be concurrently executed by the node 37, where each of its processing core resources 48 can each independently execute at least one query within a same temporal period by utilizing a corresponding at least one query operator execution flow 2433 to generate at least one query resultant corresponding to the at least one query.

Figure 24C:
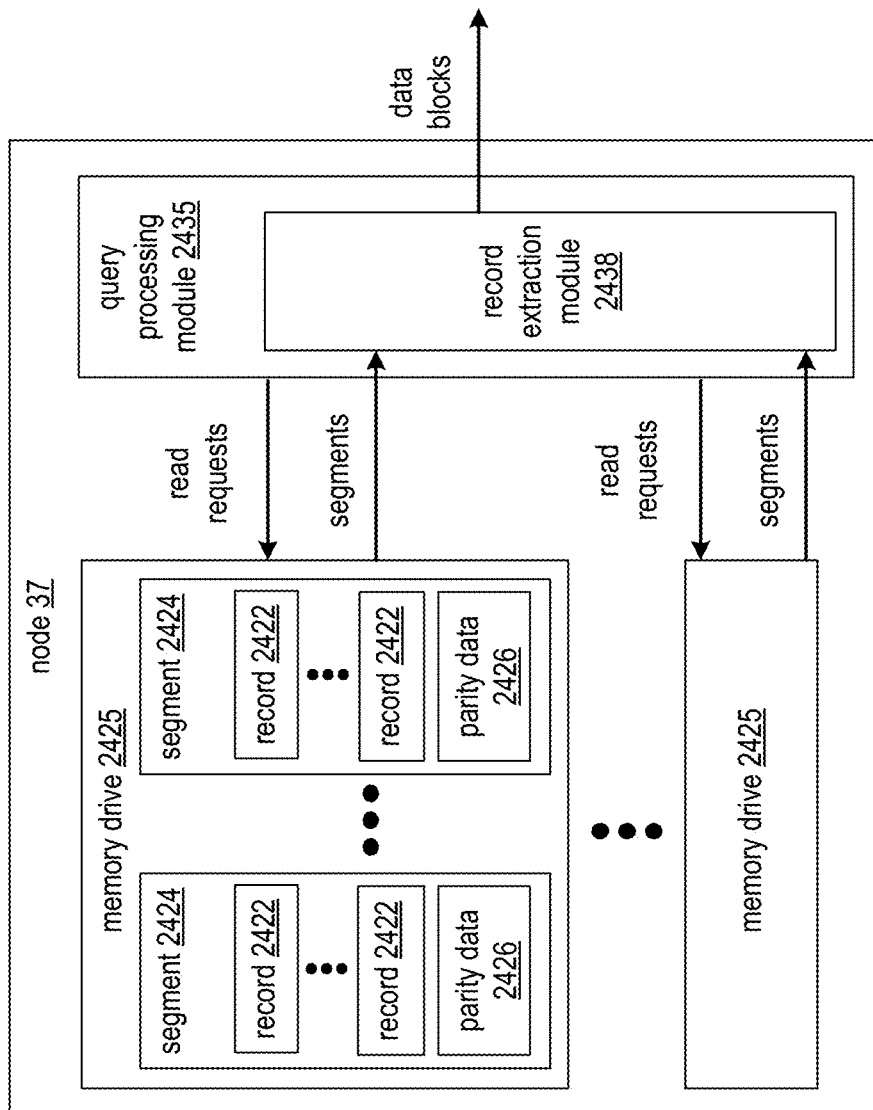

FIG. 24C illustrates a particular example of a node 37 at the IO level 2416 of the query execution plan 2405 of FIG. 24A. A node 37 can utilize its own memory resources, such as some or all of its disk memory 38 and/or some or all of its main memory 40 to implement at least one memory drive 2425 that stores a plurality of segments 2424. Memory drives 2425 of a node 37 can be implemented, for example, by utilizing disk memory 38 and/or main memory 40. In particular, a plurality of distinct memory drives 2425 of a node 37 can be implemented via the plurality of memory devices 42-1-42-*n* of the node 37's disk memory 38.

Each segment 2424 stored in memory drive 2425 can be generated as discussed previously in conjunction with FIGS. 15-23. A plurality of records 2422 can be included in and/or extractable from the segment, for example, where the plurality of records 2422 of a segment 2424 correspond to a plurality of rows designated for the particular segment 2424 prior to applying the redundancy storage coding scheme as illustrated in FIG. 17. The records 2422 can be included in data of segment 2424, for example, in accordance with a column-format and/or other structured format. Each segments 2424 can further include parity data 2426 as discussed previously to enable other segments 2424 in the same segment group to be recovered via applying a decoding function associated with the redundancy storage coding scheme, such as a RAID scheme and/or erasure coding scheme, that was utilized to generate the set of segments of a segment group.

Thus, in addition to performing the first stage of query execution by being responsible for row reads, nodes 37 can be utilized for database storage, and can each locally store a set of segments in its own memory drives 2425. In some cases, a node 37 can be responsible for retrieval of only the records stored in its own one or more memory drives 2425 as one or more segments 2424. Executions of queries corresponding to retrieval of records stored by a particular node 37 can be assigned to that particular node 37. In other embodiments, a node 37 does not use its own resources to store segments. A node 37 can access its assigned records for retrieval via memory resources of another node 37 and/or via other access to memory drives 2425, for example, by utilizing system communication resources 14.

The query processing module 2435 of the node 37 can be utilized to read the assigned by first retrieving or otherwise accessing the corresponding redundancy-coded segments 2424 that include the assigned records its one or more memory drives 2425. Query processing module 2435 can include a record extraction module 2438 that is then utilized to extract or otherwise read some or all records from these segments 2424 accessed in memory drives 2425, for example, where record data of the segment is segregated from other information such as parity data included in the segment and/or where this data containing the records is converted into row-formatted records from the column-formatted record data stored by the segment. Once the necessary records of a query are read by the node 37, the node can further utilize query processing module 2435 to send the retrieved records all at once, or in a stream as they are retrieved from memory drives 2425, as data blocks to the next node 37 in the query execution plan 2405 via system communication resources 14 or other communication channels.

Figure 24D:
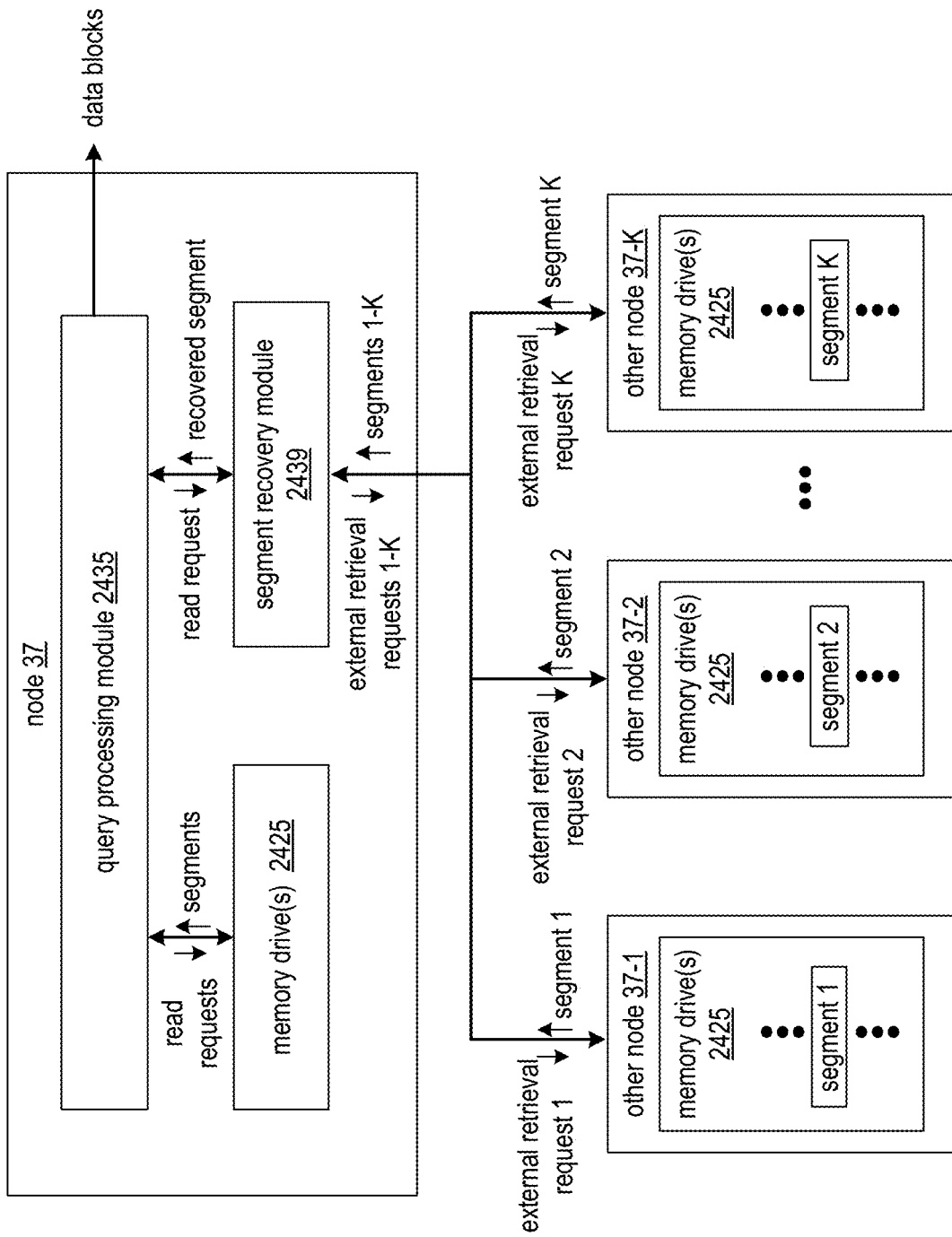

FIG. 24D illustrates an embodiment of a node 37 that implements a segment recovery module 2439 to recover some or all segments that are assigned to the node for retrieval, in accordance with processing one or more queries, that are unavailable. Some or all features of the node 37 of FIG. 24D can be utilized to implement the node 37 of FIGS. 24B and 24C, and/or can be utilized to implement one or more nodes 37 of the query execution plan 2405 of FIG. 24A, such as nodes 37 at the IO level 2416. A node 37 may store segments on one of its own memory drives 2425 that becomes unavailable, or otherwise determines that a segment assigned to the node for execution of a query is unavailable for access via a memory drive the node 37 accesses via system communication resources 14. The segment recovery module 2439 can be implemented via at least one processing module of the node 37, such as resources of central processing module 39. The segment recovery module 2439 can retrieve the necessary number of segments 1-K in the same segment group as an unavailable segment from other nodes 37, such as a set of other nodes 37-1-37-K that store segments in the same storage cluster 35. Using system communication resources 14 or other communication channels, a set of external retrieval requests 1-K for this set of segments 1-K can be sent to the set of other nodes 37-1-37-K, and the set of segments can be received in response. This set of K segments can be processed, for example, where a decoding function is applied based on the redundancy storage coding scheme utilized to generate the set of segments in the segment group and/or parity data of this set of K segments is otherwise utilized to regenerate the unavailable segment. The necessary records can then be extracted from the unavailable segment, for example, via the record extraction module 2438, and can be sent as data blocks to another node 37 for processing in conjunction with other records extracted from available segments retrieved by the node 37 from its own memory drives 2425.

Note that the embodiments of node 37 discussed herein can be configured to execute multiple queries concurrently by communicating with nodes 37 in the same or different tree configuration of corresponding query execution plans and/or by performing query operations upon data blocks and/or read records for different queries. In particular, incoming data blocks can be received from other nodes for multiple different queries in any interleaving order, and a plurality of operator executions upon incoming data blocks for multiple different queries can be performed in any order, where output data blocks are generated and sent to the same or different next node for multiple different queries in any interleaving order. IO level nodes can access records for the same or different queries any interleaving order. Thus, at a given point in time, a node 37 can have already begun its execution of at least two queries, where the node 37 has also not yet completed its execution of the at least two queries.

A query execution plan 2405 can guarantee query correctness based on assignment data sent to or otherwise communicated to all nodes at the IO level ensuring that the set of required records in query domain data of a query, such as one or more tables required to be accessed by a query, are accessed exactly one time: if a particular record is accessed multiple times in the same query and/or is not accessed, the query resultant cannot be guaranteed to be correct. Assignment data indicating segment read and/or record read assignments to each of the set of nodes 37 at the IO level can be generated, for example, based on being mutually agreed upon by all nodes 37 at the IO level via a consensus protocol executed between all nodes at the IO level and/or distinct groups of nodes 37 such as individual storage clusters 35. The assignment data can be generated such that every record in the database system and/or in query domain of a particular query is assigned to be read by exactly one node 37. Note that the assignment data may indicate that a node 37 is assigned to read some segments directly from memory as illustrated in FIG. 24C and is assigned to recover some segments via retrieval of segments in the same segment group from other nodes 37 and via applying the decoding function of the redundancy storage coding scheme as illustrated in FIG. 24D.

Assuming all nodes 37 read all required records and send their required records to exactly one next node 37 as designated in the query execution plan 2405 for the given query, the use of exactly one instance of each record can be guaranteed. Assuming all inner level nodes 37 process all the required records received from the corresponding set of nodes 37 in the IO level 2416, via applying one or more query operators assigned to the node in accordance with their query operator execution flow 2433, correctness of their respective partial resultants can be guaranteed. This correctness can further require that nodes 37 at the same level intercommunicate by exchanging records in accordance with JOIN operations as necessary, as records received by other nodes may be required to achieve the appropriate result of a JOIN operation. Finally, assuming the root level node receives all correctly generated partial resultants as data blocks from its respective set of nodes at the penultimate, highest inner level 2414 as designated in the query execution plan 2405, and further assuming the root level node appropriately generates its own final resultant, the correctness of the final resultant can be guaranteed.

In some embodiments, each node 37 in the query execution plan can monitor whether it has received all necessary data blocks to fulfill its necessary role in completely generating its own resultant to be sent to the next node 37 in the query execution plan. A node 37 can determine receipt of a complete set of data blocks that was sent from a particular node 37 at an immediately lower level, for example, based on being numbered and/or have an indicated ordering in transmission from the particular node 37 at the immediately lower level, and/or based on a final data block of the set of data blocks being tagged in transmission from the particular node 37 at the immediately lower level to indicate it is a final data block being sent. A node 37 can determine the required set of lower level nodes from which it is to receive data blocks based on its knowledge of the query execution plan 2405 of the query. A node 37 can thus conclude when complete set of data blocks has been received each designated lower level node in the designated set as indicated by the query execution plan 2405. This node 37 can therefore determine itself that all required data blocks have been processed into data blocks sent by this node 37 to the next node 37 and/or as a final resultant if this node 37 is the root node. This can be indicated via tagging of its own last data block, corresponding to the final portion of the resultant generated by the node, where it is guaranteed that all appropriate data was received and processed into the set of data blocks sent by this node 37 in accordance with applying its own query operator execution flow 2433.

In some embodiments, if any node 37 determines it did not receive all of its required data blocks, the node 37 itself cannot fulfill generation of its own set of required data blocks. For example, the node 37 will not transmit a final data block tagged as the "last" data block in the set of outputted data blocks to the next node 37, and the next node 37 will thus conclude there was an error and will not generate a full set of data blocks itself. The root node, and/or these intermediate nodes that never received all their data and/or never fulfilled their generation of all required data blocks, can independently determine the query was unsuccessful. In some cases, the root node, upon determining the query was unsuccessful, can initiate re-execution of the query by re-establishing the same or different query execution plan 2405 in a downward fashion as described previously, where the nodes 37 in this re-established query execution plan 2405 execute the query accordingly as though it were a new query. For example, in the case of a node failure that caused the previous query to fail, the new query execution plan 2405 can be generated to include only available nodes where the node that failed is not included in the new query execution plan 2405.

Figure 24E:
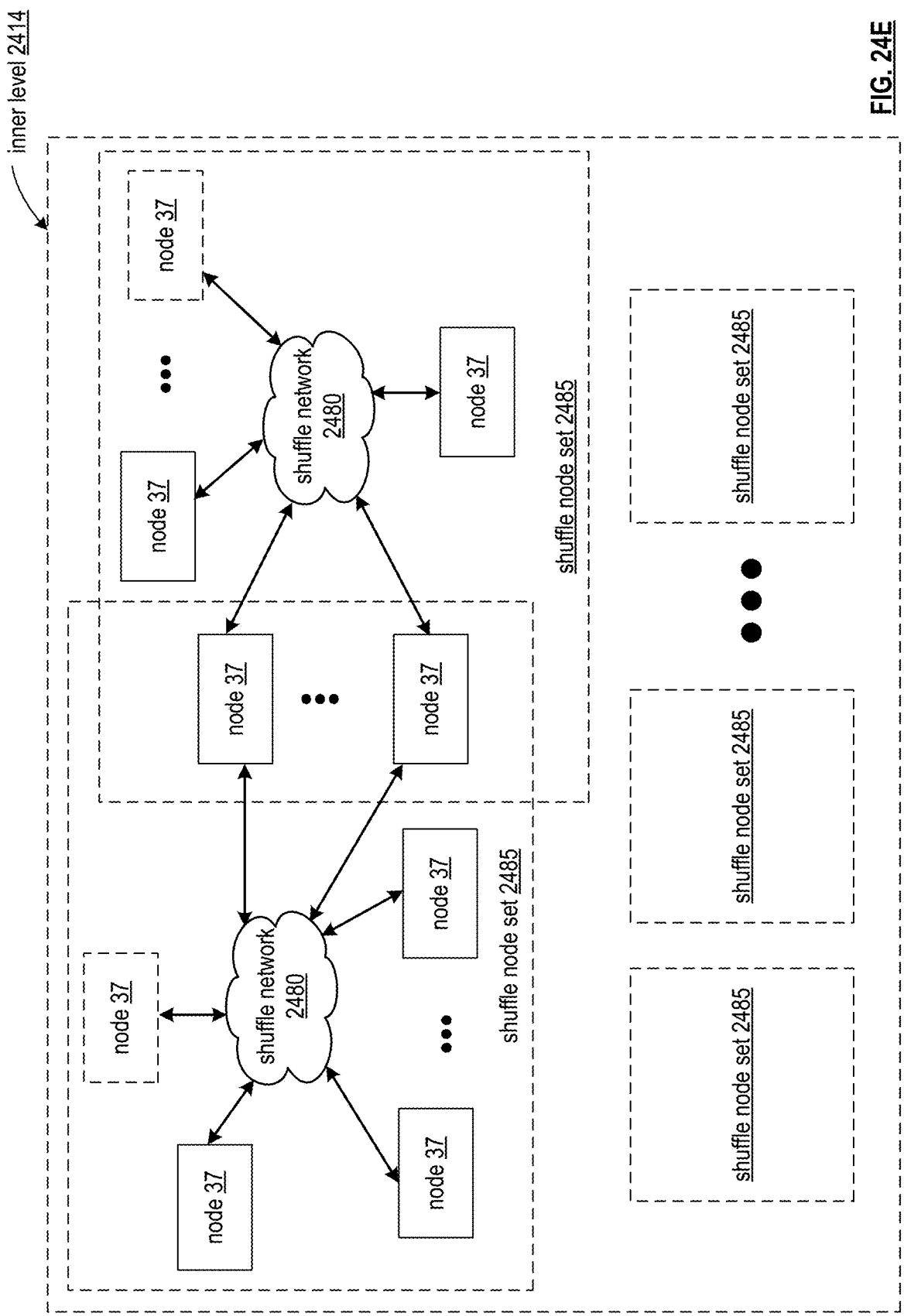
FIG. 24E is a schematic block diagram of shuffle node sets of a query execution plan in accordance with various embodiments of the present invention.

FIG. 24E illustrates an embodiment of an inner level 2414 that includes at least one shuffle node set 2485 of the plurality of nodes assigned to the corresponding inner level. A shuffle node set 2485 can include some or all of a plurality of nodes assigned to the corresponding inner level, where all nodes in the shuffle node set 2485 are assigned to the same inner level. In some cases, a shuffle node set 2485 can include nodes assigned to different levels 2410 of a query execution plan. A shuffle node set 2485 at a given time can include some nodes that are assigned to the given level, but are not participating in a query at that given time, as denoted with dashed outlines and as discussed in conjunction with FIG. 24A. For example, while a given one or more queries are being executed by nodes in the database system 10, a shuffle node set 2485 can be static, regardless of whether all of its members are participating in a given query at that time. In other cases, shuffle node set 2485 only includes nodes assigned to participate in a corresponding query, where different queries that are concurrently executing and/or executing in distinct time periods have different shuffle node sets 2485 based on which nodes are assigned to participate in the corresponding query execution plan. While FIG. 24E depicts multiple shuffle node sets 2485 of an inner level 2414, in some cases, an inner level can include exactly one shuffle node set, for example, that includes all possible nodes of the corresponding inner level 2414 and/or all participating nodes of the of the corresponding inner level 2414 in a given query execution plan.

While FIG. 24E depicts that different shuffle node sets 2485 can have overlapping nodes 37, in some cases, each shuffle node set 2485 includes a distinct set of nodes, for example, where the shuffle node sets 2485 are mutually exclusive. In some cases, the shuffle node sets 2485 are collectively exhaustive with respect to the corresponding inner level 2414, where all possible nodes of the inner level 2414, or all participating nodes of a given query execution plan at the inner level 2414, are included in at least one shuffle node set 2485 of the inner level 2414. If the query execution plan has multiple inner levels 2414, each inner level can include one or more shuffle node sets 2485. In some cases, a shuffle node set 2485 can include nodes from different inner levels 2414, or from exactly one inner level 2414. In some cases, the root level 2412 and/or the IO level 2416 have nodes included in shuffle node sets 2485. In some cases, the query execution plan 2405 includes and/or indicates assignment of nodes to corresponding shuffle node sets 2485 in addition to assigning nodes to levels 2410, where nodes 37 determine their participation in a given query as participating in one or more levels 2410 and/or as participating in one or more shuffle node sets 2485, for example, via downward propagation of this information from the root node to initiate the query execution plan 2405 as discussed previously.

The shuffle node sets 2485 can be utilized to enable transfer of information between nodes, for example, in accordance with performing particular operations in a given query that cannot be performed in isolation. For example, some queries require that nodes 37 receive data blocks from its children nodes in the query execution plan for processing, and that the nodes 37 additionally receive data blocks from other nodes at the same level 2410. In particular, query operations such as JOIN operations of a SQL query expression may necessitate that some or all additional records that were access in accordance with the query be processed in tandem to guarantee a correct resultant, where a node processing only the records retrieved from memory by its child IO nodes is not sufficient.

In some cases, a given node 37 participating in a given inner level 2414 of a query execution plan may send data blocks to some or all other nodes participating in the given inner level 2414, where these other nodes utilize these data blocks received from the given node to process the query via their query processing module 2435 by applying some or all operators of their query operator execution flow 2433 to the data blocks received from the given node. In some cases, a given node 37 participating in a given inner level 2414 of a query execution plan may receive data blocks to some or all other nodes participating in the given inner level 2414, where the given node utilizes these data blocks received from the other nodes to process the query via their query processing module 2435 by applying some or all operators of their query operator execution flow 2433 to the received data blocks.

This transfer of data blocks can be facilitated via a shuffle network 2480 of a corresponding shuffle node set 2485. Nodes in a shuffle node set 2485 can exchange data blocks in accordance with executing queries, for example, for execution of particular operators such as JOIN operators of their query operator execution flow 2433 by utilizing a corresponding shuffle network 2480. The shuffle network 2480 can correspond to any wired and/or wireless communication network that enables bidirectional communication between any nodes 37 communicating with the shuffle network 2480. In some cases, the nodes in a same shuffle node set 2485 are operable to communicate with some or all other nodes in the same shuffle node set 2485 via a direct communication link of shuffle network 2480, for example, where data blocks can be routed between some or all nodes in a shuffle network 2480 without necessitating any relay nodes 37 for routing the data blocks. In some cases, the nodes in a same shuffle set can broadcast data blocks.

In some cases, some nodes in a same shuffle node set 2485 do not have direct links via shuffle network 2480 and/or cannot send or receive broadcasts via shuffle network 2480 to some or all other nodes 37. For example, at least one pair of nodes in the same shuffle node set cannot communicate directly. In some cases, some pairs of nodes in a same shuffle node set can only communicate by routing their data via at least one relay node 37. For example, two nodes in a same shuffle node set that do not have a direct communication link and/or cannot communicate via broadcasting their data blocks. However, if these two nodes in a same shuffle node set can each communicate with a same third node via corresponding direct communication links and/or via broadcast, this third node can serve as a relay node to facilitate communication between the two nodes. Nodes that are "further apart" in the shuffle network 2480 may require multiple relay nodes.

Thus, the shuffle network 2480 can facilitate communication between all nodes 37 in the corresponding shuffle node set 2485 by utilizing some or all nodes 37 in the corresponding shuffle node set 2485 as relay nodes, where the shuffle network 2480 is implemented by utilizing some or all nodes in the nodes shuffle node set 2485 and a corresponding set of direct communication links between pairs of nodes in the shuffle node set 2485 to facilitate data transfer between any pair of nodes in the shuffle node set 2485. Note that these relay nodes facilitating data blocks for execution of a given query within a shuffle node sets 2485 to implement shuffle network 2480 can be nodes participating in the query execution plan of the given query and/or can be nodes that are not participating in the query execution plan of the given query. In some cases, these relay nodes facilitating data blocks for execution of a given query within a shuffle node sets 2485 are strictly nodes participating in the query execution plan of the given query. In some cases, these relay nodes facilitating data blocks for execution of a given query within a shuffle node sets 2485 are strictly nodes that are not participating in the query execution plan of the given query.

Different shuffle node sets 2485 can have different shuffle networks 2480. These different shuffle networks 2480 can be isolated, where nodes only communicate with other nodes in the same shuffle node sets 2485 and/or where shuffle node sets 2485 are mutually exclusive. For example, data block exchange for facilitating query execution can be localized within a particular shuffle node set 2485, where nodes of a particular shuffle node set 2485 only send and receive data from other nodes in the same shuffle node set 2485, and where nodes in different shuffle node sets 2485 do not communicate directly and/or do not exchange data blocks at all. In some cases, where the inner level includes exactly one shuffle network, all nodes 37 in the inner level can and/or must exchange data blocks with all other nodes in the inner level via the shuffle node set via a single corresponding shuffle network 2480.

Alternatively, some or all of the different shuffle networks 2480 can be interconnected, where nodes can and/or must communicate with other nodes in different shuffle node sets 2485 via connectivity between their respective different shuffle networks 2480 to facilitate query execution. As a particular example, in cases where two shuffle node sets 2485 have at least one overlapping node 37, the interconnectivity can be facilitated by the at least one overlapping node 37, for example, where this overlapping node 37 serves as a relay node to relay communications from at least one first node in a first shuffle node sets 2485 to at least one second node in a second first shuffle node set 2485. In some cases, all nodes 37 in a shuffle node set 2485 can communicate with any other node in the same shuffle node set 2485 via a direct link enabled via shuffle network 2480 and/or by otherwise not necessitating any intermediate relay nodes. However, these nodes may still require one or more relay nodes, such as nodes included in multiple shuffle node sets 2485, to communicate with nodes in other shuffle node sets 2485, where communication is facilitated across multiple shuffle node sets 2485 via direct communication links between nodes within each shuffle node set 2485.

Note that these relay nodes facilitating data blocks for execution of a given query across multiple shuffle node sets 2485 can be nodes participating in the query execution plan of the given query and/or can be nodes that are not participating in the query execution plan of the given query. In some cases, these relay nodes facilitating data blocks for execution of a given query across multiple shuffle node sets 2485 are strictly nodes participating in the query execution plan of the given query. In some cases, these relay nodes facilitating data blocks for execution of a given query across multiple shuffle node sets 2485 are strictly nodes that are not participating in the query execution plan of the given query.

In some cases, a node 37 has direct communication links with its child node and/or parent node, where no relay nodes are required to facilitate sending data to parent and/or child nodes of the query execution plan 2405 of FIG. 24A. In other cases, at least one relay node may be required to facilitate communication across levels, such as between a parent node and child node as dictated by the query execution plan. Such relay nodes can be nodes within a and/or different same shuffle network as the parent node and child node, and can be nodes participating in the query execution plan of the given query and/or can be nodes that are not participating in the query execution plan of the given query.

Figure 25A:
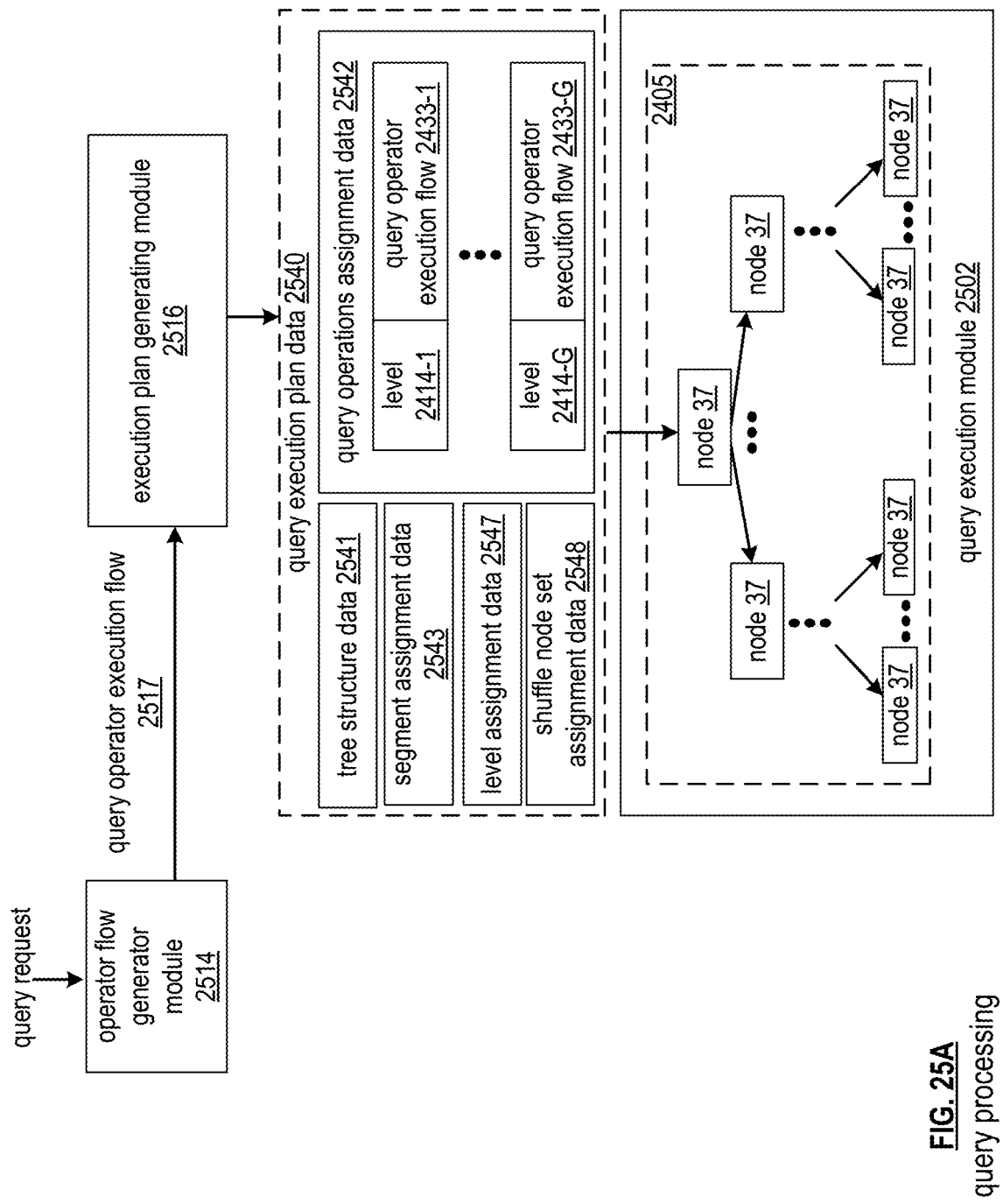
FIG. 25A is a schematic block diagram of a query processing system in accordance with various embodiments of the present invention.

FIG. 25A illustrates an embodiment of a query processing system 2510 that generates query execution plan data 2540 to be communicated to nodes 37 of the corresponding query execution plan to indicate instructions regarding their participation in the query execution plan 2405. The query processing system 2510 can be utilized to implement, for example, the parallelized query and/or response sub-system 13 and/or the parallelized data store, retrieve, and/or process subsystem 12. The query processing system 2510 can be implemented by utilizing at least one computing device 18, for example, by utilizing at least one central processing module 39 of at least one node 37 utilized to implement the query processing system 2510. The query processing system 2510 can be implemented utilizing any processing module and/or memory of the database system 10, for example, communicating with the database system 10 via system communication resources 14.

As illustrated in FIG. 25A, an operator flow generator module 2514 of the query processing system 2510 can be utilized to generate a query operator execution flow 2517 for the query indicated in a query request. This can be generated based on a query expression indicated in the query request, based on a plurality of query operators indicated in the query expression and their respective sequential, parallelized, and/or nested ordering in the query expression, and/or based on optimizing the execution of the plurality of operators of the query expression. This query operator execution flow 2517 can include and/or be utilized to determine the query operator execution flow 2433 assigned to nodes 37 at one or more particular levels of the query execution plan 2405 and/or can include the operator execution flow to be implemented across a plurality of nodes 37, for example, based on a query expression indicated in the query request and/or based on optimizing the execution of the query expression.

In some cases, the operator flow generator module 2514 implements an optimizer to select the query operator execution flow 2517 based on determining the query operator execution flow 2517 is a most efficient and/or otherwise most optimal one of a set of query operator execution flow options and/or that arranges the operators in the query operator execution flow 2517 such that the query operator execution flow 2517 compares favorably to a predetermined efficiency threshold. For example, the operator flow generator module 2514 selects and/or arranges the plurality of operators of the query operator execution flow 2517 to implement the query expression in accordance with performing optimizer functionality, for example, by perform a deterministic function upon the query expression to select and/or arrange the plurality of operators in accordance with the optimizer functionality. This can be based on known and/or estimated processing times of different types of operators. This can be based on known and/or estimated levels of record filtering that will be applied by particular filtering parameters of the query. This can be based on selecting and/or deterministically utilizing a conjunctive normal form and/or a disjunctive normal form to build the query operator execution flow 2517 from the query expression. This can be based on selecting a determining a first possible serial ordering of a plurality of operators to implement the query expression based on determining the first possible serial ordering of the plurality of operators is known to be or expected to be more efficient than at least one second possible serial ordering of the same or different plurality of operators that implements the query expression. This can be based on ordering a first operator before a second operator in the query operator execution flow 2517 based on determining executing the first operator before the second operator results in more efficient execution than executing the second operator before the first operator. For example, the first operator is known to filter the set of records upon which the second operator would be performed to improve the efficiency of performing the second operator due to being executed upon a smaller set of records than if performed before the first operator. This can be based on other optimizer functionality that otherwise selects and/or arranges the plurality of operators of the query operator execution flow 2517 based on other known, estimated, and/or otherwise determined criteria.

An execution plan generating module 2516 can utilize the query operator execution flow 2517 to generate query execution plan data 2540. The query execution plan data 2540 that is generated can be communicated to nodes 37 in the corresponding query execution plan 2405, for example, in the downward fashion in conjunction with determining the corresponding tree structure and/or in conjunction with the node assignment to the corresponding tree structure for execution of the query as discussed previously. Nodes 37 can thus determine their assigned participation, placement, and/or role in the query execution plan accordingly, for example, based on receiving and/or otherwise determining the corresponding query execution plan data 2540, and/or based on processing the tree structure data 2541, query operations assignment data 2542, segment assignment data 2543, level assignment data 2547, and/or shuffle node set assignment data of the received query execution plan data 2540.

The query execution plan data 2540 can indicate tree structure data 2541, for example, indicating child nodes and/or parent nodes of each node 37, indicating which nodes each node 37 is responsible for communicating data block and/or other metadata with in conjunction with the query execution plan 2405, and/or indicating the set of nodes included in the query execution plan 2405 and/or their assigned placement in the query execution plan 2405 with respect to the tree structure. The query execution plan data 2540 can alternatively or additionally indicate segment assignment data 2543 indicating a set of segments and/or records required for the query and/or indicating which nodes at the IO level 2416 of the query execution plan 2405 are responsible for accessing which distinct subset of segments and/or records of the required set of segments and/or records. The query execution plan data 2540 can alternatively or additionally indicate level assignment data 2547 indicating which one or more levels each node 37 is assigned to in the query execution plan 2405. The query execution plan data 2540 can alternatively or additionally indicate shuffle node set assignment data 2548 indicating assignment of nodes 37 to participate in one or more shuffle node sets 2485 as discussed in conjunction with FIG. 24E.

The query execution plan can alternatively or additionally indicate query operations assignment data 2542, for example, based on the query operator execution flow 2517. This can indicate how the query operator execution flow 2517 is to be subdivided into different levels of the query execution plan 2405, and/or can indicate assignment of particular query operator execution flows 2433 to some or all nodes 37 in the query execution plan 2405 based on the overall query operator execution flow 2517. As a particular example, a plurality of query operator execution flows 2433-1-2433-G are indicated to be executed by some or all nodes 37 participating in corresponding inner levels 2414-1-2414-G of the query execution plan. For example, the plurality of query operator execution flows 2433-1-2433-G correspond to distinct serial portions of the query operator execution flow 2517 and/or otherwise renders execution of the full query operator execution flow 2517 when these query operator execution flows 2433 are executed by nodes 37 at the corresponding levels 2414-1-2414-G. If the query execution plan 2405 has exactly one inner level 2414, the query operator execution flow 2433 assigned to nodes 37 at the exactly one inner level 2414 can correspond to the entire query operator execution flow 2517 generated for the query.

A query execution module 2502 of the query processing system 2510 can include a plurality of nodes 37 that implement the resulting query execution plan 2405 in accordance with the query execution plan data 2540 generated by the execution plan generating module 2516. Nodes 37 of the query execution module 2502 can each execute their assigned portion query to produce data blocks as discussed previously, starting from TO level nodes propagating their data blocks upwards until the root level node processes incoming data blocks to generate the query resultant, where inner level nodes execute their respective query operator execution flow 2433 upon incoming data blocks to generate their output data blocks. The query execution module 2502 can be utilized to implement the parallelized query and results sub-system 13 and/or the parallelized data store, receive and/or process sub-system 12.

Figure 25B:
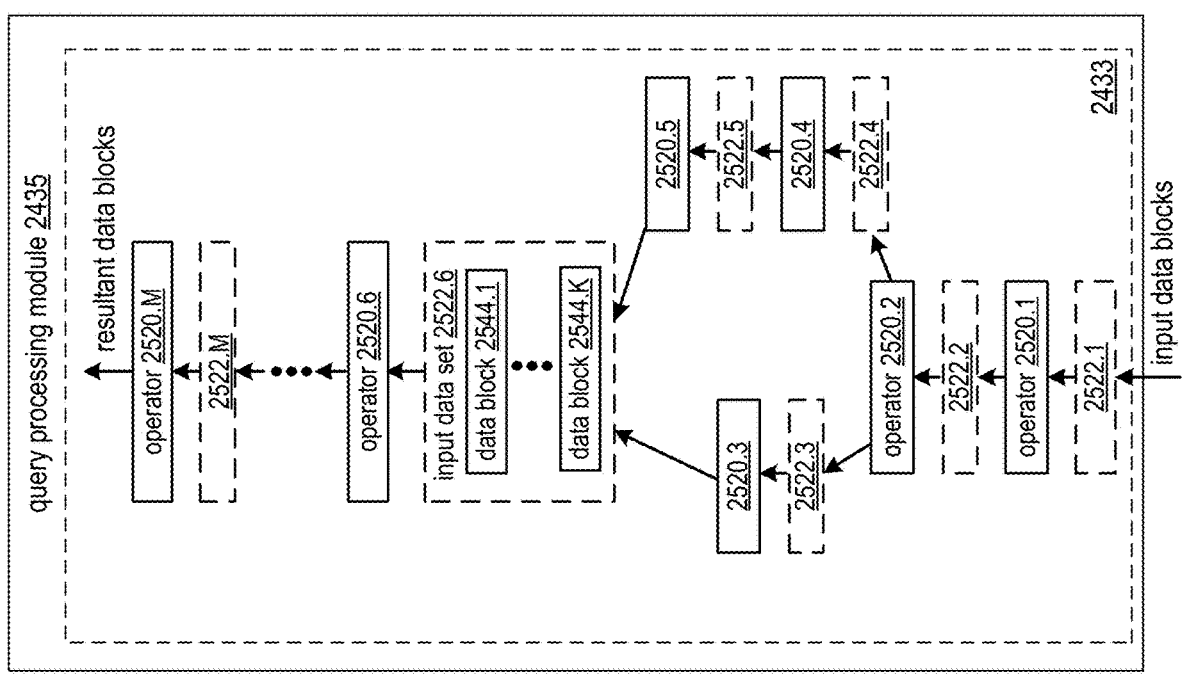
FIG. 25B is a schematic block diagram of a query operator execution flow in accordance with various embodiments of the present invention.

FIG. 25B presents an example embodiment of a query processing module 2435 of a node 37 that executes a query's query operator execution flow 2433. The query processing module 2435 of FIG. 25B can be utilized to implement the query processing module 2435 of node 37 in FIG. 24B and/or to implement some or all nodes 37 at inner levels 2414 of a query execution plan 2405 of FIG. 24A and/or implemented by the query execution module 2502 of FIG. 25A.

Each node 37 can determine the query operator execution flow 2433 for its execution of a given query based on receiving and/or determining the query execution plan data 2540 of the given query. For example, each node 37 determines its given level 2410 of the query execution plan 2405 in which it is assigned to participate based on the level assignment data 2547 of the query execution plan data 2540. Each node 37 further determines the query operator execution flow 2433 corresponding to its given level in the query execution plan data 2540. Each node 37 can otherwise determines the query operator execution flow 2433 to be implemented based on the query execution plan data 2540, for example, where the query operator execution flow 2433 is some or all of the full query operator execution flow 2517 of the given query.

The query processing module 2435 of node 37 can executes the determined query operator execution flow 2433 by performing a plurality of operator executions of operators 2520 of its query operator execution flow 2433 in a corresponding plurality of sequential operator execution steps. Each operator execution step 2540 of the plurality of sequential operator execution steps corresponds to execution of a particular operator 2520 of a plurality of operators 2520-1-2520-M of a query operator execution flow 2433. In some embodiments, the query processing module 2435 is implemented by a single node 37, where some or all nodes 37 such as some or all inner level nodes 37 utilize the query processing module 2435 as discussed in conjunction with FIG. 24B to generate output data blocks to be sent to other nodes 37 and/or to generate the final resultant by applying the query operator execution flow 2433 to input data blocks received from other nodes and/or retrieved from memory as read and/or recovered records. In such cases, the entire query operator execution flow 2517 determined for the query as a whole can be segregated into multiple query operator execution flows 2433 that are each assigned to the nodes of each of a corresponding set of inner levels 2414 of the query execution plan 2405, where all nodes at the same level execute the same query operator execution flows 2433 upon different received input data blocks. In some cases, the query operator execution flows 2433 applied by each node 37 includes the entire query operator execution flow 2517, for example, when the query execution plan includes exactly one inner level 2414. In other embodiments, the query processing module 2435 is otherwise implemented by at least one processing module the query execution module 2502 to execute a corresponding query, for example, to perform the entire query operator execution flow 2517 of the query as a whole.

The query processing module 2435 to performs a single operator execution by executing one of the plurality of operators of the query operator execution flow 2433. As used herein, an operator execution corresponds to executing one operator 2520 of the query operator execution flow 2433 on one or more pending data blocks 2544 in an operator input data set 2522 of the operator 2520. The operator input data set 2522 of a particular operator 2520 includes data blocks that were outputted by execution of one or more other operators 2520 that are immediately below the particular operator in a serial ordering of the plurality of operators of the query operator execution flow 2433. In particular, the pending data blocks 2544 in the operator input data set 2522 were outputted by the one or more other operators 2520 that are immediately below the particular operator via one or more corresponding operator executions of one or more previous operator execution steps in the plurality of sequential operator execution steps. Pending data blocks 2544 of an operator input data set 2522 can be ordered, for example as an ordered queue, based on an ordering in which the pending data blocks 2544 are received by the operator input data set 2522. Alternatively, an operator input data set 2522 is implemented as an unordered set of pending data blocks 2544.

If the particular operator 2520 is executed for a given one of the plurality of sequential operator execution steps, some or all of the pending data blocks 2544 in this particular operator 2520's operator input data set 2522 are processed by the particular operator 2520 via execution of the operator to generate one or more output data blocks. For example, the input data blocks can indicate a plurality of rows, and the operation can be a SELECT operator indicating a simple predicate. The output data blocks can include only proper subset of the plurality of rows that meet the condition specified by the simple predicate.

Once a particular operator 2520 has performed an execution upon a given data block 2544 to generate one or more output data blocks, this data block is removed from the operator's operator input data set 2522. In some cases, an operator selected for execution is automatically is executed upon all pending data blocks 2544 in its operator input data set 2522 for the corresponding operator execution step. In this case, an operator input data set 2522 of a particular operator 2520 is therefore empty immediately after the particular operator 2520 is executed. The data blocks outputted by the executed data block are appended to an operator input data set 2522 of an immediately next operator 2520 in the serial ordering of the plurality of operators of the query operator execution flow 2433, where this immediately next operator 2520 will be executed upon its data blocks once selected for execution in a subsequent one of the plurality of sequential operator execution steps.

Operator 2520.1 can correspond to a bottom-most operator 2520 in the serial ordering of the plurality of operators 2520.1-2520.M. As depicted in FIG. 25A, operator 2520.1 has an operator input data set 2522.1 that is populated by data blocks received from another node as discussed in conjunction with FIG. 24B, such as a node at the IO level of the query execution plan 2405. Alternatively these input data blocks can be read by the same node 37 from storage, such as one or more memory devices that store segments that include the rows required for execution of the query. In some cases, the input data blocks are received as a stream over time, where the operator input data set 2522.1 may only include a proper subset of the full set of input data blocks required for execution of the query at a particular time due to not all of the input data blocks having been read and/or received, and/or due to some data blocks having already been processed via execution of operator 2520.1. In other cases, these input data blocks are read and/or retrieved by performing a read operator or other retrieval operation indicated by operator 2520.

Note that in the plurality of sequential operator execution steps utilized to execute a particular query, some or all operators will be executed multiple times, in multiple corresponding ones of the plurality of sequential operator execution steps. In particular, each of the multiple times a particular operator 2520 is executed, this operator is executed on set of pending data blocks 2544 that are currently in their operator input data set 2522, where different ones of the multiple executions correspond to execution of the particular operator upon different sets of data blocks that are currently in their operator queue at corresponding different times.

As a result of this mechanism of processing data blocks via operator executions performed over time, at a given time during the query's execution by the node 37, at least one of the plurality of operators 2520 has an operator input data set 2522 that includes at least one data block 2544. At this given time, one more other ones of the plurality of operators 2520 can have input data sets 2522 that are empty. For example, an given operator's operator input data set 2522 can be empty as a result of one or more immediately prior operators 2520 in the serial ordering not having been executed yet, and/or as a result of the one or more immediately prior operators 2520 not having been executed since a most recent execution of the given operator.

Some types of operators 2520, such as JOIN operators or aggregating operators such as SUM, AVERAGE, MAXIMUM, or MINIMUM operators, require knowledge of the full set of rows that will be received as output from previous operators to correctly generate their output. As used herein, such operators 2520 that must be performed on a particular number of data blocks, such as all data blocks that will be outputted by one or more immediately prior operators in the serial ordering of operators in the query operator execution flow 2433 to execute the query, are denoted as "blocking operators." Blocking operators are only executed in one of the plurality of sequential execution steps if their corresponding operator queue includes all of the required data blocks to be executed. For example, some or all blocking operators can be executed only if all prior operators in the serial ordering of the plurality of operators in the query operator execution flow 2433 have had all of their necessary executions completed for execution of the query, where none of these prior operators will be further executed in accordance with executing the query.

Some operator output generated via execution of an operator 2520, alternatively or in addition to being added to the input data set 2522 of a next sequential operator in the sequential ordering of the plurality of operators of the query operator execution flow 2433, can be sent to one or more other nodes 37 in the same shuffle node set 2485 as input data blocks to be added to the input data set 2522 of one or more of their respective operators 2520. In particular, the output generated via a node's execution of an operator 2520 that is serially before the last operator 2520.M of the node's query operator execution flow 2433 can be sent to one or more other nodes 37 in the same shuffle node set 2485 as input data blocks to be added to the input data set 2522 of a respective operators 2520 that is serially after the last operator 2520.1 of the query operator execution flow 2433 of the one or more other nodes 37.

As a particular example, the node 37 and the one or more other nodes 37 in the shuffle node set 2485 all execute queries in accordance with the same, common query operator execution flow 2433, for example, based on being assigned to a same inner level 2414 of the query execution plan 2405. The output generated via a node's execution of a particular operator 2520.*i* this common query operator execution flow 2433 can be sent to the one or more other nodes 37 in the same shuffle node set 2485 as input data blocks to be added to the input data set 2522 the next operator 2520.*i*+1, with respect to the serialized ordering of the query of this common query operator execution flow 2433 of the one or more other nodes 37. For example, the output generated via a node's execution of a particular operator 2520.*i* is added input data set 2522 the next operator 2520.*i*+1 of the same node's query operator execution flow 2433 based on being serially next in the sequential ordering and/or is alternatively or additionally added to the input data set 2522 of the next operator 2520.*i*+1 of the common query operator execution flow 2433 of the one or more other nodes in the shuffle node set 2485 based on being serially next in the sequential ordering.

In some cases, in addition to a particular node sending this output generated via a node's execution of a particular operator 2520.*i* to one or more other nodes to be input data set 2522 the next operator 2520.*i*+1 in the common query operator execution flow 2433 of the one or more other nodes 37, the particular node also receives output generated via some or all of these one or more other nodes' execution of this particular operator 2520.*i* in their own query operator execution flow 2433 upon their own corresponding input data set 2522 for this particular operator. The particular node adds this received output of execution of operator 2520.*i* by the one or more other nodes to the be input data set 2522 of its own next operator 2520.*i*+1.

This mechanism of sharing data can be utilized to implement operators that require knowledge of all records of a particular table and/or of a particular set of records that may go beyond the input records retrieved by children or other descendants of the corresponding node. For example, JOIN operators can be implemented in this fashion, where the operator 2520.*i*+1 corresponds to and/or is utilized to implement JOIN operator and/or a custom join operator of the query operator execution flow 2517, and where the operator 2520.*i*+1 thus utilizes input received from many different nodes in the shuffle node set in accordance with their performing of all of the operators serially before operator 2520.*i*+1 to generate the input to operator 2520.*i*+1.

Figure 25C:
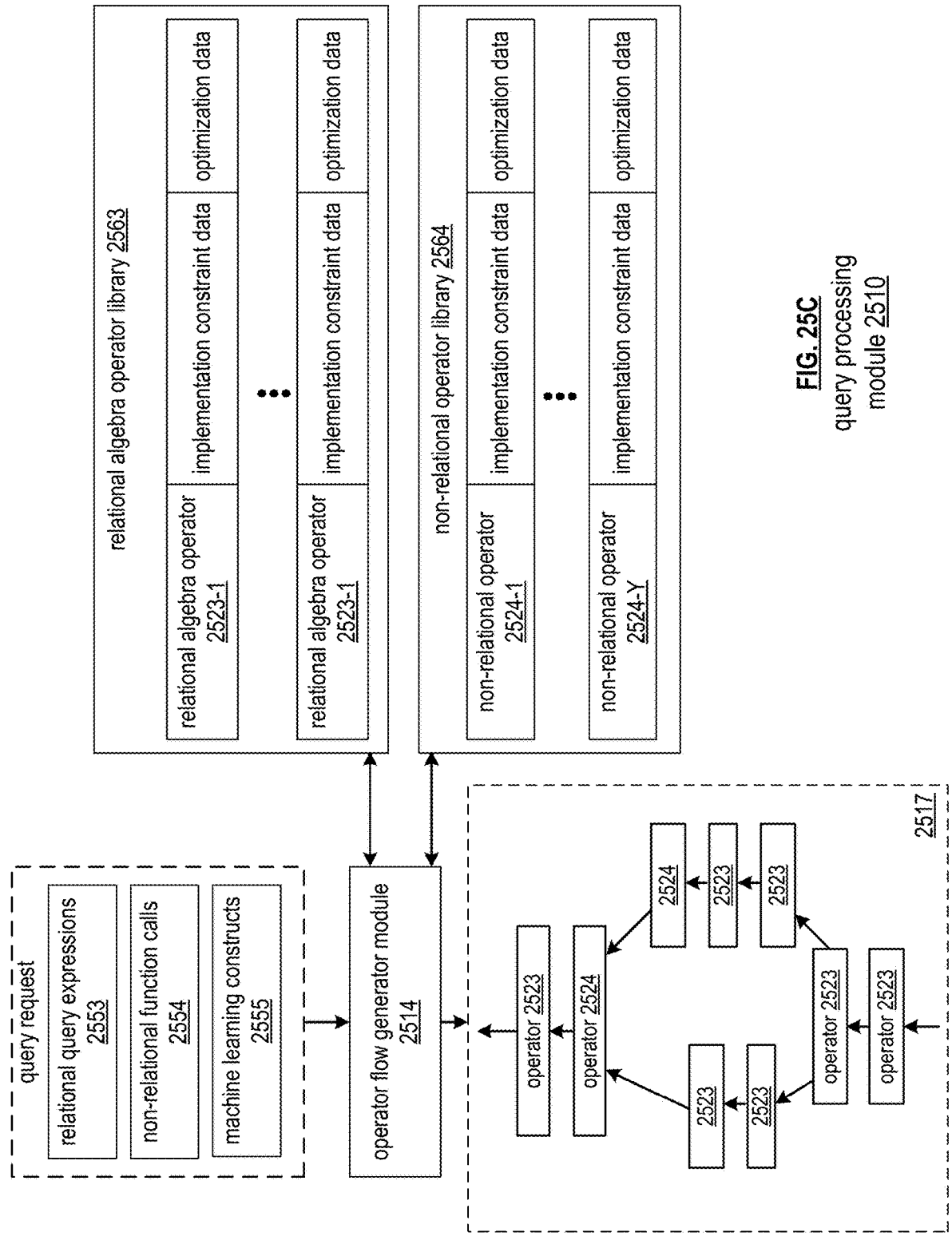
FIG. 25C is a schematic block diagram of a query processing system in accordance with various embodiments of the present invention.

FIG. 25C illustrates an embodiment of a query processing system 2510 that facilitates decentralized query executions utilizing a combination of relational algebra operators and non-relational operators. This can enable the query processing system 2510 to perform non-traditional query executions beyond relational query languages such as the Structured Query Language (SQL) and/or beyond other relational query execution by utilizing non-relational operators in addition to traditional relational algebra operators of queries performed upon relational databases. This can be ideal to enable training and/or implementing of various machine learning models upon data stored by database system 10. This can be ideal to alternatively or additionally enable execution of mathematical functions upon data stored by database system 10 that cannot traditionally be achieved via relational algebra. The query processing system 2510 of FIG. 25C can be utilized to implement the query processing system 2510 of FIG. 25A, and/or any other embodiment of query processing system 2510 discussed herein. The query processing system 2510 of FIG. 25C can otherwise be utilized to enable query executions upon any embodiments of the database system 10 discussed herein.

As discussed previously, decentralizing query execution, for example, via a plurality of nodes 37 of a query execution plan 2405 implemented by a query execution module 2502, can improve efficiency and performance of query execution, especially at scale where the number of records required to be processed in query execution is very large. However, in cases where machine learning models are desired to be built and/or implemented upon a set of records stored by a database system, other database systems necessitate the centralizing of these necessary records and executing the necessary training and/or inference function of the machine learning model accordingly on the centralized data. In particular, these machine learning models may be treated as a "black box" are implemented as an unalterable program that therefore must be performed upon centralized data. Even in cases where the set of records is retrieved by performing a relational query based on parameters filtering the set of records from all records stored by the database system, the machine learning models can only be applied after the corresponding query is executed, even if executed in a decentralized manner as discussed previously, upon the centralized resultant that includes the set of records. Other database systems may similarly require execution of other mathematical functions such as derivatives, fractional derivatives, integrals, Fourier transforms, Fast Fourier Transforms (FFTs), matrix operations, other linear algebra functionality, and/or other non-relational mathematical functions upon centralized data, as these functions similarly cannot be implemented via the traditional relational operators of relational query languages.

The query processing system 2510 of FIG. 25C improves database systems by enabling the execution efficiency achieved via decentralized query execution for execution of machine learning models and/or other non-relational mathematical functions. Rather than requiring that the required set of records first be retrieved from memories of various nodes 37 and centralize, and then applying the machine learning model and/or non-relational mathematical functions to the centralized set of records, the query processing system 2510 of FIG. 25C can enable decentralized query executions to implement executions of machine learning functions and/or non-relational mathematical functions instead of or in addition to decentralized query executions that implement traditional relational queries. This ability to maintain decentralized execution, even when non-relational functionality is applied, improves efficiency of executing non-relational functions upon data stored by database systems, for example, in one or more relational databases of a database system 10.

This decentralization of implementing machine learning models and/or other non-relational mathematical functions can be achieved by implementing the linear algebra constructs that are necessary to implement these machine learning models and/or other these other non-relational mathematical functions as one or more additional operators. These non-relational operators can be treated in a similar fashion as the traditional relational operators utilized to implement traditional relational algebra in relational query execution. These non-relational operators can be implemented via custom operators that are known to the operator flow generator module 2514 and/or that can be included in the query operator execution flow 2517 generated by the operator flow generator module 2514. For example, the query operator execution flow 2517 can include one or more non-relational operators instead of or in addition to one or more relational operators.

The query execution plan data 2540 can be generated to indicate the query operator execution flow 2517 as one or more query operator execution flows 2433 to be applied by sets of nodes 37 at one or more corresponding levels 2410 of the query execution plan, where one or more query operator execution flows 2433-1-2433-G includes at least one non-relational operator. Thus, at least one node 37, such as some or all nodes at one or more inner levels 2414 of the query execution plan, perform their assigned query operator execution flows 2433 by performing at least one non-relational operator instead of or in addition to performing one or more relational algebra operators. The operator flow generator module 2514 can implement an optimizer as discussed in conjunction with FIG. 25A to select and/or arrange the non-relational operators in query operator execution flow 2517 in accordance with optimizer functionality. For example, the query operator execution flow 2517 is selected such that the non-relational operators are arranged in an optimal fashion and/or is selected based on being determined to be more optimal than one or more other options.

An example of such an embodiment of query processing system 2510 is illustrated in FIG. 25C. The operator flow generator module 2514 can receive a query request that includes and/or indicates one or more relational query expressions 2553, one or more non-relational function calls 2554, and/or one or more machine learning constructs 2555. The operator flow generator module 2514 can generate a query operator execution flow 2517 to implement the one or more relational query expressions 2553, one or more non-relational function calls 2554, and/or one or more machine learning constructs 2555 of the given query expression. The query request can indicate the one or more relational query expressions 2553, one or more non-relational function calls 2554, and/or one or more machine learning constructs 2555, for example, as a single command and/or in accordance with a same programming language, where these different constructs 2553, 2554 and/or 2555 can be nested and/or interwoven in the query request rather than being distinguished individually and/or separately. For example, a single query expression included in the query request can indicate some or all of the one or more relational query expressions 2553, the one or more non-relational function calls 2554, and/or the one or more machine learning constructs 2555 of the query.

The resulting query operator execution flow 2517 can include a combination of relational algebra operators 2523 and/or non-relational operators 2524 in a serialized ordering with one or more parallelized tracks to satisfy the given query request. Various relational algebra operators 2523 and/or non-relational operators 2524 can be utilized to implement some or all of the operators 2520 of FIG. 25B. Note that some combinations of multiple non-relational operators 2524 and/or multiple relational algebra operators 2523, for example, in a particular arrangement and/or ordering, can be utilized to implement particular individual function calls indicated in query expressions 2553, machine learning constructs 2555, and/or non-relational function calls 2554.

The query operator execution flow 2517 depicted in FIG. 25C serves as an example query operator execution flow 2517 to illustrate that the query operator execution flow 2517 can have multiple parallel tracks, can have a combination of relational algebra operators 2523 and/or non-relational operators 2524, and that the relational algebra operators 2523 and/or non-relational operators 2524 can be interleaved in the resulting serialized ordering. Other embodiments of the resulting query operator execution flow 2517 can have different numbers of relational algebra operators 2523 and/or non-relational operators 2524, can have different numbers of parallel tracks, can have multiple serial instances of sets of multiple parallel tracks in the serialized ordering, can have different arrangements of the relational algebra operators 2523 and/or non-relational operators 2524, and/or can otherwise have any other combination and respective ordering of relational algebra operators 2523 and non-relational operators 2524 in accordance with the corresponding query request. Some query operator execution flows 2517 for some queries may have only relational algebra operators 2523 and no non-relational operators 2524, for example, based on the query request not requiring use of linear algebra functionality. Some query operator execution flows 2517 for some queries may have only non-relational operators 2524 and no relational algebra operators 2523, for example, based on the query request not requiring use of relational algebra functionality.

The operator flow generator module 2514 can generate a query operator execution flow 2517 by accessing a relational algebra operator library 2563 that includes information regarding a plurality of relational algebra operators 2523-1-2523-X that can be included in query operator execution flows 2517 for various query requests and/or by accessing a non-relational operator library 2564 that includes information regarding a plurality of non-relational operators 2524-1-2524-Y that can be included in query operator execution flows 2517 for various query requests. The relational algebra operator library 2563 and/or the non-relational operator library 2564 can be stored and/or implemented by utilizing at least one memory of the query processing system 2510 and/or can be integrated within the operational instructions utilized to implement the operator flow generator module 2514. Some or all relational algebra operators 2523 of the relational algebra operator library 2563 and/or some or all non-relational operators 2524 of the non-relational operator library 2564 can be mapped to and/or can indicate implementation constraint data and/or optimization data that can be utilized by the operator flow generator module 2514.

The implementation constraint data can indicate rules and/or instructions regarding restrictions to and/or requirements for selection and/or arrangement of the corresponding operator in a query operator execution flow 2517. The optimization data can indicate performance information, efficiency data, and/or other information that can be utilized by an optimizer implemented by the operator flow generator module 2514 in its selection and/or arrangement of the corresponding operator in a query operator execution flow 2517. The library can further indicate particular function names, parameters and/or expression grammar rules, for example, to map each operator and/or combinations of operators to particular function names or other information identifying the corresponding operator be used based on being indicated in a relational query expression 2553, non-relational function call 2554, and/or machine learning construct 2555. The library 2563 and/or 2564 can further indicate configurable function parameters and how they be applied to the corresponding operator 2523 and/or 2524, for example, where particular parameters to be applied are indicated in the query request and/or are otherwise determined based on the query request and are applied to the corresponding function accordingly.

The set of relational algebra operators 2523-1-2523-X of the relational algebra operator library 2563 can include some or all traditional relational algebra operators that are included in or otherwise utilized to implement traditional relational algebra query expressions for execution as relational queries upon relational databases. For example, some or all SQL operators or operators of one or more other relational languages can be included in the relational algebra operator library 2563. This can include SELECT operators and corresponding filtering clauses such as WHERE clauses of relational query languages; aggregation operations of relational query languages such as min, max, avg, sum, and/or count; joining and/or grouping functions of relational query languages such as JOIN operators, ORDER BY operators, and/or GROUP BY operators; UNION operators; INTERSECT operators; EXCEPT operators; and/or any other relational query operators utilized in relational query languages.

The set of non-relational operators 2524-1-2524-Y of the non-relational operator library 2564 can include operators and/or sets of multiple operators that can be included in query operator execution flow 2517 that implement non-relational functionality, and can be distinct from the relational algebra operators 2523-1-2523X of the relational algebra operator library 2563. As used herein, the non-relational operators 2524-1-2524-Y can correspond to non-relational algebra operators, such as operators that cannot be implemented via traditional relational query constructs and/or operators that are otherwise distinct from traditional-query constructs.

The non-relational operators 2524-1-2524-Y can include one or more operators utilized to implement non-relational mathematical functions such as derivatives, fractional derivatives, integrals, Fourier transforms and/or FFTs. For example, one or more non-relational operators 2524-1-2524-Y utilized to implement derivatives, fractional derivatives, and/or integrals can be based on a relational window operator, can include a relational window operator as one of a set of multiple operators, and/or can include a customized, non-relational window operator implemented to execute derivatives, fractional derivatives, and/or integrals.

The non-relational operators 2524-1-2524-Y can include one or more operators utilized to implement supervised machine learning models such as linear regression, logistic regression, polynomial regression, other regression algorithms, Support Vector Machines (SVMs), Naive Bayes, nearest neighbors algorithms such as K-nearest neighbors, other classification algorithms, and/or other supervised machine learning models. This can include one or more operators utilized to implement unsupervised algorithms such as clustering algorithms, which can include K-means clustering, mean-shift clustering, and/or other clustering algorithms. This can include one or more operators utilized to implement machine learning models such as neural networks, deep neural networks, convolutional neural networks, and/or decision trees, and/or random forests.

The non-relational operators 2524-1-2524-Y can include a set of linear algebra operators that implement linear algebra functionality. This can include linear algebra operators that are implemented to be executed by utilizing vectors and/or matrices as input. These vectors and/or matrices can be stored by the database system 10 and/or can be generated as intermediate output via execution of another linear algebra operator in a query operator execution flow 2433. For example, some or all of these vectors and/or matrices can be based on and/or be implemented as records 2422. In some cases, vectors can correspond to rows of a relational database stored by database system 10, where the field values of these rows correspond to values populating the vectors. Similarly, a matrix can correspond to one or more rows of a relational database stored by database system, where a number of fields of each row correspond to a first dimensionality of the matrix and where a number of rows represented by the matrix correspond to a second dimensionality of the matrix. Intermediate result sets of the linear algebra operators can correspond to scalar, vector, and/or matrix values that can be stored, returned, and/or utilized as input to an input data set 2522 of subsequent operators in a query operator execution flow 2433. The set of linear algebra operators can correspond to one or more operators utilized to implement: matrix multiplication, matrix inversion, matrix transpose, matrix addition, matrix decomposition, matrix determinant, matrix trace, and/or other matrix operations utilizing one or more matrices as input. For example, the one or more matrices are indicated in data blocks of the input data set 2522 of a corresponding linear algebra operator. Matrix multiplication operators can include a first one or more operators utilized to implement multiplication of a matrix with a scalar and/or can include a second one or more operators utilized to implement multiplication of a matrix with another matrix. Multiple linear algebra operators can be included in query operator execution flows 2517 instead of or in addition to one or more relational operators 2523, via the operator flow generator module 2514, to execute the non-relational function calls 2554 and/or the machine learning constructs 2555 that require some or all of this matrix functionality. In some cases, all non-relational operators 2524 of a query operator execution flow 2517 are included in the set of linear algebra operators.

Alternatively or in addition, the set of non-relational operators 2524-1-2524-Y can include a loop operator, such as the replay operator of FIGS. 27A-27E, that can be utilized in query operator execution flows 2517 to implement regression or other machine learning and/or mathematical constructs. As another example, the set of non-relational operators 2524-1-2524-Y can include a randomizer operator that randomizes input data, which may otherwise have an inherent ordering and/or pattern utilized in efficient storage and/or retrieval of records in one or more segments, for use in machine learning models. As another example, the set of non-relational operators 2524-1-2524Y can include one or more custom join operators such as one or more custom join operators of FIGS. 28A-28E, for example, are different from a relational JOIN operator of the relational algebra operator library 2563. As another example, the set of non-relational operators 2524-1-2524-Y can be utilized to implement a K-nearest neighbors classification algorithm as discussed in conjunction with FIGS. 29A-29G, for example, by utilizing a KNN-join operator of the non-relational operator library 2564.

In some cases, at least one non-relational operator 2524 of the non-relational operator library 2564 utilizes a set of other operators of the non-relational operator library 2564 and/or the relational algebra operator library 2563. For example, a complex non-relational operator of the non-relational operator library 2564 can be built from a plurality of other operators 2523 and/or 2524, such as primitive operators 2523 and/or 2524 that include only one operator and/or other complex operators 2523 and/or 2524 that are built from primitive operators. The complex non-relational operator can correspond to a function built from the operators in non-relational operator library 2564 and/or the relational algebra operator library 2563. Such a complex non-relational operator 2524 can be included in the query operator execution flow to indicate operator executions for its set of operators 2523 and/or 2524. The operator executions for its set of operators 2523 and/or 2524 can be arranged in the query operator execution flow in accordance with a pre-defined nesting and/or ordering based on the corresponding functionality of the complex non-relational operator 2524, and/or can be arranged based on the optimizer being applied, for example, where some of the set of operators 2523 and/or 2524 of the complex non-relational operator are separated and/or rearranged in the query operator execution flow based on the optimizer, but still perform the corresponding functionality of the complex non-relational operator 2524 when the query operator execution flow as a whole is executed.

Figure 25D:
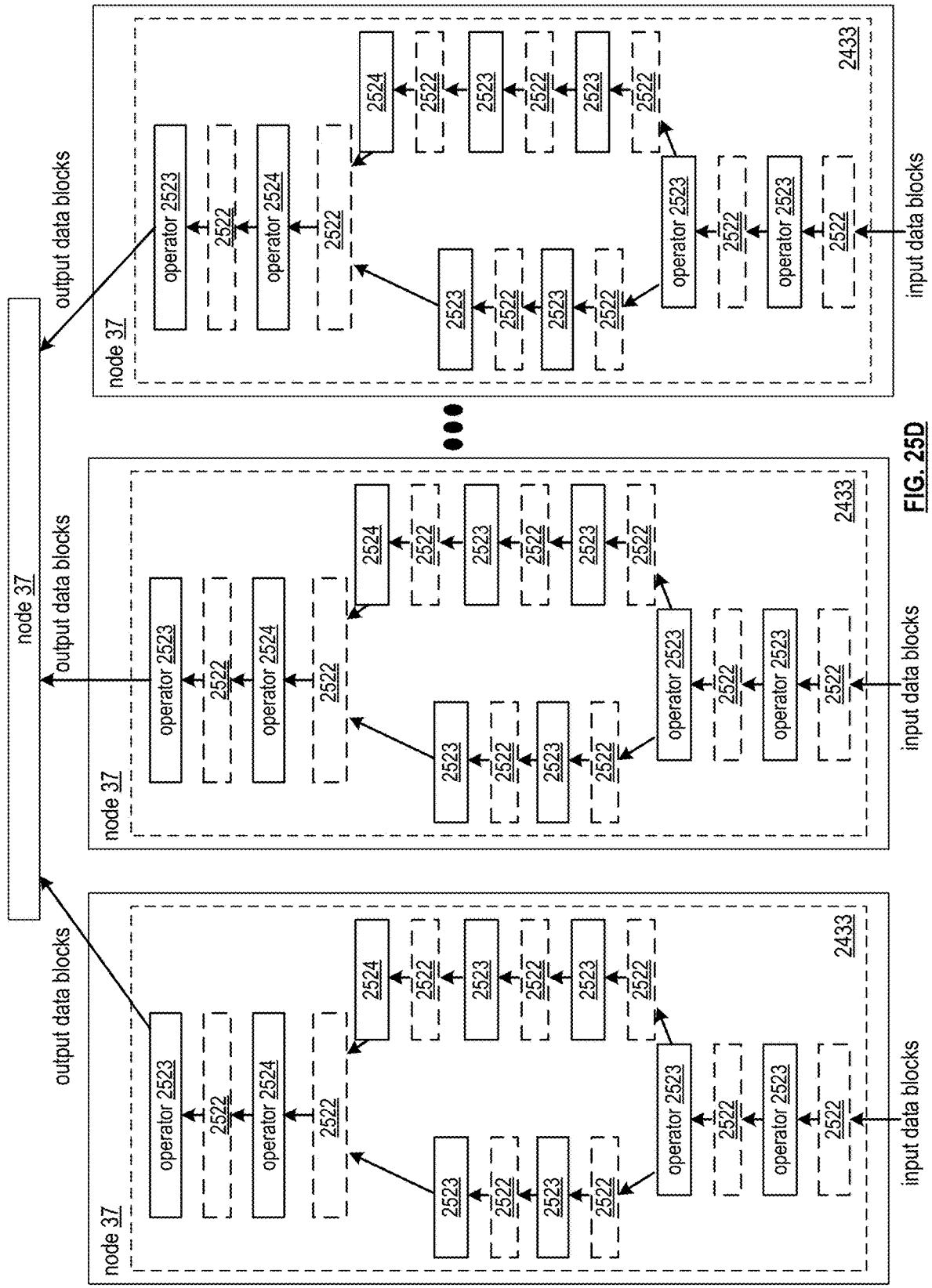
FIG. 25D is a schematic block diagram of a plurality of nodes that utilize query operator execution flows in accordance with various embodiments of the present invention.

FIG. 25D illustrates an example embodiment of multiple nodes 37 that utilize a query operator execution flow 2433 with a combination of relational algebra operators 2523 and non-relational operators 2524. For example, these nodes 37 are at a same level 2410 of a query execution plan 2405, and receive and perform an identical query operator execution flow 2433 in conjunction with decentralized execution of a corresponding query. Each node 37 can determine this query operator execution flow 2433 based on receiving the query execution plan data 2540 for the corresponding query that indicates the query operator execution flow 2433 to be performed by these nodes 37 in accordance with their participation at a corresponding inner level 2414 of the corresponding query execution plan 2405 as discussed in conjunction with FIG. 25A. This query operator execution flow 2433 utilized by the multiple nodes can be the full query operator execution flow 2517 generated by the operator flow generator module 2514 of FIG. 25A and/or FIG. 25C. This query operator execution flow 2433 can alternatively include a sequential proper subset of operators from the query operator execution flow 2517 generated by the operator flow generator module 2514 of FIG. 25A and/or FIG. 25C, where one or more other sequential proper subsets of the query operator execution flow 2517 are performed by nodes at different levels of the query execution plan.

Each node 37 can utilize a corresponding query processing module 2435 to perform a plurality of operator executions for operators of the query operator execution flow 2433 as discussed in conjunction with FIG. 25B. This can include performing an operator execution upon input data sets 2522 of a corresponding operator 2523 and/or 2524, where the output of the operator execution is added to an input data set 2522 of a sequentially next operator 2523 and/or 2524 in the operator execution flow, as discussed in conjunction with FIG. 25B, where the operators 2523 and/or 2524 of the query operator execution flow 2433 are implemented as operators 2520 of FIG. 25B. Some or operators 2523 and/or 2524 can correspond to blocking operators that must have all required input data blocks generated via one or more previous operators before execution. Each query processing module can receive, store in local memory, and/or otherwise access and/or determine necessary operator instruction data for operators 2523 and/or 2524 indicating how to execute the corresponding operators 2523 and/or 2524. For example, some or all information of relational algebra operator library 2563 and/or non-relational operator library 2564 can be sent by the query processing module to a plurality of nodes of the database system 10 to enable the plurality of nodes 37 to utilize their query processing module 2435 to execute corresponding operators 2523 and/or 2524 received in query operator execution flows 2433 for various queries.

In various embodiments, a query processing system includes at least one processor and a memory that stores operational instructions that, when executed by the at least one processor, cause the query processing system to determine a query request that indicates a plurality of operators, where the plurality of operators includes at least one relational algebra operator and further includes at least one non-relational operator. The query processing system generates a query operator execution flow from the query request that indicates a serialized ordering of the plurality of operators. The query processing system generates a query resultant of the query by facilitating execution of the query via a set of nodes of a database system that each perform a plurality of operator executions in accordance with the query operator execution flow, where a subset of the set of nodes each execute at least one operator execution corresponding to the at least one non-relational operator in accordance with the execution of the query.

Figure 25E:
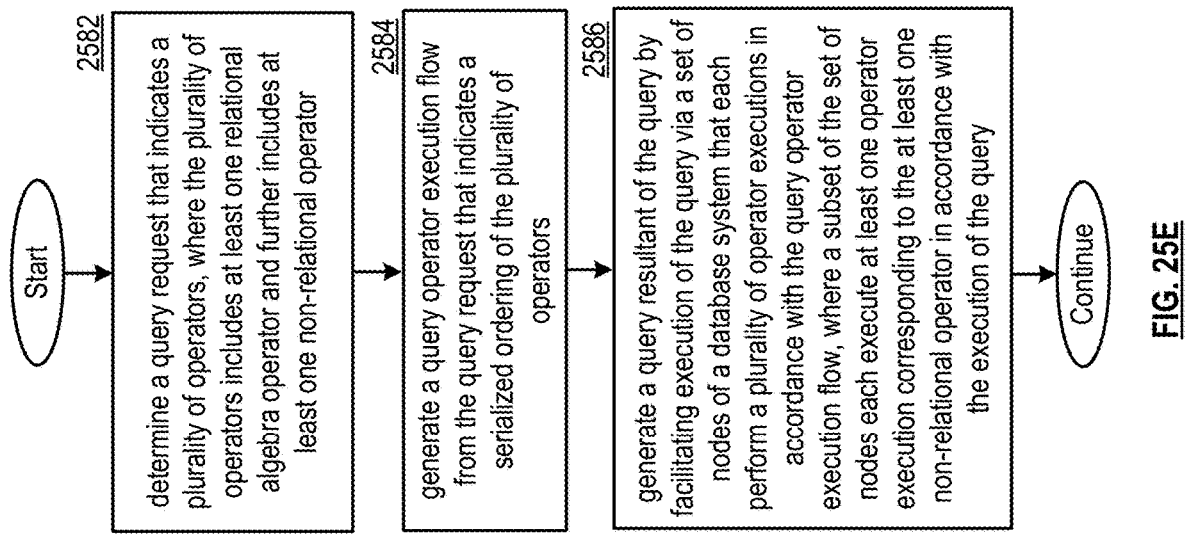
FIG. 25E is a logic diagram illustrating a method of executing a query via a query operator execution flow that includes at least one non-relational operator in accordance with various embodiments of the present invention.

FIG. 25E illustrates a method for execution by a query processing system 2510. Some or all of the method of FIG. 25E can be performed by utilizing the operator flow generator module 2514, the execution plan generating module 2516, and/or the query execution module 2502 of the query processing system 2510 of FIG. 25A. For example, the database system 10 can utilize at least one processing module of one or more nodes 37 of one or more computing devices 18 that are utilized to implement the query execution module 2502 and/or other portions of the query processing system 2510. The one or more nodes can execute operational instructions stored in memory accessible by the one or more nodes, where the execution of the operational instructions causes the one or more nodes 37 to execute, independently or in conjunction, the steps of FIG. 25E. In particular, a node 37 can utilize the query processing module 2435 to execute some or all of the steps of FIG. 25E, where multiple nodes 37 implement their own query processing modules 2435 to independently execute the steps of FIG. 25E. For example, some or all nodes 37 of a query execution plan 2405 can implement query processing module 2435 to facilitate execution of a query. Some or all of the steps of FIG. 25E can optionally be performed by any other processing module of the database system 10. Some or all of the steps of FIG. 25E can be performed to implement some or all of the functionality of the operator flow generator module 2514, execution plan generating module 2516, query execution module 2502, and/or of one or more individual nodes 37 as described in conjunction with FIGS. 25A-25D. Some or all of the steps of FIG. 25E can be performed to implement some or all of the functionality regarding execution of a query via the plurality of nodes in the query execution plan 2405 as described in conjunction with FIGS. 24A-24E. Some or all steps of FIG. 25E can be performed by database system 10 in accordance with other embodiments of the database system 10 and/or nodes 37 discussed herein.

Step 2582 includes determining a query request that indicates a plurality of operators, where the plurality of operators includes at least one relational algebra operator and further includes at least one non-relational operator, such as one or more non-relational operators 2524. The operator flow generator module 2514 can be utilized to determine the plurality of operators from the query request. For example, the plurality of operators are indicated by and/or are selected from a plurality of operator options based on one or more relational query expressions 2553, one or more non-relational function calls 2554, and/or one or more machine learning constructs 2555 included in a single query expression of the query request and/or otherwise indicated in the query request. The plurality of operators can be determined by utilizing the relational algebra operator library 2563 and/or the non-relational operator library 2564.

Step 2584 includes generating a query operator execution flow, such as query operator execution flow 2517, from the query request, for example, by utilizing the operator flow generator module 2514. The query operator execution flow indicates a serialized ordering of the plurality of operators. For example, the serialized ordering can include one or more serial instances of one or more parallel tracks that each include one or more operators of the plurality of operators. Determining the serialized ordering of the plurality of operators for the query operator execution flow can include selecting a query operator execution flow from a plurality of possible options for the query operator execution flow, for example, by utilizing an optimizer of the operator flow generator module 2514. This can include selecting the ordering of the plurality of operators from a plurality of ordering options and/or can further include selecting the final set of operators that will be utilized as the plurality of operators, in addition to their respective ordering, from a plurality of operator set options. For example, step 2584 can be performed in conjunction with step 2582, where the plurality of operators are selected when the corresponding serialized ordering is determined, and where the plurality of operators and their corresponding serialized ordering are selected from a plurality of options for the plurality of operators and corresponding serialized ordering.

Step 2586 includes generating a query resultant of the query by facilitating execution of the query via a set of nodes of the database system that each perform a plurality of operator executions in accordance with the query operator execution flow, where a subset of the set of nodes each execute at least one operator execution corresponding to the at least one non-relational operator in accordance with the execution of the query. The subset of the set of nodes can include multiple different nodes 37. For example, the multiple different nodes in the subset each execute the at least one operator execution corresponding to the at least one non-relational operator in accordance with the execution of the query, for example, upon different input data. The query execution module 2502 can be utilized to implement a query execution plan 2405 via a plurality of nodes 37, where the subset of the set of nodes is implemented via nodes at one or more inner levels 2414 that each utilize a query operator execution flow 2433 to generate their output data blocks from corresponding input data blocks received from one or more child nodes. For example, each of the subset of the set of nodes determines the query operator execution flow 2433 to be executed based on receiving query execution plan data 2540 generated by the execution plan generating module 2516. In some cases, execution of the query includes transfer of data blocks between nodes 37 in a same shuffle node set 2485 in conjunction with one or more of their operator executions of one or more operators of their query operator execution flow 2433.

Some nodes in the set of nodes can execute different query operator execution flows 2433, for example, based on being assigned to participate in different levels of the query execution plan. Some nodes in the set of nodes can execute identical query operator execution flows 2433, for example, based on being assigned to participate in the same level of the query execution plan. The query operator execution flows 2433 executed by a given node in the set of nodes can correspond to the full query operator execution flow 2517 generated in step 2584 and./or can correspond to proper subset of the plurality of operators in accordance with a proper subset of the serialized ordering of the query operator execution flow 2517 generated in step 2584.

In various embodiments, the method includes receiving the query request from a client device, where the client device generated the query request based on user input to the client device in response to a prompt presented via a graphical user interface displayed via a display device of the client device. For example, the client device generated a single query expression indicated in the query request based on the user input to the client device in response to the prompt presented via the graphical user interface. The method includes transmitting the query resultant to the client device for display via the display device. For example, the client device generated the query request by utilizing the embodiments of the query processing system and/or client device discussed in conjunction with FIGS. 26A-26B.

In various embodiments, the query implements a regression model based on the at least one non-relational operator. In various embodiments, the query implements an unsupervised clustering model based on the at least one non-relational operator. In various embodiments, the at least one non-relational operator includes a replay operator, and the execution of the query includes implementing iteration by each of the subset of the set of nodes executing the replay operator. In various embodiments, the at least one non-relational operator implements at least one of: a derivative function, a fractional derivative function, an integral, or a Fourier transform.

In various embodiments, the at least one non-relational operator includes at least one linear algebra operator utilized to implement a matrix multiplication function, a matrix inversion function, a matrix transpose function, a matrix addition function, a matrix decomposition function, a matrix determinant function, a matrix trace function, and/or another function that utilizes one or more matrices as input and/or that generates one or more matrices as output.

In various embodiments, the at least one relational algebra operator is included in a set of Structured Query Language (SQL) operators, and the at least one non-relational operator is distinct from the set of SQL operators. Alternatively, the at least one relational algebra operator is included in a set of operators of any one or more relational query languages, and the at least one non-relational operator is distinct from the set of operators of the one or more relational query languages.

In various embodiments, the subset of the set of nodes each execute the at least one operator execution corresponding to the at least one non-relational operator without coordination. In various embodiments, execution of the at least one operator execution corresponding to the at least one non-relational operator by the each of the subset of the set of nodes includes exchanging at least one data block between the subset of the set of nodes in accordance with a custom-join operator.

In various embodiments, the method includes communicating query execution role assignment data to the set of nodes. The set of nodes utilize the query execution role assignment data to each facilitate their execution of the query in accordance with a query execution plan. A root node of the query execution plan generates the query resultant based on data blocks generated by descendants of the root node in accordance with the execution of the query by the descendants of the root node. In various embodiments, a plurality of IO level nodes of the query execution plan each read a distinct set of records stored by the database system, and each node of the subset of the set of nodes each execute operators of the query operator execution flow upon a plurality of distinct sets of records read by a distinct set of IO nodes that are children of the each node in the query execution plan.

In various embodiments, the subset of the set of nodes correspond to a plurality of inner level nodes at an inner level, such as exactly one inner level, of the query execution plan. Each of the subset of the set of nodes execute every one of the plurality of operators of the query operator execution flow in accordance with the serialized ordering. In various embodiments, the subset of the set of nodes correspond to a plurality of nodes at multiple levels of the query execution plan. A first plurality of nodes at a first one of the multiple levels each execute a first serialized portion of the query operator execution flow, and a second plurality of nodes at a second one of the multiple levels each execute a second serialized portion of the query operator execution flow.

In various embodiments, the serialized ordering of the plurality of operators of the query operator execution flow is generated by applying an optimizer of the query processing system. In various embodiments, one relational algebra operator of the at least one relational algebra operator is serially before a first relational algebra operator of the at least one relational algebra operator in the serialized ordering of the plurality of operators. In various embodiments, the one relational algebra operator of the at least one relational algebra operator is serially after a second relational algebra operator of the at least one relational algebra operator in the serialized ordering of the plurality of operators. In various embodiments, the serialized ordering of the plurality of operators includes a plurality of parallel tracks, and one relational algebra operator of the at least one relational algebra operator is included in one of the plurality of parallel tracks.

In various embodiments, the at least one non-relational operator includes a plurality of non-relational operators. The plurality of non-relational operator correspond to a plurality of different non-relational operator types, and the plurality of non-relational operators are not sequentially ordered in the serialized ordering of the plurality of operators based on the at least one relational algebra operator being in between two of the plurality of non-relational operators in the serialized ordering of the plurality of operators.

In various embodiments, a non-transitory computer readable storage medium includes at least one memory section that stores operational instructions that, when executed by a processing module that includes a processor and a memory, causes the processing module to: determine a query request that indicates a plurality of operators, where the plurality of operators includes at least one relational algebra operator and further includes at least one non-relational operator; generate a query operator execution flow from the query request that indicates a serialized ordering of the plurality of operators; and generate a query resultant of the query by facilitating execution of the query via a set of nodes of a database system that each perform a plurality of operator executions in accordance with the query operator execution flow, where a subset of the set of nodes each execute at least one operator execution corresponding to the at least one non-relational operator in accordance with the execution of the query.

Figure 26A:
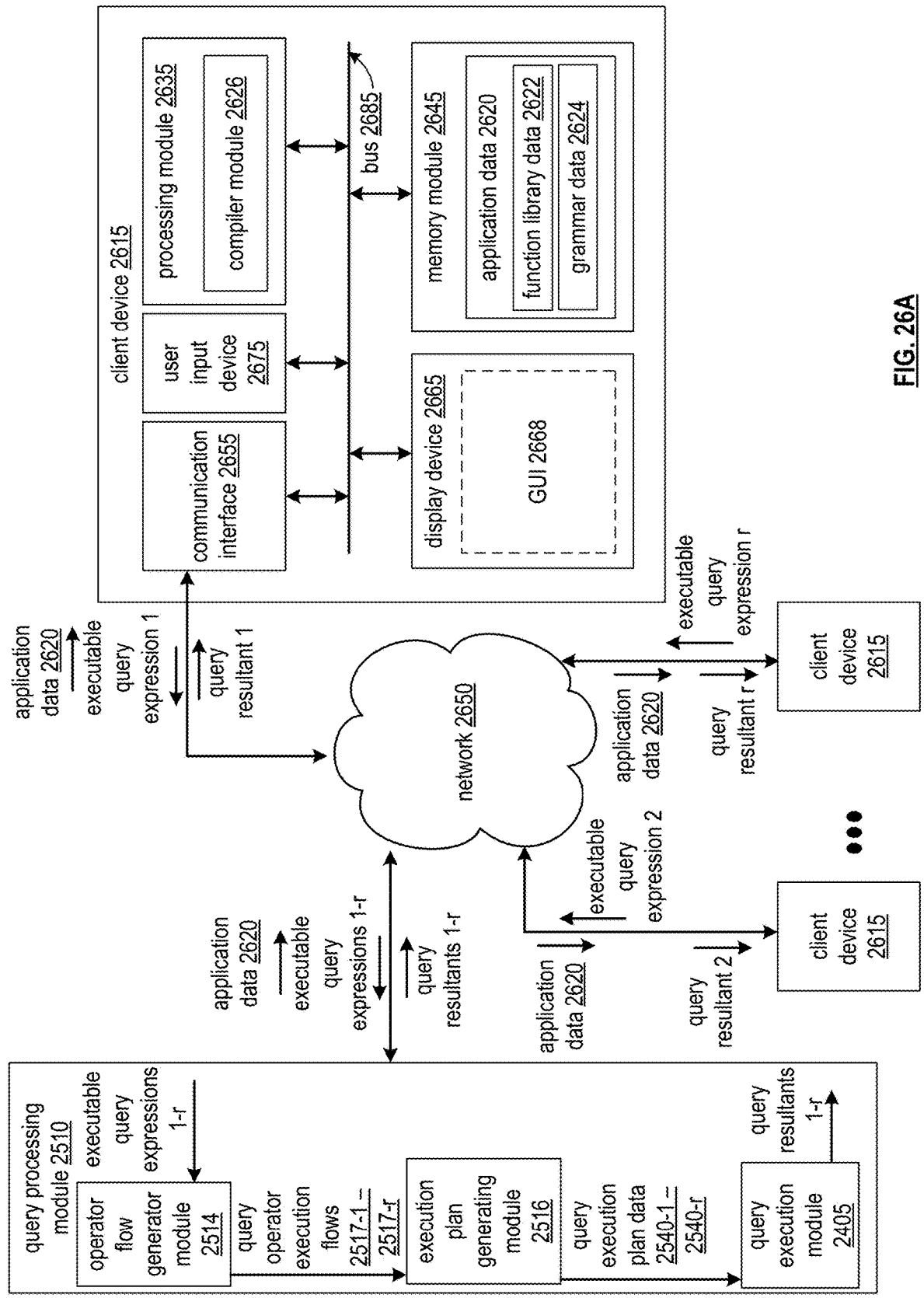
FIG. 26A is a schematic block diagram of a plurality of client devices that communicate with a query processing system in accordance with various embodiments of the present invention.

FIG. 26A illustrates an embodiment of a query processing system 2510 that communicates with a plurality of client devices. The query processing system 2510 of FIG. 26A can be utilized to implement the query processing system 2510 of FIG. 25A and/or any other embodiment of the query processing system 2510 discussed herein.

In various embodiments, a user can generate their own executable query expression that is utilized to generate the query operator execution flow 2517 of FIG. 25A. The executable query expression can be built from a library of operators that include both standard relational operators and additional, custom, non-relational operators that are utilized implement linear algebra constructs to execute derivates, fractional derivatives, integrals, Fourier transforms, regression machine learning models, clustering machine learning models, etc. A language and corresponding grammar rules can be defined to allow users to write executable query expressions that include the linear algebra constructs.

Rather than rigidly confining the bounds to which the non-relational operators 2524 can be utilized in query execution, the embodiment of FIG. 26A enables users to implement non-relational operators 2524 and/or to create new non-relational operators 2524 from existing non-relational operators 2524 and/or relational algebra operators 2523. This further improves database systems by expanding the capabilities to which mathematical functions and machine learning models can be defined and implemented in query executions. In particular, users can determine and further define particular query functionality based on characteristics of their data and/or of their desired analytics, rather than being confined to a fixed set of functionality that can be performed.

As discussed in conjunction with FIG. 25A-25D, these custom, executable query expressions can be optimized and/or otherwise decentralized in execution via a plurality of nodes. Non-relational operators, such as non-relational operators 2524 and/or custom non-relational functions utilized to implement linear algebra constructs and/or other custom non-relational, are selected and arranged in the query operator execution flow 2517 for execution by a plurality of nodes 37 of a query execution plan 2405. This enables the custom functionality to be optimized and/or otherwise be efficiently processed in a decentralized fashion rather than requiring centralization of data prior to executing the non-relational constructs presented in a corresponding executable query expression.

For example, the query request of FIG. 25C can be expressed as a single, executable query expression that includes and/or indicates the one or more relational query expressions 2553, the one or more non-relational function calls 2554, and/or the one or more machine learning constructs 2555 in accordance with the function library and/or grammar rules of a corresponding language. Executable query expressions of the corresponding language can be broken down into a combination of relational algebra operators 2523 and/or non-relational operators 2524 that can be arranged into a corresponding query operator execution flow 2517 that can be segmented and/or otherwise sent to a plurality of nodes 37 of a query execution plan 2405 to be executed as a query operator execution flow 2433 via the node as illustrated in FIG. 25B. For example, any compliable or otherwise acceptable executable query expression that complies with the function library and/or grammar rules can be processed by the operator flow generator module 2514 to generate a corresponding query operator execution flow 2517 that can be executed in accordance with a query execution plan 2405 in a decentralized fashion.

These executable query expressions can be generated and/or determined automatically by the query processing system 2510 and/or can be received from client devices 2615 as illustrated in FIG. 26A. As illustrated, a plurality of client devices 2615 can bidirectionally communicate with the query processing system 2510 via a network 2650. For example, the network 2650 can be implemented utilizing the wide area network(s) 22 of FIG. 5, the external network(s) 17 of FIG. 2, the system communication resources 14 of FIG. 5, and/or by utilizing any wired and/or wireless network. The query processing system 2510 can receive a plurality of executable query expressions 1-$r$ from a set of client devices 1-$r$, can generate query operator execution flows 2517 for each query expression to facilitate execution of the executable query expressions 1-$r$ via the query execution module 2502 to generate corresponding query resultants 1-$r$. The query processing system 2510 can send the generated query resultants 1-$r$ to the same or different corresponding client device for display.

Client devices 2615 can include and/or otherwise communicate with a processing module 2635, a memory module 2645, a communication interface 2655, a display device 2665, and/or a user input device 2675, connected via a bus 2685. The client device 2615 can be implemented by utilizing a computing device 18 and/or via any computing device that includes a processor and/or memory. Some or all client devices 2615 can correspond to end users of the database system that request queries for execution and/or receive query resultants in response. Some or all client devices 2615 can alternatively or additionally correspond to administrators of the system, for example, utilizing administrative processing 19.

Client devices 2615 can store application data 2620 to enable client devices 2615 to generate executable query expressions. The application data 2620 can be generated by and/or can be otherwise received from the query processing system 2510 and/or another processing module of database system 10. The application data 2620 can include application instructions that, when executed by the processing module 2635, cause the processing module 2635 to generate and/or compile executable query expressions based on user input. For example, execution of the application instruction data 2620 by the processing module 2635 can cause the client device to display a graphical user interface (GUI) 2668 via display device 2665 that presents prompts to enter executable query expressions via the user input device 2675 and/or to display query resultants generated by and received from the query processing system 2510.

The application data 2620 can include and/or otherwise indicate function library data 2622 and/or grammar data 2624, for example, of a corresponding language that can be utilized by a corresponding end user to generate executable query expressions. The function library data 2622 and/or grammar data 2624 can be utilized by the processing module 2635 to implement a compiler module 2626 utilized to process and/or compile text or other user input to GUI 2668 to determine whether the executable query expression complies with function library data 2622 and/or grammar data 2624 and/or to package the executable query expression for execution by the query processing system 2510. The function library data 2622 and/or grammar data 2624 can be displayed via GUI 2668 to instruct the end user as to rules and/or function output and parameters to enable the end user to appropriately construct executable query expressions. For example, the application data 2620 can be utilized to implement an application programming interface (API) to enable construction, compiling, and execution of executable query expressions by the end user via interaction with client device 2615.

The function library data 2622 can include a plurality of functions that can be called and/or included in an executable query expression. These functions can include and/or map to one or more operators of the relational algebra library 2563 and/or the linear algebra library 2564. For example, the relational algebra library 2563 and/or the linear algebra library 2564 stored by the query processing system 2510 can be sent and/or included in application data 2620. As another example, the relational algebra library 2563 and/or the linear algebra library 2564 can store function mapping data that maps the functions indicated in the function library data 2622 to one or more operators of the relational algebra library 2563 and/or the linear algebra library 2564 that can implement the corresponding function when included in a query operator execution flow 2517, for example, in pre-defined ordering and/or arrangement in the query operator execution flow 2517.

The function library data 2622 can indicate rules and/or roles of one or more configurable parameters of one or more corresponding functions, where the executable query expression can include one or more user-selected parameters of one or more functions indicated in the function library data 2622. The function library data 2622 can indicate one or more user-defined functions written and/or otherwise generated via user input to the GUI 2668 by the same user or different user via a different client device. These user-defined functions can be written in the same language as the executable query expressions in accordance with the function library data 2622 and/or grammar data 2624, and/or can be compiled via compiler module 2626. These user-defined functions can call and/or utilize a combination of other function indicated in function library data 2622 and/or in relational algebra library 2563 and/or the linear algebra library 2564.

Executable query expressions generated via user input to the GUI 2668 and/or compiled by compiler module 2626 can be transmitted to the query processing system 2510 by communication interface 2655 via network 2650. Corresponding query resultants can be generated by the query processing system 2510 by utilizing operator flow generator module 2514 to generate a query operator execution flow 2517 based on the executable query expression; by utilizing execution plan generating module 2516 to generate query execution plan data 2540 based on the query operator execution flow 2517; and/or by utilizing a plurality of nodes 37 of query execution module 2502 to generate a query resultant via implementing the query execution plan 2405 indicated in the query execution plan data 2540, for example, as discussed in conjunction with FIGS. 25A-25D. The query resultant can be sent back to the client device 2615 by the query processing system 2510 via network 2650 for receipt by the client device 2615 and/or for display via GUI 2668.

Figure 26B:
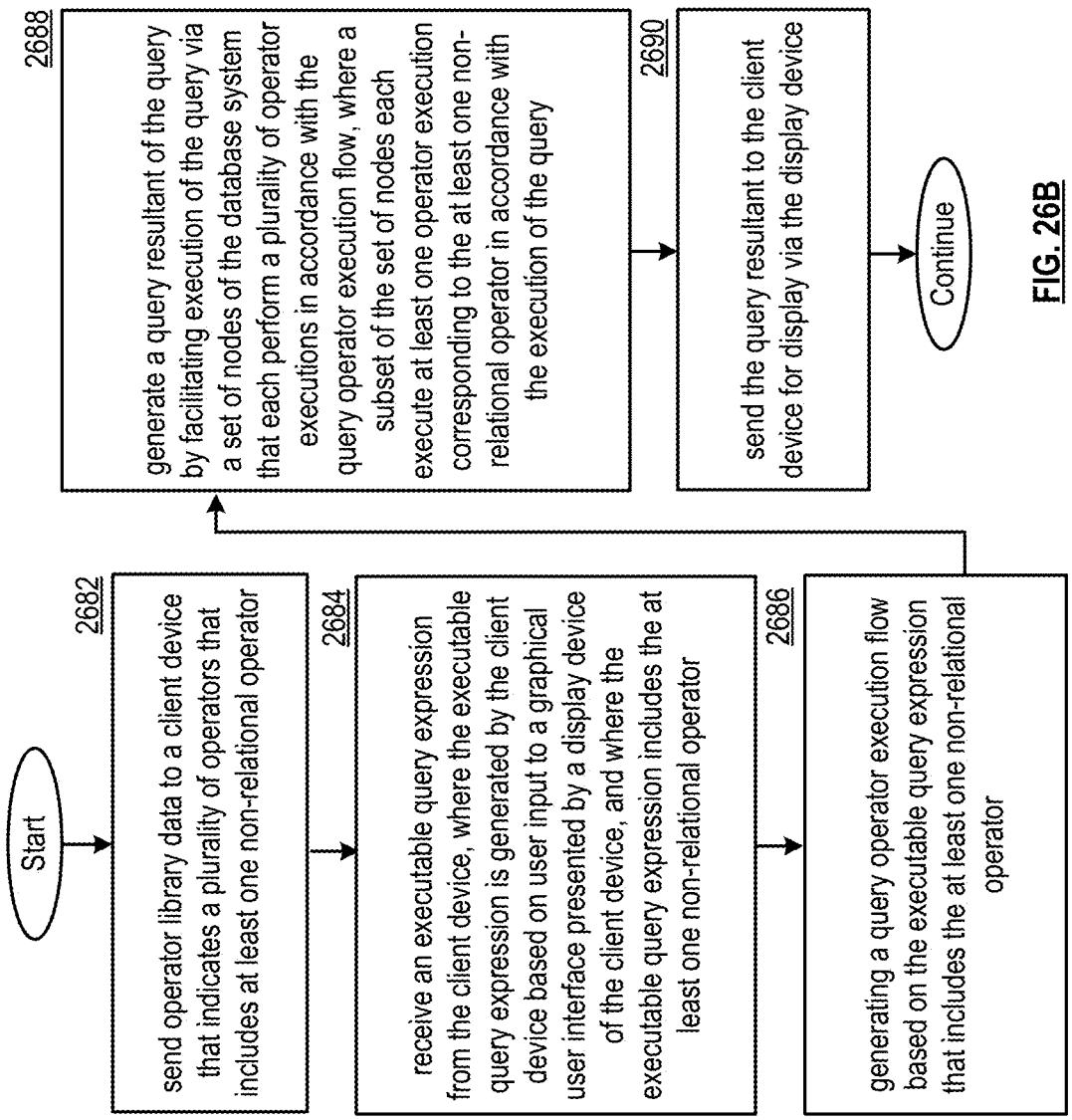
FIG. 26B is a logic diagram illustrating a method of executing a query that includes a non-relational operator based on an executable query expression generated by a client device based on user input in accordance with various embodiments of the present invention.

FIG. 26B illustrates a method for execution by a query processing system 2510, such as the query processing system 2510 of FIG. 26A. Some or all of the method of FIG. 26B can be performed by utilizing the operator flow generator module 2514, the execution plan generating module 2516, and/or the query execution module 2502 of the query processing system 2510 of FIG. 25A. For example, the database system 10 can utilize at least one processing module of one or more nodes 37 of one or more computing devices 18 that are utilized to implement the query execution module 2502 and/or other portions of the query processing system 2510. The one or more nodes can execute operational instructions stored in memory accessible by the one or more nodes, where the execution of the operational instructions causes the one or more nodes 37 to execute, independently or in conjunction, the steps of FIG. 26B. In particular, a node 37 can utilize the query processing module 2435 to execute some or all of the steps of FIG. 25E, where multiple nodes 37 implement their own query processing modules 2435 to independently execute the steps of FIG. 26B. For example, some or all nodes 37 of a query execution plan 2405 can implement query processing module 2435 to facilitate execution of a query. Some or all of the steps of FIG. 26B can optionally be performed by any other processing module of the database system 10. Some or all of the steps of FIG. 26B can performed alternatively or in addition to some or all of the steps of FIG. 25E. Some or all of the steps of FIG. 26B can be performed to implement some or all of the functionality of the operator flow generator module 2514, execution plan generating module 2516, query execution module 2502, and/or of one or more individual nodes 37 as described in conjunction with FIGS. 25A-25D. Some or all of the steps of FIG. 26B can be performed to implement some or all of the functionality regarding execution of a query via the plurality of nodes in the query execution plan 2405 as described in conjunction with FIGS. 24A-24E. Some or all of the steps of FIG. 26B can be performed by utilizing and/or communicating with one or more client devices 2615. Some or all steps of FIG. 26B can be performed by database system 10 in accordance with other embodiments of the database system 10 and/or nodes 37 discussed herein.

Step 2682 includes sending operator library data to a client device that indicates a plurality of operators that includes at least one non-relational operator. Step 2684 includes receiving an executable query expression from the client device. The executable query expression is generated by the client device based on user input to a graphical user interface presented by a display device of the client device, and wherein the executable query expression includes the at least one non-relational operator. Step 2686 includes generating a query operator execution flow based on the executable query expression that includes the at least one non-relational operator. Step 2688 includes generating a query resultant of the query by facilitating execution of the query via a set of nodes of the database system that each perform a plurality of operator executions in accordance with the query operator execution flow, where a subset of the set of nodes each execute at least one operator execution corresponding to the at least one non-relational operator in accordance with the execution of the query. Step 2690 includes sending the query resultant to the client device for display via the display device.

In various embodiments, the executable query expression implements linear algebra functionality and/or implements a machine learning algorithm. In various embodiments, at least one of the plurality of operators of the operator library data corresponds to at least one custom function that is defined based on at least one other one of the plurality of operators. This custom function can be called in or indicated in the executable query expression. In various embodiments, the custom function generated by the same or different client device based on user input to a graphical user interface presented by a display device of the client device.

In various embodiments, the executable query expression includes user-defined parameters to at least one operator, where the at least one operator is executed in accordance with one or more configurable parameters, and where facilitating execution of the query includes utilizing the user-defined parameters to at least one operator.

In various embodiments, the executable query expression is generated and/or compiled in accordance with a corresponding language. In various embodiments, the language has defined grammar rules. In various embodiments, the query operator execution flow is generated based on a set of operators indicated in the executable query expression and further based on the grammar rules to determine an arrangement of the set of operators in the query operator execution flow based on the executable query expression.

FIGS. 27A-27D illustrate embodiment of a query operator execution flow 2433 that includes a replay operator 2720 as one of the operators 2520. For example, one of the non-relational operators 2524 of the non-relational operator library 2564 is or includes the replay operator 2720 of FIG. 27A-27C. The query operator execution flow 2433 can be utilized to implement the query operator execution flow 2433 of FIG. 25B or FIG. 25D, for example, based on the query operator execution flow 2517 being generated by the operator flow generator module 2514 to include the replay operator 2720. In particular, the operator flow generator module 2514 can generate the query operator execution flow 2517 to include the replay operator 2720 based on the query request indicating a call to an iterator function and/or loop, based on the query request indicating a machine learning construct or mathematical function that requires iteration, and/or based on the query request including an executable query expression of FIG. 26A that calls or requires use of the replay operator 2720. The other operators 2520 in the query operator execution flow 2433 can correspond to various operators 2523 and/or 2524.

The replay operator 2720 can indicate or function based on an exit condition 2730, a GOTO operator identifier 2740, and/or output instructions 2750. The exit condition 2730, GOTO operator identifier 2740, and/or output instructions 2750 can be fixed, for example, where any implementation of replay operator 2720 utilizes the same exit condition 2730, a GOTO operator identifier 2740, or output instructions 2750. In other cases, the exit condition 2730, GOTO operator identifier 2740, and/or output instructions 2750 are configurable parameters of the replay operator 2720. For example, these parameters can be selected by the end user via user input to GUI 2668 in entering a corresponding executable query expression that includes a call to the replay operator 2720 and/or includes an iteration function that causes the replay operator 2720 to be included in the query operator execution flow 2433. These parameters can alternatively or additionally be automatically selected and/or determined by the operator flow generator module 2514 based on the query request. These parameters can be selected from a discrete set of options, from a continuous range of values, can be configured via corresponding parameter rules for configuring parameters as defined in the corresponding language for generating an executable query expression, and/or can otherwise be configurable.

The exit condition 2730 can indicate a conditional requirement that, when true, causes the replay operator to terminate iteration, for example, by forwarding data blocks upwards to a next operator in the sequential ordering rather than forwarding data blocks downwards to a previous operator in the sequential ordering. This conditional requirement can correspond to any conditional statement that evaluates to true or false that can be checked by the replay operator, for example, by executing a relational algebra operator 2523, for example, where the replay operator is utilized to implement a while loop construct. This conditional requirement can correspond to a fixed, predetermined number of iterations that, when complete, cause the iteration to terminate, for example, where the replay operator is utilized to implement a for loop construct.

GOTO operator ID 2740 can indicate the particular previous operator in the sequential ordering to which data blocks should be sent by the replay operator when exit condition 2730 is not met. The output instructions 2750 can indicate how input data blocks 2544 of the input data set 2522 should be processed to be sent to the particular previous operator and/or to the next operator when the exit condition is met. In some cases, the input data blocks are simply forwarded to the particular previous operator and/or to the next operator based on whether or not the exit condition 2730 is met. In some cases, to check the exit condition 2730 and/or to further process the input data blocks based on output instructions 2750, the replay operator 2720 can be implemented as a set of multiple operators, such as one or more operators 2523 and/or 2524 that evaluate conditional statements and/or that filter and/or modify data blocks.

Figure 27B:
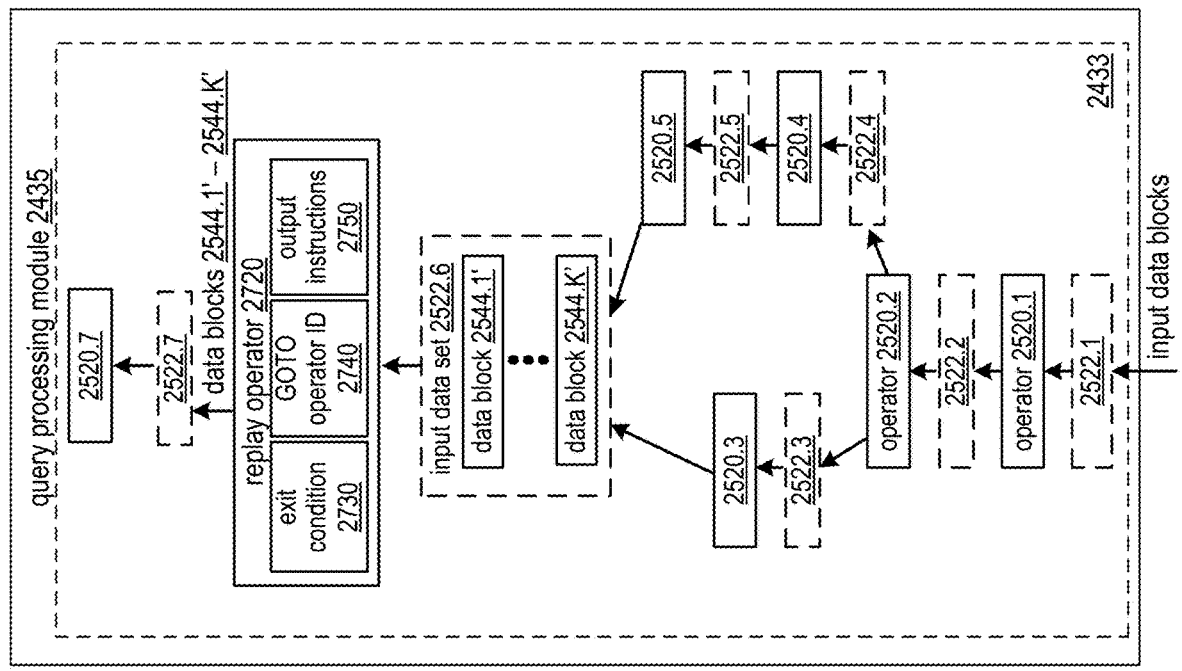
FIGS. 27A-27B are schematic block diagrams of a query operator execution flow that includes a replay operator to implement iteration in accordance with various embodiments of the present invention.
Figure 27A:
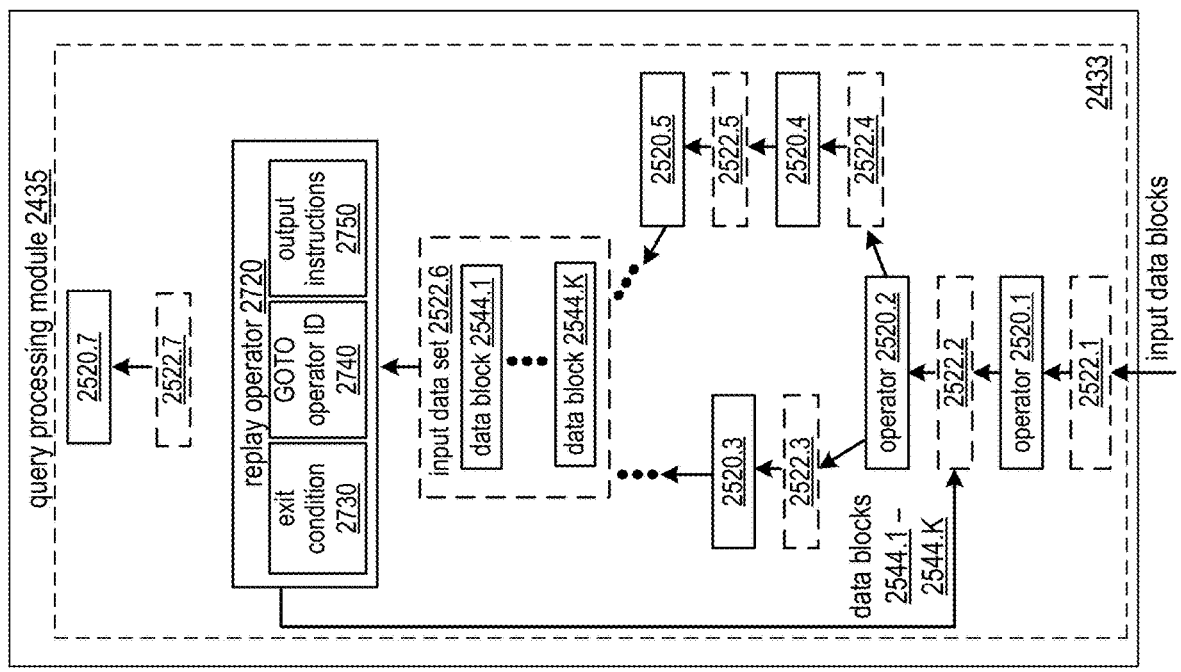

In the example illustrated in FIG. 27A and FIG. 27B, the next operator corresponds to operator 2520.7, and the previous operator corresponds to operator 2523.2. For example, the GOTO operator ID 2740 can indicate that data blocks be sent to input data set 2522.2 for operator 2520.2 when the exit condition 2730 has not been met. In particular, FIG. 27A illustrates the query operator execution flow 2433 at time to where an operator execution of the replay operator 2720 is performed by query processing module 2435. Time to can correspond to a time after at least one iteration of operator executions of data blocks 2522.2-2522.6, where the exit condition 2730 is not met, and data blocks are therefore sent by the replay operator to input data set 2522.2 for operator 2520.2 based on the exit condition 2730 not being met and further based on the GOTO operator ID 2740 indicating operator 2520.2. For example, the set of operators before replay operator 2720 in the query operator execution flow 2433, including operators 2520.1-2520.5, were previously executed prior time to via a plurality of operator executions to populate input data set 2522.6 of the replay operator with data blocks 2544.1-2544.K. In this example, the output instructions 2750 indicate that the input data blocks 2544 in input data set 2522.6 are simply forwarded to the operator 2520.2, and input data blocks 2544.1-2544.K are therefore forwarded to be added to input data set 2522.2 of the operator 2520.2. In other cases, input data blocks 2544.1-2544.K can be processed in accordance with corresponding output instructions 2750 prior to being added to input data set 2522.2 of the operator 2520.2.

The operator 2520.2 is therefore re-executed upon the newly received data blocks 2544.1-2544.K from replay operator 2720 via one or more corresponding operator executions after time $t_0$, for example, based on its input data set 2522.2 being populated with the new data blocks received from the replay operator 2720. Output of executing operator 2520.2 upon data blocks 2544.1-2544.K is sent to the operators 2520.3 and 2520.4 for processing via additional operator executions as discussed in conjunction with FIG. 25A until input data set 2522.6 is again populated with data blocks. These data blocks can be a filtered subset of, modified versions of, and/or can otherwise be distinct from the data blocks that were previously included in input data set 2522 in one or more prior iterations based on a corresponding set of records and/or computed values being reprocessed, modified, and/or further filtered by the set of operators sequentially between operator 2520.2 and operator 2520.6, including operator 2520.3, operator 2520,4, operator 2520.5, and/or operator 2520.2 itself in this example.

Once repopulated, the input data set 2522.6 is again forwarded by the replay operator to either the input data set 2522.2 of operator 2520.2 if the exit condition is still not met, or to the input data set 2522.7 of operator 2520.7 if the exit condition is met. The latter case is illustrated in FIG. 27B, where a subsequent operator execution of the replay operator 2720 is performed time $t_1$ that is after time to. FIG. 27B illustrates the same query operator execution flow 2433 at time $t_1$, after at least one additional iteration of operator executions of data blocks 2522.2-2522.6 were performed after time to, where the exit condition is met. In this case, instead of forwarding the input data blocks to the input data set 2522.2 of operator 2520.2 as was the case in the previous iterations, the replay operator 2720 forwards these data blocks to the input data set 2522.7 of operator 2520.7 based on determining the exit condition 2730 is met. The input data set includes a set of data blocks 2544.1'-2544.K', which can include a different number of data blocks from the set of data blocks 2544.1-2544.K and/or can be distinct from the set of data blocks 2544.1'-2544.K', for example, based on being modified and/or filtered in the additional iterations of the set of operators between operator 2520.2 and 2520.6.

In some cases, the replay operator 2720 operates as a blocking operator, and only sends data blocks to the previous operator indicated by the GOTO operator ID 2740 and/or to the next operator when all required data blocks have been received by an immediately prior one or more operators in the query operator execution flow 2433. In such cases, the previous operator to which data blocks are sent, as well as other operators prior to the replay operator 2720, will have an empty input data sets 2522 based on replay operator 2720 being a blocking operator and requiring all data blocks to have already been processed by previous operators in the sequential ordering. Thus, in this example, operators 2520.2-2520.5 only have their input data sets 2522.2-2522.5 repopulated when a corresponding iteration is performed, based on operators 2520.2 receiving data blocks from replay operator 2720 that are added to its input data set 2522.2.

FIGS. 27A-27B depict an example where iteration is implemented within a query operator execution flow 2433 executed by a query processing module 2435 within a single node 37, for example, where multiple nodes at a same level of the query execution plan independently perform operator executions for the same query operator execution flow 2433 that includes at least one replay operator 2720 as discussed in conjunction with FIG. 25D. In other embodiments, the replay operator can initiate re-execution of operators of query operator execution flow 2517 extending across multiple nodes, for example, where descendant nodes in the query execution plan 2405 re-perform operator executions for some or all of their operators based on the replay operator of a parent node.

Figure 27C:
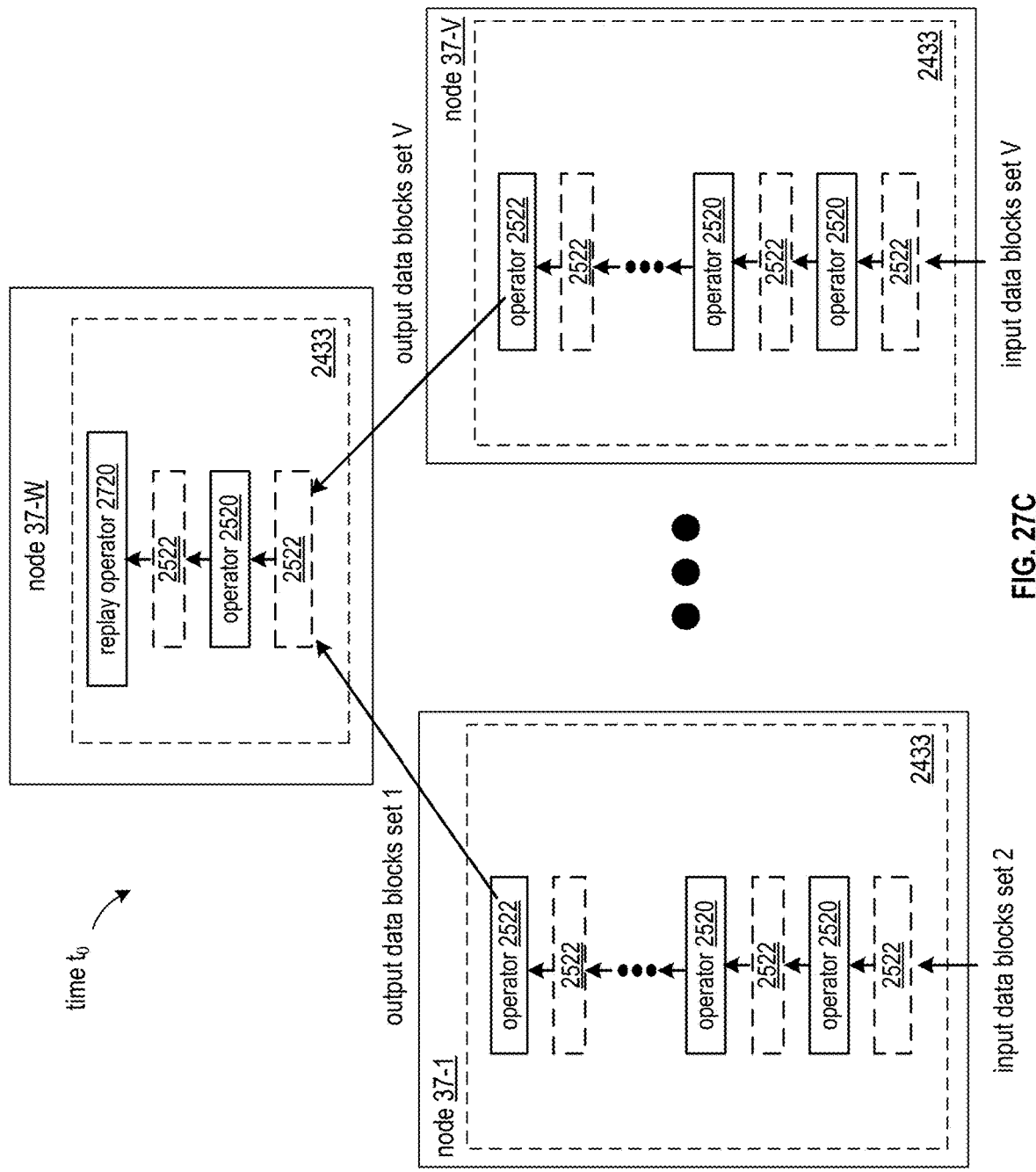
FIGS. 27C-27D are schematic block diagrams of via a plurality of nodes that utilize query operator execution flows to implement iteration in accordance with various embodiments of the present invention.
Figure 27D:
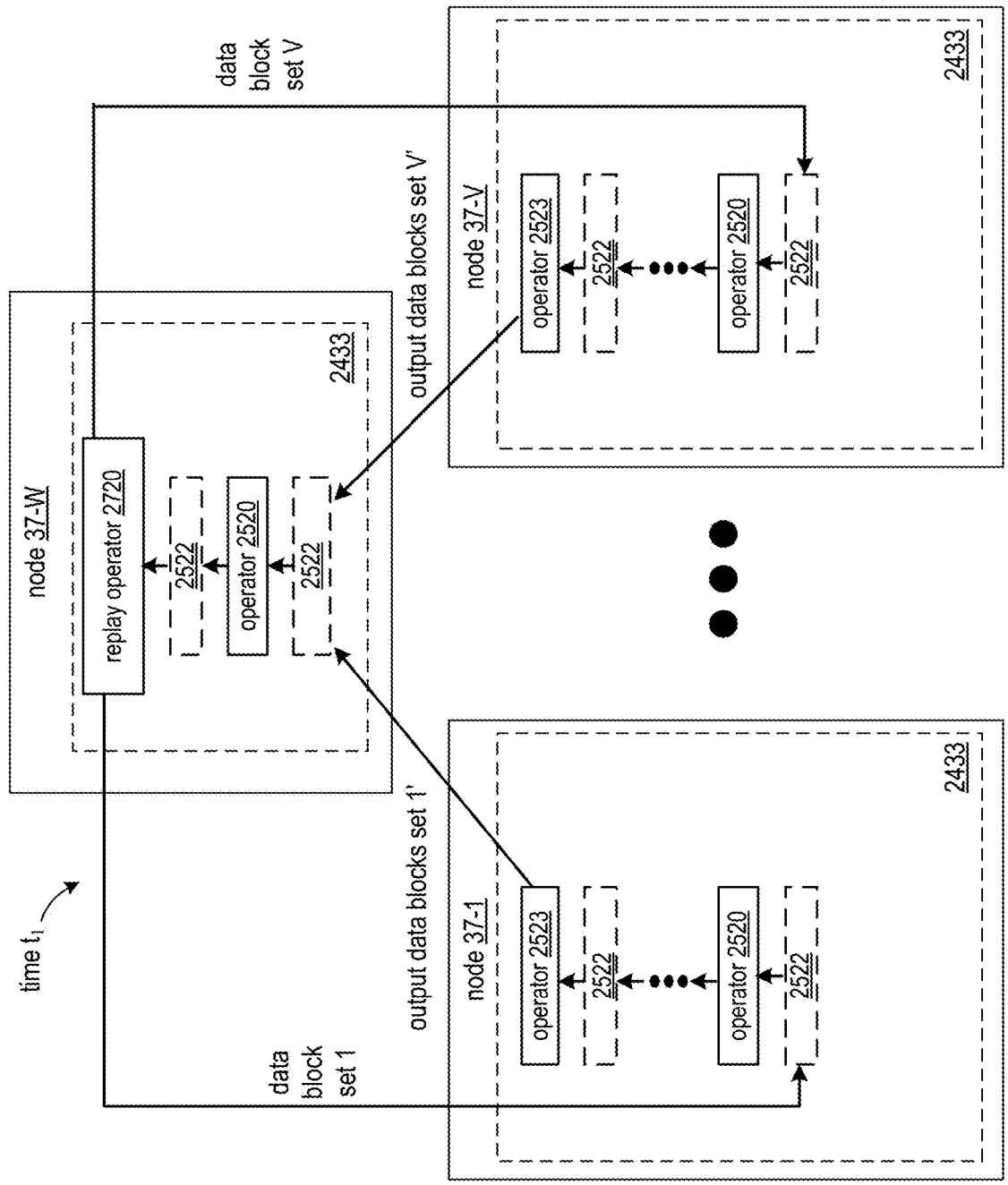

Such an embodiment is illustrated in FIGS. 27C-27D. The nodes of FIGS. 27C-27D can be utilized to implement the nodes depicted in FIG. 25D. The nodes of FIG. 27C-27D can implement the depicted example query operator execution flows 2433 via a query processing module 2435 of the corresponding node as discussed previously. In FIG. 27C, during a time period to corresponding to an initial one of a plurality of iterations, a set of nodes 37-1-37-V, for example, at a same level of a query execution plan, each implement a query operator execution flow 2433, such as the same query operator execution flow 2433, upon their own sets of input data blocks 1-V to generate corresponding sets of output data block 1-V via a plurality of operator executions as discussed previously. These output data blocks are sent to another node 37-W, such as a parent node at a next level in the query execution plan 2405, as input to its first operator in its own query operator execution flow 2433, which can be different from the query operator execution flow 2433 of nodes 37-1-37-V. Operator executions are performed by node 37-W until an input data set for a replay operator 2720 is populated, for example, with all required data blocks where input data sets for any previous operators in the operator execution flow are empty and where all output data blocks have been received from nodes 37-1-37-V in this first iteration.

As illustrated in FIG. 27D, during a time period $t_1$ corresponding to a next one of a plurality of iterations, the replay operator of node 37-W sends data blocks to nodes 37-1-37V for re-processing as input data blocks by particular operator, for example, denoted by the GOTO operator identifier 2740. For each node 37-1-37V, all operators of the query operator execution flow 2433 starting from this particular operator have operator executions re-performed based on processing these new incoming data blocks from node 37-W to generate corresponding sets of output data block sets 1-V', where the output data block sets 1'-V' are different from the output data block sets 1-V based on the data blocks, such as a corresponding set of records and/or computed values, being further modified and/or filtered in this next iteration. These output data block sets 1-V' are again utilized as input to the first operator in node 37-W's query operator execution flow 2433, and operator executions are again performed until the replay operator has its input data set 2522 again populated with all required data blocks. This process illustrated in FIG. 27D can continue until the exit condition 2730 has been met, where the output data blocks of the replay operator 2720 are instead sent to a next operator in the node 37-W's query operator execution flow 2433.

The data blocks sent by node 37-W via an operator execution of replay operator 2720 can be distinct sets of data blocks 1-V, as depicted in FIG. 27D. For example, all data blocks included in the replay operator's input data set 2622, prior to or after any processing denoted by output instructions 2750, can be segregated into V distinct sets, where each set is designated for forwarding to one of the set of nodes 37-1-37-V to again decentralize and parallelize processing by nodes 37-1-37-V for their subsequent iterations of executing their operators in their query operator execution flows 2433, starting from the operation designated to receive the data blocks from node 37-W. Thus, the sets of data blocks 1-V can be mutually exclusive and/or collectively exhaustive with respect to the full data blocks outputted by replay operator 2720 and/or the data blocks included in input data set 2522 of the replay operator 2720 when the exit condition is not met. The full set of data blocks outputted by replay operator 2720 after an iteration where the exit condition is met are all sent to the next operator in the query operator execution flow 2433 of node 37-W rather than being segregated into the V groups. This segregation and dispersal of output for processing by nodes 37-1-37V can mimic the initial iteration of processing query operator execution flow 2433 by nodes 37-1-37-V illustrated in FIG. 27C, where V distinct sets of input data blocks are received from descendant nodes and/or retrieved from memory. This ensures each node is not overloaded with processing of subsequent iterations and/or ensures that resultants do not include duplicated rows and/or duplicated data blocks based on the same records and/or data blocks being processed by multiple different nodes in subsequent iterations.

Figure 27E:
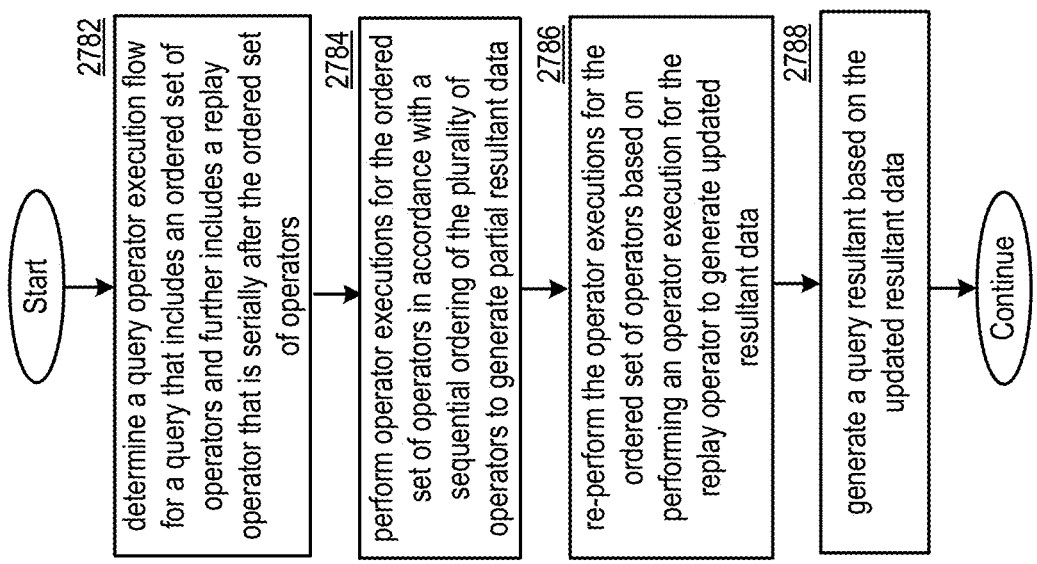
FIG. 27E is a logic diagram illustrating a method of executing a query that includes a replay operator to implement iteration in accordance with various embodiments of the present invention.

FIG. 27E illustrates a method for execution by a query processing system 2510, such as the query processing system 2510 of FIG. 25A and/or FIG. 25C. Some or all of the method of FIG. 27E can be performed by utilizing the operator flow generator module 2514, the execution plan generating module 2516, and/or the query execution module 2502 of the query processing system 2510 of FIG. 25A. For example, the database system 10 can utilize at least one processing module of one or more nodes 37 of one or more computing devices 18 that are utilized to implement the query execution module 2502 and/or other portions of the query processing system 2510. The one or more nodes can execute operational instructions stored in memory accessible by the one or more nodes, where the execution of the operational instructions causes the one or more nodes 37 to execute, independently or in conjunction, the steps of FIG. 27E. In particular, a node 37 can utilize the query processing module 2435 to execute some or all of the steps of FIG. 27E as illustrated in FIGS. 27A-27D, where multiple nodes 37 implement their own query processing modules 2435 to independently execute the steps of FIG. 27E. For example, some or all nodes 37 of a query execution plan 2405 can implement query processing module 2435 to facilitate execution of a query via performing at least one operator execution utilizing a replay operator 2720 of FIGS. 27A-27D. Some or all of the steps of FIG. 27E can optionally be performed by any other processing module of the database system 10. Some or all of the steps of FIG. 27E can performed alternatively or in addition to some or all of the steps of FIG. 25E. Some or all of the steps of FIG. 27E can be performed to implement some or all of the functionality of the operator flow generator module 2514, execution plan generating module 2516, query execution module 2502, and/or of one or more individual nodes 37 as described in conjunction with FIGS. 25A-25D and/or FIGS. 27A-27D. Some or all of the steps of FIG. 27E can be performed to implement some or all of the functionality regarding execution of a query via the plurality of nodes in the query execution plan 2405 as described in conjunction with FIGS. 24A-24E. Some or all steps of FIG. 26B can be performed by database system 10 in accordance with other embodiments of the database system 10 and/or nodes 37 discussed herein.

Step 2782 includes determining a query operator execution flow for a query that includes an ordered set of operators and further includes a replay operator that is serially after the ordered set of operators. Step 2784 includes performing operator executions for the ordered set of operators in accordance with a sequential ordering of the plurality of operators to generate partial resultant data. Step 2786 includes re-performing the operator executions for the ordered set of operators based on performing an operator execution for the replay operator to generate updated resultant data. Step 2788 includes generating a query resultant based on the updated resultant data.

In various embodiments, the method includes adding the partial resultant data as input data blocks to at least one serially first operator of the ordered set of operators, where the operator executions are re-performed by utilizing the input data blocks. In various embodiments, the method includes re-performing operator executions for the ordered set of operators multiple times to generate multiple corresponding updated resultant data. In various embodiments, a number of iterations of performing operator executions for the ordered set of operators is based a fixed number of iterations indicated in the replay operator. In various embodiments, iteration of the ordered set of operators terminates based on determining an exit condition indicated in the replay operator has been met.

In various embodiments, a node of the query processing system performs and re-performs the operator executions for the ordered set of operators. In various embodiments, a first node performs operator executions for a subset of the ordered set of operators and sends output of a final one of the subset of the ordered set of operators to a second node. The second node performs an operator execution for the replay operator to instruct the first node to re-perform the subset of the ordered set of operators.

In various embodiments, the query operator execution flow further includes a second ordered set of operators that are serially after the replay operator. The query resultant is generated based on performing operator executions for the second ordered set of operators by utilizing the updated resultant data as input data blocks to a first one of the second ordered set of operators.

In various embodiments, the replay operator is utilized to implement a regression function, and the query resultant is based on output of the regression function. In various embodiments, the replay operator is utilized to implement a classification function, and the query resultant is based on output of the classification function. In various embodiments, the replay operator is utilized to implement a clustering algorithm, and the query resultant is based on output of the clustering algorithm.

FIGS. 28A-28D illustrate embodiments of query operator execution flows 2433 that include a custom-join operator 2820 as one of the operators 2520. For example, one of the non-relational operators 2524 of the non-relational operator library 2564 is or includes the custom join operator 2820 of FIG. 28A-28D. The query operator execution flow 2433 can be utilized to implement the query operator execution flow 2433 of FIG. 25B or FIG. 25D, for example, based on the query operator execution flow 2517 being generated by the operator flow generator module 2514 to include the custom join operator 2820. In particular, the operator flow generator module 2514 can generate the query operator execution flow 2517 to include the custom join operator 2820 based on the query request indicating a call to group pairs based on custom conditional criteria, based on the query request indicating a machine learning construct or mathematical function that requires joining records based on custom, non-relational conditional criteria, and/or based on the query request including an executable query expression of FIG. 26A that calls the custom join operator 2820, configures the conditional criteria of the custom join operator 2820, or requires use of the custom join operator 2820. In some cases, the custom join operator includes a set of operators, which can include the replay operator 2720 of FIGS. 27A-27D, where execution of the custom-join operator includes iteration of an ordered set of operators via the replay operator 2720 of the custom-join operator. The other operators 2520 in the query operator execution flow 2433 can correspond to various operators 2523 and/or 2524.

Some machine learning models and/or other customized queries may necessitate join operators that are customizable to perform a relational join operation based on custom criteria. This can include identifying pairs of records from two data sets and/or sets of three or more records from three or more data sets based on the pairs of records or sets of records being determined to satisfy the custom criteria. This custom criteria user-defined criteria, for example, indicated by a corresponding executable query expression generated via user input as discussed in conjunction with FIG. 26A. Rather than merely returning records with matching values and/or returning records based on evaluating a conditional statement as true or false based on entirely relational algebraic operators, the JOIN can implement any customizable criteria as a function of data from both sets involved in the JOIN, for example, in accordance with performing one or more non-relational operators 2524 on the records from one or both sets involved in the JOIN to evaluate a corresponding condition statement to determine if a given pair of records satisfies the corresponding conditional statement. In such cases, any statement that evaluates to TRUE or FALSE can be implemented, even if this statement requires generating one or more intermediate values for comparison via performance of one or more non-relational operators 2524. This improves database systems in expanding the capabilities of join operations to be performed in accordance with evaluating output of linear algebra functionality. Furthermore, this expanded functionality enables the custom join operators to be implemented within query operator execution flows to decentralize execution of the custom-join to implement decentralized execution of corresponding machine learning algorithms and/or mathematical functions that require linear algebra constructs.

The custom join operator 2820 can indicate or function based on a custom conditional statement 2830 and/or data sharing instructions 2840. The custom conditional statement 2830 and/or the data sharing instructions 2840 can be fixed, for example, where any implementation of custom-join operator 2820 utilizes the same custom conditional statement 2830 and/or the same data sharing instructions 2840. In other cases, the custom conditional statement 2830 and/or the data sharing instructions 2840 are configurable parameters of the custom join operator 2820. For example, these parameters can be selected by the end user via user input to GUI 2668 in entering a corresponding executable query expression that includes a call to the custom join operator 2820 and/or includes a machine learning algorithm and/or mathematical function that causes the custom join operator 2820 to be included in the query operator execution flow 2433. These parameters can alternatively or additionally be automatically selected and/or determined by the operator flow generator module 2514 based on the query request. These parameters can be selected from a discrete set of options, from a continuous range of values, can be configured via corresponding parameter rules for configuring parameters as defined in the corresponding language for generating an executable query expression, and/or can otherwise be configurable.

Figure 28A:
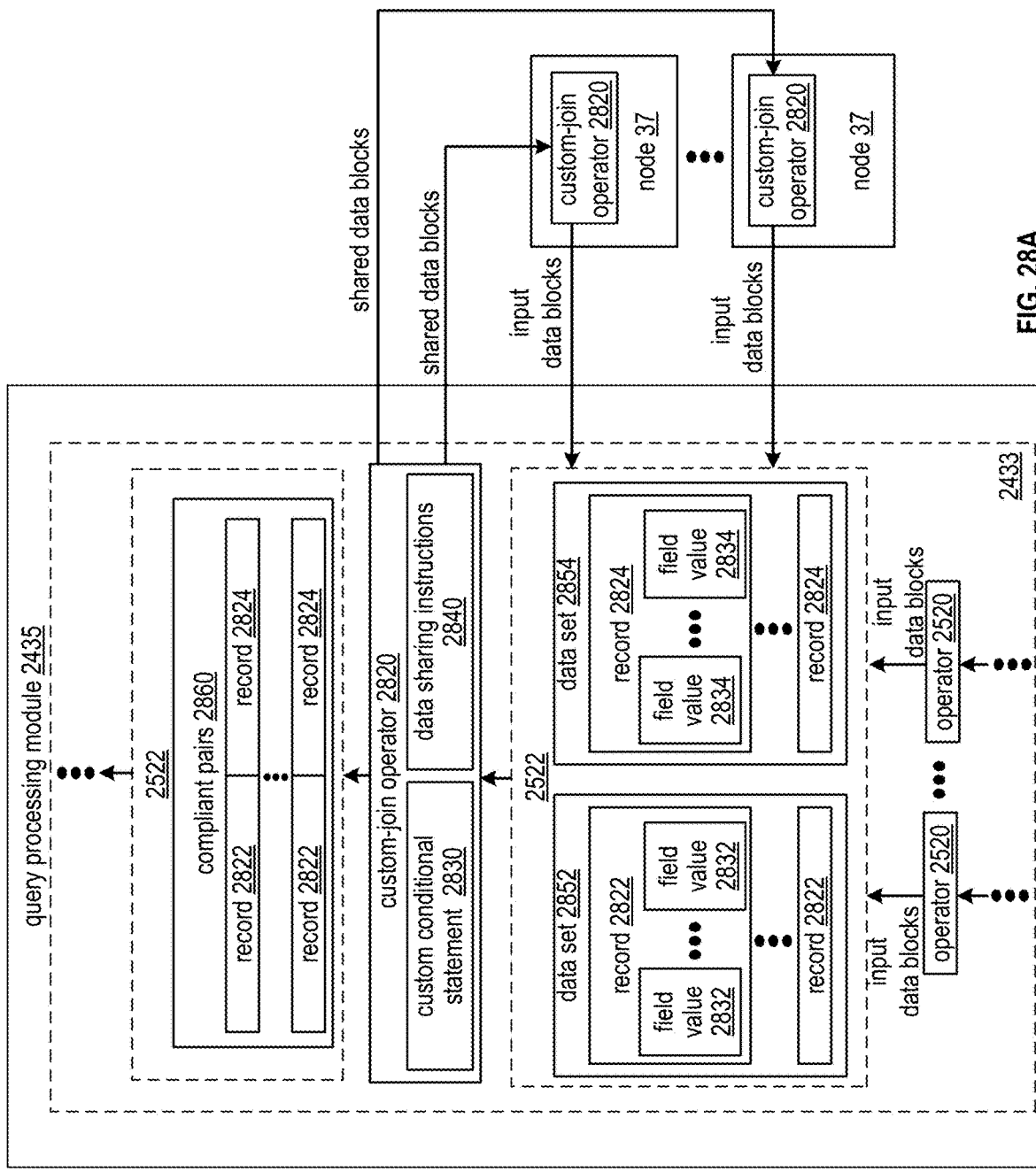
FIG. 28A is a schematic block diagram of a query operator execution flow that includes a custom join operator in accordance with various embodiments of the present invention.

As illustrated in FIG. 28A, one or more operators of a query operator execution flow 2433 can be performed upon input data blocks to generate a first data set 2852 and a second data set 2854 as output data blocks received in the input data set 2522 of a custom join operator. Alternatively, data set 2852 and/or data set 2854 are retrieved directly from memory of the database system and/or are received from one or more IO level nodes that retrieved records 2822 and/or 2824. The custom join operator can be a blocking operator that requires that all required data blocks to input data set 2522 be received and/or that either the data set 2852 or the data set 2854 include all corresponding records before its execution, to ensure that each record from one data set is compared to all records of the other data set.

The custom-join operator generates compliant pairs 2860 as output that include all pairs of records that comply with the custom conditional statement 2830 of the custom join operator and/or whose output of the custom conditional statement 2830 evaluates as TRUE. Each pair of records can include one record from data set 2852 and one record from data set 2854 that, when one or more of their corresponding field values 2832 and/or 2834 are utilized as input to the custom conditional statement 2830, render the custom conditional statement 2830 to evaluate as TRUE. Other possible pairs of records that include one record from data set 2852 and one record from data set 2854 that, when one or more of their corresponding field values 2832 and/or 2834 are utilized as input to the custom conditional statement 2830, render the custom conditional statement 2830 to evaluate as FALSE, are therefore not included as a pair identified in the compliant pairs 2860. Further operators 2523 and/or 2524 can optionally be performed on the compliant pairs 2860 to generate the resultant data blocks of the query operator execution flow 2433.

Data set 2852 can include a first plurality of records 2822, which can each include a set of field values 2832 of a corresponding set of fields of the record 2822. For example, the records 2822 can correspond to a particular type of records 2422, for example, where all records 2822 are from a same relational table and/or all have identical sets of fields types that may each be populated with different values of a same type in accordance with each given field type. Each record 2822 can correspond to an original record 2422 retrieved from memory of the database system, can correspond to an original subset of fields of an original record 2422 retrieved from memory of the database system, can correspond to a modified record 2422 based on performing one or more operators 2523 and/or 2524 to modify an original record 2422 retrieved from memory of the database system to generate record 2822, and/or can correspond to a new record generated based on performing one or more operators 2523 and/or 2524 upon or more records 2422 retrieved from memory of the database system.

Data set 2854 can similarly include a second plurality of records 2824, which can each include a set of field values 2834 of a corresponding set of fields of the record 2824. Again, the records 2824 can correspond to a particular type of records 2422, for example, where all records 2824 are from a same relational table and/or all have identical sets of fields types that may each be populated with different values of a same type in accordance with each given field type. Each record 2824 can similarly correspond to an original record 2422 retrieved from memory of the database system, can correspond to an original subset of fields of an original record 2422 retrieved from memory of the database system, can correspond to a modified record 2422 based on performing one or more operators 2523 and/or 2524 to modify an original record 2422 retrieved from memory of the database system to generate record 2824, and/or can correspond to a new record generated based on performing one or more operators 2523 and/or 2524 upon or more records 2422 retrieved from memory of the database system.

The records 2822 can be different types of records from records 2824, for example, based on being from different relational tables and/or based on being modified versions of records of different relational tables. The records 2822 can be different types of records from records 2824 based on having different sets of fields, where the set of fields of each record 2822 includes at least one field type that is different from the set of fields of each record 2824. The records 2822 can alternatively be the same type of records as records 2824, for example, based on being from the same relational table and/or based on being modified versions of the records of the same relational table. In some cases, the data sets 2852 and 2854 are mutually exclusive, regardless of whether the records 2822 and 2824 are the same or different. In some cases, the data sets 2852 and 2854 include records of the same type and have a non-null intersection. In some cases, the data sets 2852 and 2854 include records of the same type, where data sets 2852 and 2854 have a null set difference and/or are otherwise identical sets.

In some cases, the data sharing instructions 2840 are determined in accordance with a partitioning strategy. The partitioning strategy can be determined to partition both sets involved in the join for processing by designated nodes in accordance with the custom-join operator 2820. This can be ideal in cases where the custom conditional criteria of the custom-join renders a resultant that is guaranteed to be correct when records from one data set do not need to be compared to every single record of the other data set. This can be based on identifying portions of one data set that need not be evaluated given characteristics of the record of the other data set. In such cases, the custom join is evaluated, with a resultant guaranteed to be correct, where at least one record of the first input data set is not compared to every record of the second data set, by a single node or across multiple nodes. This can be ideal in reducing computation time to more efficiently process queries and to leverage the parallelized and decentralized processing of corresponding queries via a plurality of nodes of a query execution plan 2405. The data sharing instructions 2840 can indicate which portions of data be sent to other nodes 37 in accordance with such as partitioning strategy and/or can indicate which records of one data set can be filtered from comparison to a given record of the other data set.

In some cases, evaluation of a custom join to render a resultant guaranteed to be correct may require that each record of one data set inputted to the custom join must be compared to every record of one or more other data sets inputted to the custom-join. In such cases, a default partition strategy can be implemented where the larger set is partitioned and utilized by a corresponding set of nodes, and the smaller set is broadcast to each of the set of nodes for comparison to its received partition of the larger set, in accordance with the criteria of the custom-join. An example of such an embodiment is discussed in further detail in conjunction with FIG. 28B.

In either case where a custom or default partitioning strategy is indicated, the data sharing instructions 2840 can be utilized to determine sets of shared data blocks to be sent to other nodes 37. For example, the other nodes 37 are participating in a same level of a corresponding query execution plan 2405 and perform the same query operator execution flow 2433 on different sets of input data, and utilize the shared data blocks as input to their respective custom join operator 2820 as records included in data set 2852 and/or data set 2854 of their respective custom join operator 2820. These shared data blocks can be the same or different for different nodes 37. These shared data blocks can include some or all records 2822 from data set 2852 and/or some or all records 2822 from data set 2854. The given node 37 can additionally receive shared data blocks outputted by the other nodes 37 as input data blocks that further populate data set 2852 and/or data set 2854 utilized as input to its own custom-join operator 2820. For example, a first proper subset of data set 2852 and/or data set 2854 are generated by previous operators of the node's own query operator execution flow 2433 based on input data blocks to the node from memory and/or from descendant nodes in the query execution plan 2405. A second proper subset of data set 2852 and/or data set 2854 are generated by previous operators of other nodes' query operator execution flows 2433 based on input data blocks to the other node from memory and/or from their descendant nodes in the query execution plan 2405. The first proper data set and second proper data set are mutually exclusive and collectively exhaustive with respect to the entire data set 2852 and/or data set 2854 utilized as input to the node's own custom-join operator 2820.

Figure 28B:
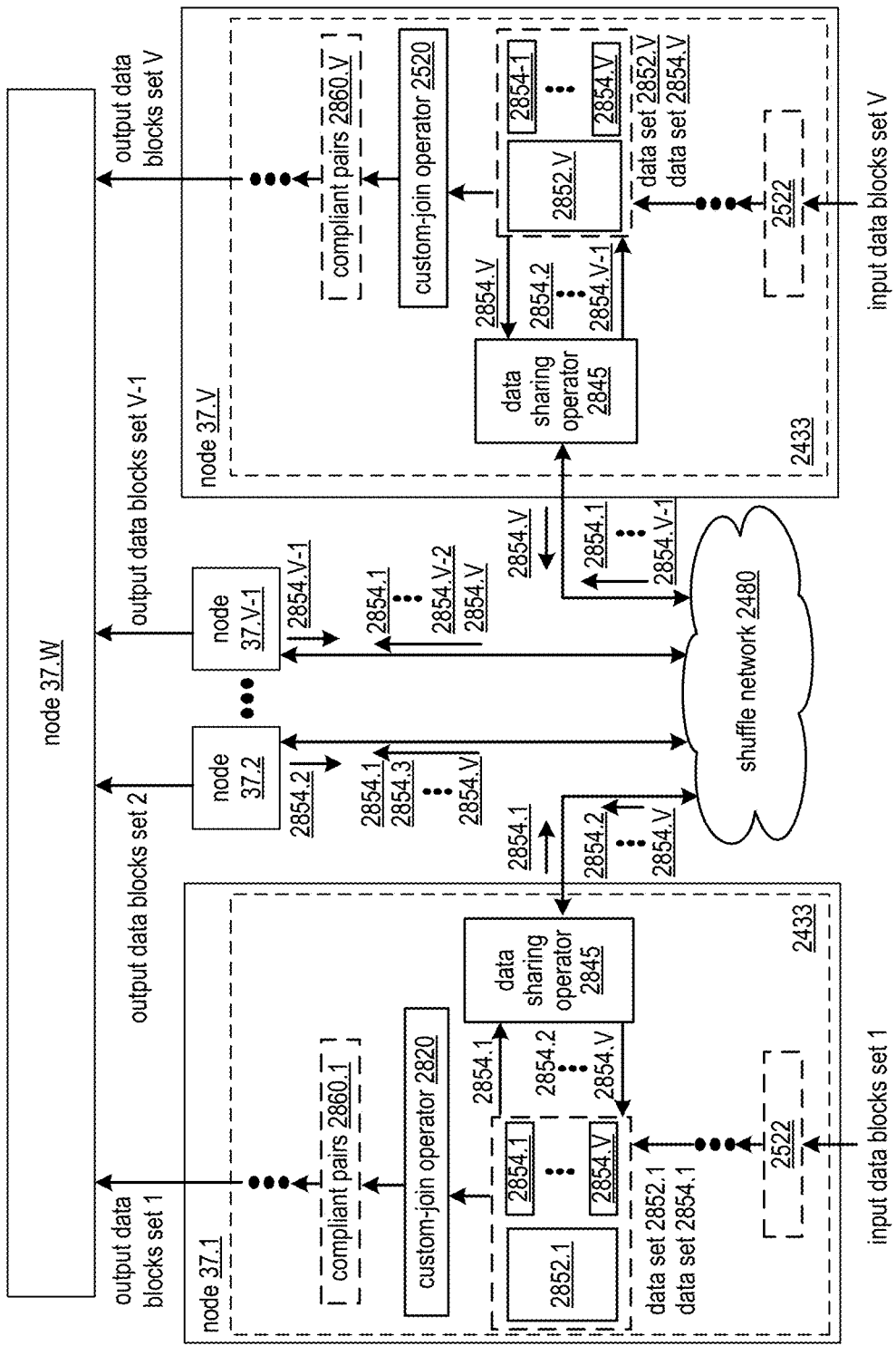
FIG. 28B is a schematic block diagram of a via a plurality of nodes communicating via a shuffle network that that utilize query operator execution flows that include a custom join operator in accordance with various embodiments of the present invention.

Such an embodiment of sharing data blocks is illustrated in FIG. 28B by a set of nodes 37.1-37.V. The nodes 37.1-37.V can be included in a same level of a corresponding query execution plan 2405 and/or can communicate data via a shuffle network 2480, for example, based on being included in a same shuffle node set 2485. The plurality of nodes 37.1-37.V, and/or node 37.W of FIG. 28B can be utilized to implement the plurality of nodes 37 of FIG. 25D.

Each of the set of nodes 37.1-37.V receives and/or generates a corresponding one of the plurality of mutually exclusive subsets 2852.1-2852.V that are collectively exhaustive with respect to a full data set 2852. The corresponding one of the plurality of subsets 2852.1-2852.V is received as input data from memory or from one or more child nodes, and/or is generated as output of operator executions of its own one or more operators 2520 sequentially prior to the custom join operator 2820 in its query operator execution flow 2433. Each of the set of nodes 37.1-37.V also receives and/or generates a corresponding one of the plurality of mutually exclusive subsets 2854.1-2854.V that are collectively exhaustive with respect to a full data set 2854. The corresponding one of the plurality of subsets 2854.1-2854.V is received as input data from memory or from one or more child nodes, and/or is generated as output of operator executions of its own one or more operators 2520 sequentially prior to the custom-join operator 2820 in its query operator execution flow 2433.

The embodiment of FIG. 28B utilizes decentralized query execution by a plurality of nodes 37.1-27.V that each perform a same query operator execution flow that includes a same custom-join operator 2820 to collectively perform the custom-join on the full data set 2852 with the full data set 2854. In particular, a partitioning scheme is utilized includes partitioning the full data set 2852 into a distinct plurality of mutually exclusive and collectively exhaustive subsets 2852.1-2852.V, where the entirety of data set 2854 is shared across all of the nodes 37.1-37.V to be processed in conjunction with their partitioned subset of the full data set 2852. For example, data set 2854 is automatically selected as the data set to be shared and data set 2852 is selected as automatically selected as the data set to remain partitioned based on the data set 2854 being smaller than data set 2852 to reduce the amount of data passing necessary.

A data sharing operator 2845 can be implemented in accordance with the data sharing instructions 2840 of the custom-join operator 2820 to send corresponding records to other nodes for processing via their own custom-join operators 2820. In this case, as the entirely of data set 2854 is selected to be shared across all nodes 37.1-37.V, each node broadcasts, via shuffle network 2485, its own corresponding partition of data set 2854 that was received from memory and/or child nodes, and/or that was generated via previous operators 2520 in the corresponding node's query operator execution flow 2433. In other cases, different data can be broadcast by each node 37 to some or all other nodes 37 based on different partitioning schemes. As illustrated, each node receives a V-1 other subsets of data set 2854 that, in union with their own received and/or generated subset of data set 2854, renders the entirety of data set 2854. Each node performs one or more operator executions of custom join operator 2820 utilizing this received, entire data set 2854 with its own distinct partition of data set 2852 to generate its corresponding set of compliant pairs 2860. This set of compliant pairs 2860 of each node can be sent and/or further processed via additional operators of the query operator execution flow 2433 of the each node as resultant data blocks. The node 37.W, which can be a parent node of the set of nodes 37.1-37.V in the query execution plan 2405, can receive a set of output data blocks 1-V that include and/or are generated based on compliant pairs 2860.1-2860.V.

As each set of complaint pairs of the plurality of compliant pairs 2860.1-2860.V includes a pairs that include records 2822 from its subset of the plurality of subsets 2820.1-2820.V and records from the data set 2854 that render evaluation of the custom conditional statement 2830 as TRUE, the union of the complaint pairs 2860.1-2860.V includes every complying pair of records from the entire data set 2852 with records from the entire data set 2854 that render evaluation of the custom conditional statement 2830 as TRUE. Thus, the union of output data blocks 1-V received by node 37.W can include and/or be based on the entire set of compliant pairs 2860 that would be equivalent to the set of compliant pairs 2860 that would be generated via performance of the custom-join operator 2820 upon the full data set 2852 and full data set 2854, for example, via implementation of a single query operator execution flow 2433.

Figure 28C:
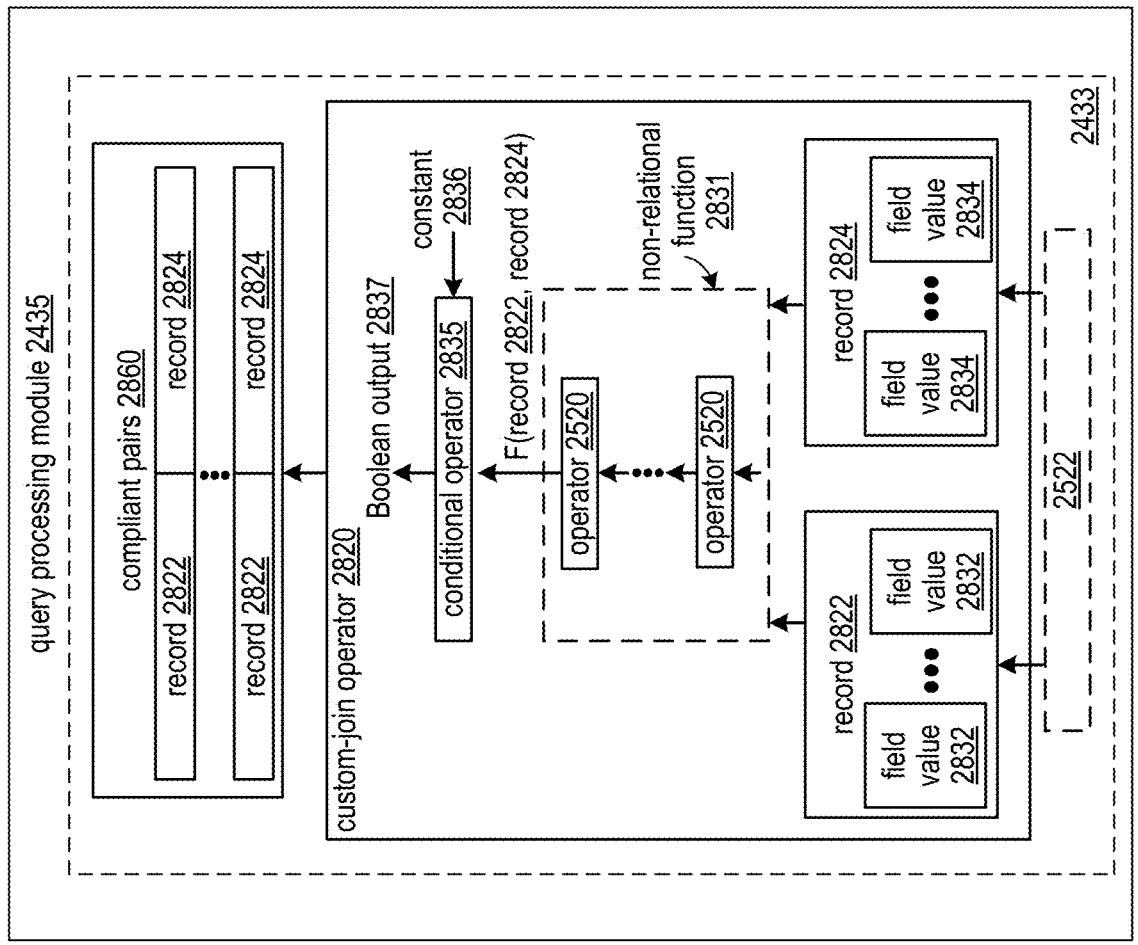
FIGS. 28C and 28D are schematic block diagram of a query operator execution flow that utilize non-relational functions to implement a custom join operator in accordance with various embodiments of the present invention.
Figure 28D:
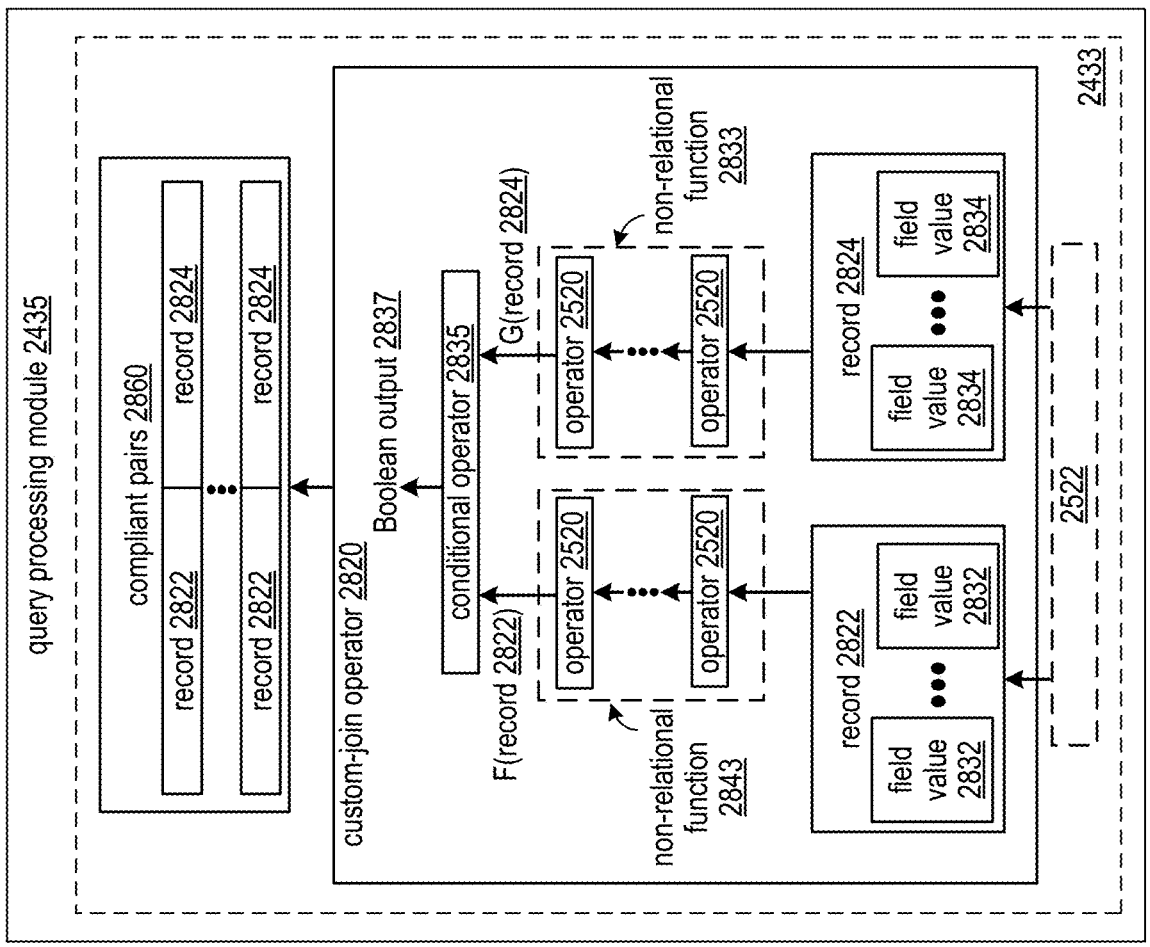

FIGS. 28C and 28D illustrate embodiments of custom join operator 2820 that, for each possible pair of records in its data set 2852 and data set 2854, perform one or more non-relational operators 2524 upon one or more fields 2832 of the record 2822 in the given pair and/or upon one or more field values 2834 of the record 2824 in the given pair. As illustrated in FIG. 28C, a non-relational function 2831 is performed upon one or more fields 2832 of the record 2822 in a given pair and/or upon one or more field values 2834 of the record 2824 in the given pair to generate output. This output can thus be represented as F (record 2822, record 2824), where F is a function of at least one field value 2832 of given record 2822 and/or at least one field values 2834 of given record 2824. In particular, the corresponding custom condition statement 2830 of the custom-join operator 2820 indicate performance of a conditional operator 2835 upon the output of this F (record 2822, record 2824).

Thus the corresponding conditional operator 2835 is applied to this output F (record 2822, record 2824) to generate Boolean output 2837. For example, the conditional operator can correspond to determining whether a value in output of F (record 2822, record 2824) is equivalent to, less than, less than or equal to, greater than, greater than or equal to, not equal to, and/or has another conditional relationship with a constant value 2836 indicated by the corresponding custom conditional statement 2830. Alternatively, rather than a fixed constant value, a different value can be updated based on previous operator executions of the custom-join on previous pairs. For example, the value is updated to reflect a running maximum and/or running minimum output of F (record 2822, record 2824) for previous, and/or is updated to reflect a running set of maximums and/or running set of minimums in output F (record 2822, record 2824) for previous pairs where this set includes a fixed number of pairs K, for example, indicated as constant value 2836.

This latter case can optionally be utilized to implement the KNN-join operator 2920 of FIGS. 29A-29E, for example, where K reflects the K lowest outputs F (record 2822, record 2824) generated so far in operator executions of custom-join operator 2820 on previous pairs, and where F (record 2822, record 2824) replaces one of the K lowest outputs to update the K lowest outputs to when F (record 2822, record 2824) is less than one or more of the K lowest outputs, for example, where output of F (record 2822, record 2824) is output of a similarity function performed upon record 2822 and record 2824 via non-relational function 2831.

In some cases, F (record 2822, record 2824) produces a set of multiple values, where the conditional operator can correspond to determining whether one of the set of multiple values in output of F (record 2822, record 2824) is equivalent to, less than, less than or equal to, greater than, greater than or equal to, not equal to, and/or has another conditional relationship with another one of the set of multiple values in output of F (record 2822, record 2824). Pairs whose output of F (record 2822, record 2824) evaluates as TRUE in Boolean output 2837 when conditional operator 2835 is applied are included in compliant pairs 2860, and pairs whose output of F (record 2822, record 2824) evaluates as FALSE in Boolean output 2837 when conditional operator 2835 is applied are not included in compliant pairs 2860.

The conditional operator 2835 can be based on multiple comparisons, for example, via comparisons performed on multiple corresponding values in output of F (record 2822, record 2824) and/or performed on multiple constant values 2836 and/or performed on multiple dynamically updated values based on previous pairs of records processed via previous operator executions of the custom-join operator 2820. For example, the output utilizing more than two values to can be based on including one or more AND operators and/or one or more OR operators to evaluate whether the output of the multiple comparisons renders the output as TRUE or FALSE. In any case, conditional operator 2835 can be implemented via only relational algebra operators 2522 upon output of F (record 2822, record 2824), for example, as its own query operator execution flow of multiple operators if the corresponding conditional statement requires multiple comparisons.

In some cases, performing non-relational function 2831 includes executing a replay operator 2720 to generate the output F (record 2822, record 2824) based on a plurality of iterations of one or more other operators of the non-relational function 2831. In some cases, performing non-relational function 2831 includes generating output F (record 2822, record 2824) as a similarity value, where F (record 2822, record 2824) is a similarity function and/or distance function measured between record 2822, record 2824. For example, records 2822 and records 2824 have are of the same type, where the set of field values 2832 are the same type as the set of field values 2834, and F (record 2822, record 2824) implements a Euclidean distance function or other function of vector distance, for example, utilizing the set of field values 2832 and the set of field values 2834 as two input vectors of the Euclidean distance function of other measure of vector distance.

The non-relational function 2831 utilized to generate this output as F (record 2822, record 2824) can be implemented by and/or otherwise expressed as its own query operator execution flow of one or more operators 2520 that can include at least one operator 2524 and/or one or more operators 2523. These operators can be arranged in accordance with a predefined arrangement in accordance with the corresponding custom conditional statement 2830. For example, in generating the query operator execution flow 2517, the operator flow generator module 2514 automatically determines the query operator execution flow utilized to implement this non-relational function 2831 of the custom join operator 2820 based on the custom conditional statement 2830 indicated for the custom join operator 2820 indicated in and/or determined based on the query request, such as an executable query expression generated as discussed in conjunction with FIG. 26A.

FIG. 28D illustrates a case where record 2822 and record 2824 of each given pair are processed separately via a non-relational function 2843 and/or a non-relational function 2833. The non-relational function 2843 is performed upon one or more fields 2832 of the record 2822 in a given pair to generate output represented as F (record 2822). The same or different non-relational function 2833 is performed upon one or more field values 2834 of the record 2824 in the given pair to generate output represented as G (record 2824). For example, implementing these separate functions to generate F (record 2822) and G (record 2824) can be considered a particular case of output to F (record 2822, record 2824) where record 2822 and record 2824 are processed separately. In such cases, the conditional operator 2835 is applied by comparing F (record 2822) and G (record 2824) to generate Boolean output 2837. For example, Boolean output 2837 is generated: based on determining whether F (record 2822) is equivalent to G (record 2824); based on determining whether F (record 2822) is not-equivalent to G (record 2824); based on determining whether F (record 2822) is less than G (record 2824); based on determining whether F (record 2822) is less than or equal to G (record 2824); based on determining whether F (record 2822) is less than or equal to G (record 2824); based on determining whether F (record 2822) is greater than G (record 2824); based on determining whether F (record 2822) is greater than or equal to G (record 2824); and/or based on determining a different evaluation utilizing F (record 2822) and G (record 2824) that evaluates to either TRUE or FALSE.

Non-relational function 2843 and/or a non-relational function 2833 can similarly be implemented their own query operator execution flows that can include at least one non-relational operator 2524 and/or at least one relational algebra operator 2523. For example, in generating the query operator execution flow 2517, the operator flow generator module 2514 automatically determines the query operator execution flow utilized to implement non-relational function 2843 and/or non-relational function 2833 of the custom join operator 2820 based on the custom conditional statement 2830 indicated for the custom join operator 2820 indicated in and/or determined based on the query request, such as an executable query expression generated as discussed in conjunction with FIG. 26A.

Figure 28E:
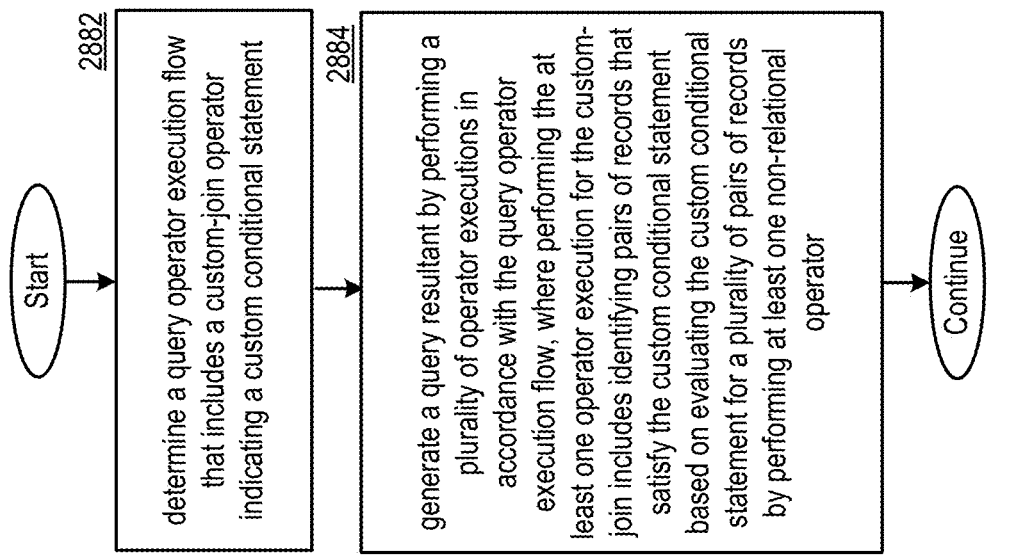
FIG. 28E is a logic diagram illustrating a method of executing a query that includes a custom join operator in accordance with various embodiments of the present invention.

FIG. 28E illustrates a method for execution by a query processing system 2510, such as the query processing system 2510 of FIG. 25A and/or FIG. 25C. Some or all of the method of FIG. 28E can be performed by utilizing the operator flow generator module 2514, the execution plan generating module 2516, and/or the query execution module 2502 of the query processing system 2510 of FIG. 25A. For example, the database system 10 can utilize at least one processing module of one or more nodes 37 of one or more computing devices 18 that are utilized to implement the query execution module 2502 and/or other portions of the query processing system 2510. The one or more nodes can execute operational instructions stored in memory accessible by the one or more nodes, where the execution of the operational instructions causes the one or more nodes 37 to execute, independently or in conjunction, the steps of FIG. 28E. In particular, a node 37 can utilize the query processing module 2435 to execute some or all of the steps of FIG. 28E as illustrated in FIGS. 28A-28D, where multiple nodes 37 implement their own query processing modules 2435 to independently execute the steps of FIG. 28E. For example, some or all nodes 37 of a query execution plan 2405 can implement query processing module 2435 to facilitate execution of a query via performing at least one operator execution utilizing a custom join operator 2820 of FIGS. 28A-28D. Some or all of the steps of FIG. 28E can optionally be performed by any other processing module of the database system 10. Some or all of the steps of FIG. 28E can performed alternatively or in addition to some or all of the steps of FIG. 25E. Some or all of the steps of FIG. 28E can be performed to implement some or all of the functionality of the operator flow generator module 2514, execution plan generating module 2516, query execution module 2502, and/or of one or more individual nodes 37 as described in conjunction with FIGS. 25A-25D and/or FIGS. 28A-28D. Some or all of the steps of FIG. 28E can be performed to implement some or all of the functionality regarding execution of a query via the plurality of nodes in the query execution plan 2405 as described in conjunction with FIGS. 24A-24E. Some or all steps of FIG. 26B can be performed by database system 10 in accordance with other embodiments of the database system 10 and/or nodes 37 discussed herein.

Step 2882 includes determining a query operator execution flow that includes a custom-join operator indicating a custom conditional statement. Step 2884 includes generating a query resultant by performing a plurality of operator executions in accordance with the query operator execution flow. Performing the at least one operator execution for the custom join includes identifying pairs of records that satisfy the custom conditional statement based on evaluating the custom conditional statement for a plurality of pairs of records by performing at least one non-relational operator.

In various embodiments, the custom conditional statement is generated by a client device based on user input to a graphical user interface displayed by a display device, where the client device sends the custom conditional statement to the query processing system, for example, as part of an executable query expression or otherwise indicated in a query request. For example, the custom conditional statement is generated based on the embodiments discussed in conjunction with FIGS. 26A-26B.

In various embodiments, the custom conditional statement is in accordance with corresponding functionality of a corresponding query. For example, each particular mathematical function or machine learning function has its own custom conditional statement, where a given custom conditional statement is utilized when the corresponding mathematical function or machine learning function is called and/or otherwise indicated in a query request.

In various embodiments, the custom join is executed to join records in two sets in accordance with partitioning strategy. The partitioning strategy is utilized determined to partition both sets involved in the join for processing by designated nodes. In some cases, a default partition strategy can be implemented, where the larger set of the two sets is partitioned and sent to a corresponding set of nodes. The smaller set is broadcast to each of the set of nodes for comparison to its received partition of the larger set, in accordance with the criteria of the custom-join.

Figure 29A:
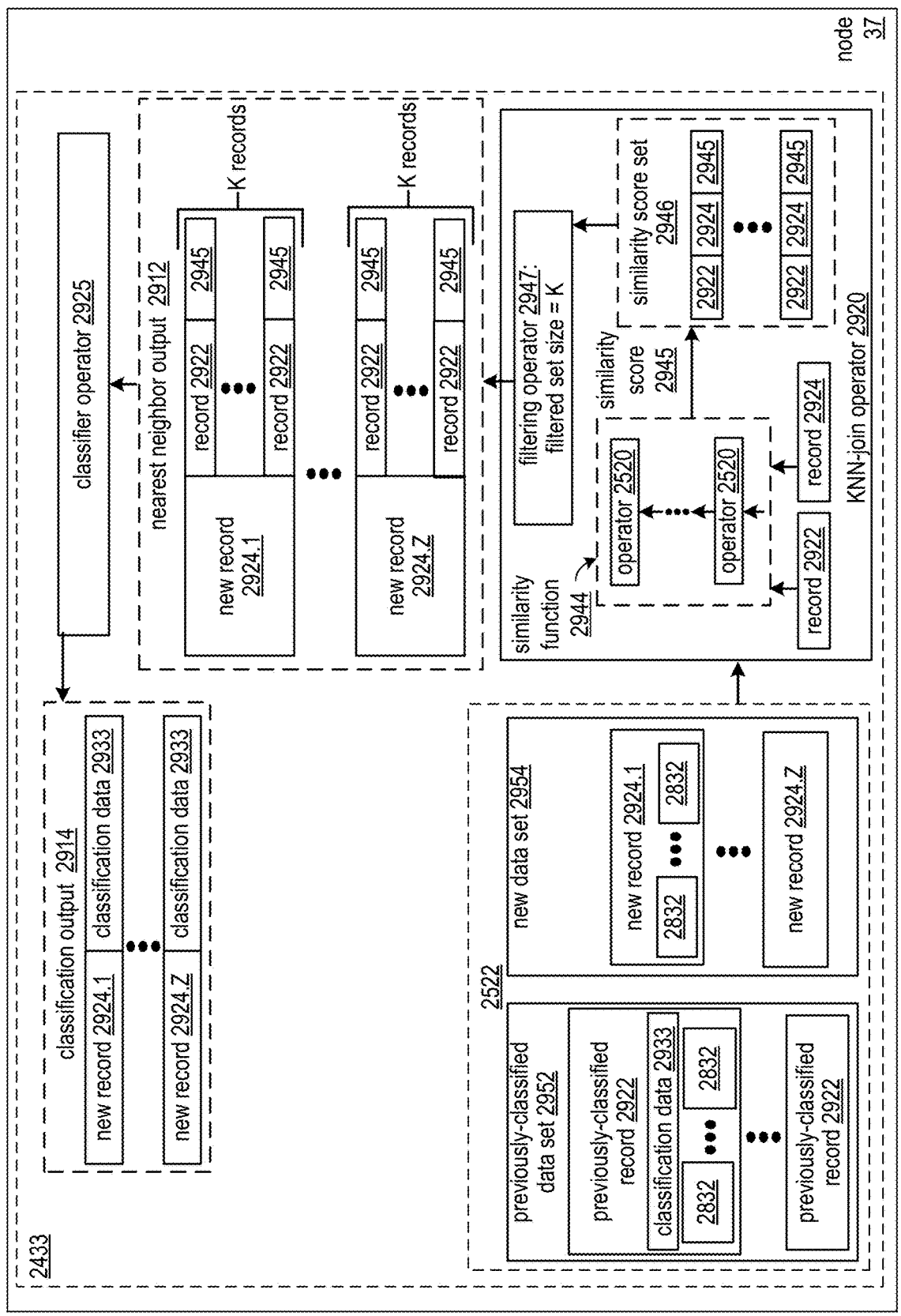
FIG. 29A is a schematic block diagram of a query operator execution flow that includes a K Nearest Neighbors (KNN) join operator to implement a classification algorithm.

FIGS. 29A-28E illustrate embodiments of query operator execution flows 2433 that include a K Nearest Neighbors (KNN) join operator 2920 as one of the operators 2520. For example, one of the non-relational operators 2524 of the non-relational operator library 2564 is or includes the KNN-join operator 2920 of FIG. 29A-29D. The query operator execution flow 2433 can be utilized to implement the query operator execution flow 2433 of FIG. 25B or FIG. 25D, for example, based on the query operator execution flow 2517 being generated by the operator flow generator module 2514 to include the KNN-join operator 2920. In particular, the operator flow generator module 2514 can generate the query operator execution flow 2517 to include the KNN-join operator 2920 based on the query request indicating a call to a KNN-join operation and/or to a KNN classification algorithm, based on the query request indicating a machine learning construct or mathematical function that requires use of classification and/or specifically requires use of KNN-based classification, and/or based on the query request including an executable query expression of FIG. 26A that calls or requires use of the KNN-join operator 2920. In some cases, the KNN-join operator 2920 includes a set of operators, which can include the replay operator 2720 of FIGS. 27A-27D, where execution of the custom-join operator includes iteration of an ordered set of operators via the replay operator 2720 of the KNN-join operator. In some cases, the KNN-join operator 2920 corresponds to a specific example of a custom join operator 2820 of FIGS. 28A-28D that is configured to implement decentralized KNN-based classification in the database system 10 via a query execution plan 2405. The other operators 2520 in the query operator execution flow 2433 can correspond to various operators 2523 and/or 2524.

KNN classification can be implemented in query operator execution flows by utilizing one or more non-relational operators 2524. For example, an optimizer of the operator flow generator module 2514 generates the resulting query operator execution flow 2517 to include the non-relational operators 2524 to implement KNN classification. This one or more one or more non-relational operators 2524 can include a KNN-specific custom-join operator 2820 that is configured as the KNN-join operator 2920. In particular, this KNN-join operator 2920 can be configured to implement KNN classification based on evaluating "closeness" of records, such as rows of the database, in the n-dimensional space. For example, a similarity value can be generated between new records to be classified and previously-classified records stored by the database system 10. This similarity value can be generated for a (new record, previously-classified record) pair based on computing a Euclidian distance, or other vector distance measurement, based on the values of some or all of their respective fields.

This mechanism is illustrated in FIG. 29A, which depicts a query operator execution flow 2433 executed by a query processing module 2435 that includes a KNN-join operator 2920. The KNN-join operator can be performed on a previously-classified data set 2952 and a new data set 2954. For example, the previously-classified data set 2952 implements the data set 2852 of FIGS. 28A-28D, and the new data set 2954 implements the data set 2854 of FIGS. 28A-28D.

The previously-classified data set 2952 can include a plurality of previously-classified records 2922. The previously-classified records can each include a set of field values 2832 for a corresponding set of fields. Each previously-classified records can additionally include and/or be mapped to classification data 2933 that classifies the corresponding previously-classified record 2922 into one of a set of distinct categories. This classification data 2933 can correspond to known truth data for the record 2922 and/or can correspond to previously generated classification data via KNN classification of the record 2922 via a previous execution of a previous query via a previous query execution plan 2405 that utilized the KNN-join operator 2920 and/or some or all other functionality of the KNN classification mechanism discussed in conjunction with FIGS. 29A-29E. The new data set 2954 includes a plurality of new records 2924.1-2924.Z. Each new record 2924 includes a set of field values 2832, which correspond to the same set of fields 2832 of the previously-classified data set 2952. However, the new records 2924 do not include classification data 2933, as these records have yet to be classified. Note that both the previously-classified records 2922 and/or the new records 2924 can be previously stored in database system 10, and can be accessed and/or retrieved from storage in database system 10 to facilitate execution of a corresponding query that includes executing KNN-join operator 2920 on these records.

As illustrated in FIG. 29A, the KNN-join operator 2920 performs a similarity function 2944 on some or all possible pairs of records, where each pair of records includes one record 2922 from the previously-classified data set 2952 and one record 2924 from the new data set 2954. For example, the similarity function 2944 is utilized to implement some or all of the non-relational function 2831. For each given record pair, a similarity score 2945 is generated to indicate a value computed as a vector distance between or other similarity metric of the given record pair. A similarity score set 2946 can include some or all of the outputted pairs with their respective similarity score, for example, as a tuple as illustrated that includes the records 2922 and 2924 of the pair and their corresponding score 2945.

A filtering operator 2947 can be applied to the similarity score set 2946 as a function of K to generate nearest neighbor output 2912. For example, the value of K is a positive integer that is fixed and/or configurable. The value of K can be determined from the query request and/or is configured in an executable query expression of FIG. 26A that calls for use of the KNN-join operator to perform KNN classification.

The KNN-join operator 2920 can utilize filtering operator 2947 to return only joined pairs, for example in accordance with a relational join, where the previously-classified record of the corresponding (new record, previously-classified record) is a record that has one of the K most favorable similarity values with the new record. For example, a given new record is paired with exactly K previously-classified records, such as the K records with greatest similarity to the new record and/or the K records with the smallest vector distance from the new record in n-dimensional space, where n denotes the number of fields in the set of fields of the new record and previously-classified records that are utilized to compute the vector distance.

The filtering operator 2947 can be utilized to implement some or all of the non-relational function 2831 and/or some or all of the conditional operator 2835 of FIG. 28C. For example, the filtering operator 2947 can be implemented by utilizing a replay operator 2720 to iterate over the entire similarity score set 2946 for a given new record 2924 after all similarity scores have been generated for the given new record 2924 based on all records 2922 in the previously-classified data set 2952, or a required proper subset of records 2922 in the previously-classified data set 2952, being paired with the given new record 2924 to generate a corresponding similarity score. Alternatively or in addition, the filtering operator 2947 can be implemented via relational operators such as an ORDER BY operator to order the tuples by their set of similarity scores generated for a particular new record 2924 from most favorable to least favorable; and/or a TOP operator to select the top K tuples from the similar score set 2946.

In some cases, the custom conditional statement 2830 for the KNN-join operator 2920 that implement a custom join operator 2820 includes determining whether a given pair has a corresponding similarity score that falls within the most favorable similarity scores across all previously-classified records measured against the given new record 2924 in the given pair. The given pair is only included in the nearest neighbor output 2912 when this custom conditional statement 2830 evaluates to TRUE. Thus, the nearest neighbor output 2912 can implement the compliant pairs 2860 outputted by a corresponding custom join operator 2820 configured to implement KNN classification. Note that in this case, unlike evaluating conditions for traditional relational joins, the custom conditional statement 2830 must be evaluated based on considering each possible pair relative to some or all other pairs, rather than evaluating the pair in isolation, to determine whether it can be included in the set of compliant pairs 2860.

In some cases, rather than applying filtering operator 2947 as a blocking operator and/or otherwise after all pairs for a given new record have corresponding similarity scores 2945 generated, the filtering operator 2947 can be applied to every pair once their corresponding similarity score 2945 is generated to maintain a running, current set of up to K previously-classified records 2922 for each given new record 2924 based on having one of the K the most favorable similarity scores with the given new record 2924 thus far. In these cases, filtering operator 2947 can be applied to maintain the similarity score set 2946 to include only these K most similar records 2922 for each given new record 2924. For example, the conditional operator 2835 is implemented to compare the similarity score 2945 for each incoming new pair to the dynamically updated set of K pairs, or the least favorable pair in the set of K pairs, for the corresponding new record, for example, rather than comparison to a constant value 2836.

In this case where the similarity score set 2946 is dynamically updated, for a given incoming pair with a computed similarity score 2945 via similarity function 2944. As new pairs have corresponding similarity scores 2945 generated, they are evaluated against the existing least favorable one of the current K most favorable similarity scores for the corresponding new record 2924. If the corresponding new record 2924 has less than K pairs already identified in the similarity score set 2946, the new record is added to the similarity score set 2946. if the corresponding new record 2924 has K pairs already identified in the similarity score set 2946, but the new pair has a more favorable similarity score than at least one of the K existing pairs, the one of the K existing pairs with the least favorable similarity score is removed from the similarity score set 2946, and the similarity score set 2946 is updated to include the new pair, and/or the least favorable similarity score in the set of K pairs can be updated accordingly. If the corresponding new record 2924 has K pairs identified in the similarity score set 2946, and the but the new pair has a less favorable similarity score than all of the K existing pairs, the new pair is not added to the similarity score set 2946, and the existing set of K pairs for the corresponding new record 2924. After all pairs that include a given new record have been evaluated and/or after all pairs with all new records have been evaluated, the similarity score set 2946 can be outputted as the nearest neighbor output 2912.

Once the set of K previously-classified records 2922 for a given new record 2924 with corresponding similarity scores that fall within the most favorable K similarity scores of all similarity scores for all previously-classified records 2922 paired with the given new record 2924 is identified via applying filtering operator 2947, this set of K previously-classified records 2922 can be indicated in nearest neighbors output 2912. The nearest neighbors output 2912 can indicate each new record 2924 with its corresponding identified set of K previously-classified records 2922. As the KNN-join can be implemented to operating utilizing and/or to mimic functionality of a relational join, this nearest neighbors output 2912 can indicate this output as a set of paired records 2924 and 2922, for example, as distinct rows, where each record 2924 is included in exactly K output pairs with K distinct records 2922. These output rows can additionally indicate the corresponding similarity score 2945 in the output, for example, where the similarity score 2945 is included in the corresponding row with the corresponding record 2922 and/or record 2924, for example, for use in classifying each given new records in addition to the identified K records. Each output rows can further indicate the classification data 2933 for the corresponding record 2922 included in the given output row. Note that these output rows may not include all fields of record 2922 and/or record 2924, and for example, may simply include key fields and/or identifiers for each record 2922 and/or record 2924.

A classifier operator 2925 can be applied to the nearest neighbor output 2912 to generate classification output 2914. While the classifier operator 2925 is illustrated as separate from the KNN-join operator 2920, the classifier operator 2925 can alternatively be implemented within the KNN-join operator 2920, where the nearest neighbor output 2912 is intermediate output of the KNN-join operator 2920 and where the classification output 2914 is outputted by the KNN-join operator 2920 via execution of the classifier operator 2925.

Classifier operator 2925 can generate classification output 2914 by generating classification data 2933 for each given new record 2924 based on the classification data for each of the K records 2922 identified in nearest neighbor output 2912 for the given new record 2924. For example, each of the K records 2922 for a given record 2924 can be assigned an equal weight, where the one of the plurality of categories indicated in classification data of a greatest plurality of the K records is selected as the selected one of the plurality of categories indicated in classification data generated for the given new record 2924. As another example, each of the K records 2922 for a given record 2924 can be assigned weights to be equal to, to be a function of, and/or to be or otherwise based on, their similarity scores 2945. Records 2922 with more favorable similarity scores have a greater and/or more favorable corresponding weight applied. For example, as summation is computed for each category by adding the respective weights of records 2922 with classification data 2933 indicating a given category, where the category with the greatest summation is selected as the selected one of the plurality of categories indicated in classification data generated for the given new record 2924. The classification data 2933 for each given new record 2924 can otherwise be generated as a function of the classification data 2933 of the K identified records 2922 in nearest neighbor output 2912 and/or as a function of their corresponding similarity scores 2945, for example, in accordance with any KNN-based algorithm for classifying the new record.

Figure 29B:
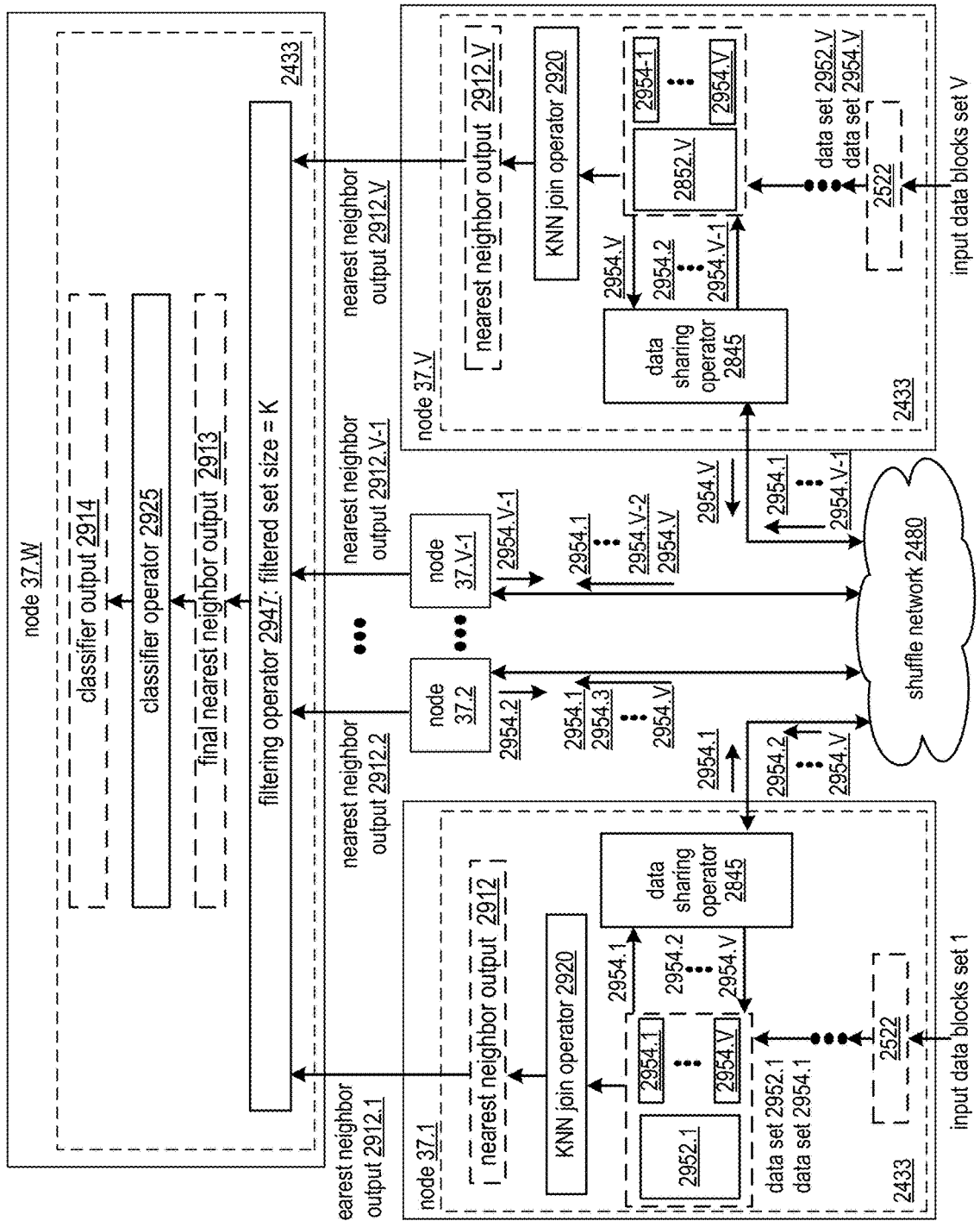
FIG. 29B is a schematic block diagram of via a plurality of nodes communicating via a shuffle network that that utilize query operator execution flows that include a KNN join operator in accordance with various embodiments of the present invention.

FIG. 29B illustrates an embodiment where the KNN classification is implemented in a decentralized fashion via a plurality of nodes 37.1-37.V. For example, the plurality of nodes 37.1-37.V and node 37.W are utilized to implement the nodes 37.1-37.V and node 37.W of FIG. 28B. For example, the decentralized implementation of custom join operator 2820 in FIG. 28B is implemented as the KNN-join operator 2920 utilizing some of all of the functionally discussed in conjunction with FIG. 29A.

As illustrated in FIG. 29A, each node 37.1-37.V can generate nearest neighbor output 2912 based on utilizing a distinct subset of the required set of previously-classified records 2922 in previously-classified data set 2952, denoted as one of the subsets 2952.1-2952.V. For example, the subsets 2952.1-2952.V implement the subsets 2852.1-2852.V of FIG. 28B. Some or all of this distinct subset of the required set of previously-classified records are utilized by the corresponding node 37.1-37.V to generate nearest neighbor output 2912 for every new record 2924 in the full set of new records of data set 2954. In particular, the set of new records are broadcasted and/or otherwise shared across all nodes 37.1-37.V as discussed in conjunction with FIG. 28A, where the subsets 2954.1-2954.V implement the subsets 2854.1-2854.V of FIG. 28B. Thus, each nearest neighbor output 2912.1-2912.V indicated, for every new node 2924, the K records 2922 from their respective one of the plurality of subsets 2952.1-2952.V with most favorable similarity scores 2945 generated as discussed in conjunction with FIG. 29A. This case is ideal when the set of previously-classified records 2922 in the full data set 2952 is significantly larger, such as orders of magnitude larger, than the set of new records 2924 in the full data set 2954 being classified for a given query.

Thus, the union of all nearest neighbor output 2912.1-2912.V includes K×V records 2922 for each new record 2924. This set of K×V records is guaranteed to include the K records with most favorable similarity scores 2945, but also includes (K−1)×V "false positives" that are not included in the set of K records. Therefore, to render final nearest neighbor output 2913 that includes only these K records are included, the same or different filtering operator 2947 can be applied by the node 37.W, for example, as a blocking operator, to identify only the top K records 2922 for each new record 2924 with the K most favorable similarity scores 2945 from the entirety of the K×V records 2922 for each new record 2924 in the nearest neighbor output 2912.1-2912.V. In some cases, the KNN-join operator 2920 is reperformed by the node 37.W upon new records 2924 and records 2922 received in the nearest neighbor output 2912.1-2912.V, for example, if the similarity scores 2945 are not included in the nearest neighbor output 2912.1-2912.V, where the similarity scores 2945 are regenerated via KNN-join operator 2920. The node 37.W can utilize classifier operator 2925 upon the final nearest neighbor output 2913 to generate classification output 2914 for the new records 2924 as discussed in FIG. 29A.

In some embodiments, the data outputted in the nearest neighbor output 2912 generated and sent by each node 37.1-37.V can be sorted by each node on the new records 2924, resulting in the output data blocks of nearest neighbor output 2912 being ordered by new records 2924. For example, the node 37.W receives nearest neighbor output 2912.1 from node 37.1 as a plurality of data blocks that first include all K pairs that include a first new record 2924 in the sorting; then receive all pairs that include all K pairs that include a second new record 2924 in the sorting; and so on, until all pairs that include all K pairs that include a last new record 2924 in the sorting are ultimately received. If all nodes 37.1-37.V sort their nearest neighbor output 2912 by new records 2924 on the same criteria, the same ordering of the set of new records 2924 being utilized by all nodes 37.1-37.V is generated. As a result, the node 37.W receives nearest neighbor output 2912.1-2912.V to include data blocks in accordance with the common ordering of the common set of new records 2924, and thus, the K pairs for a given record 2924 are received in nearest neighbor output from each node at roughly similar times. In the ideal case, all K×V pairs for a given record 2924 are received sequentially based on the nearest neighbor output 2912 of each node being ordered. This mechanism can enable the node 37.W to eliminate the (K−1)×V "false positives" in a streaming fashion as the nearest neighbor output 2912.1-2912.V is received.

Figure 29C:
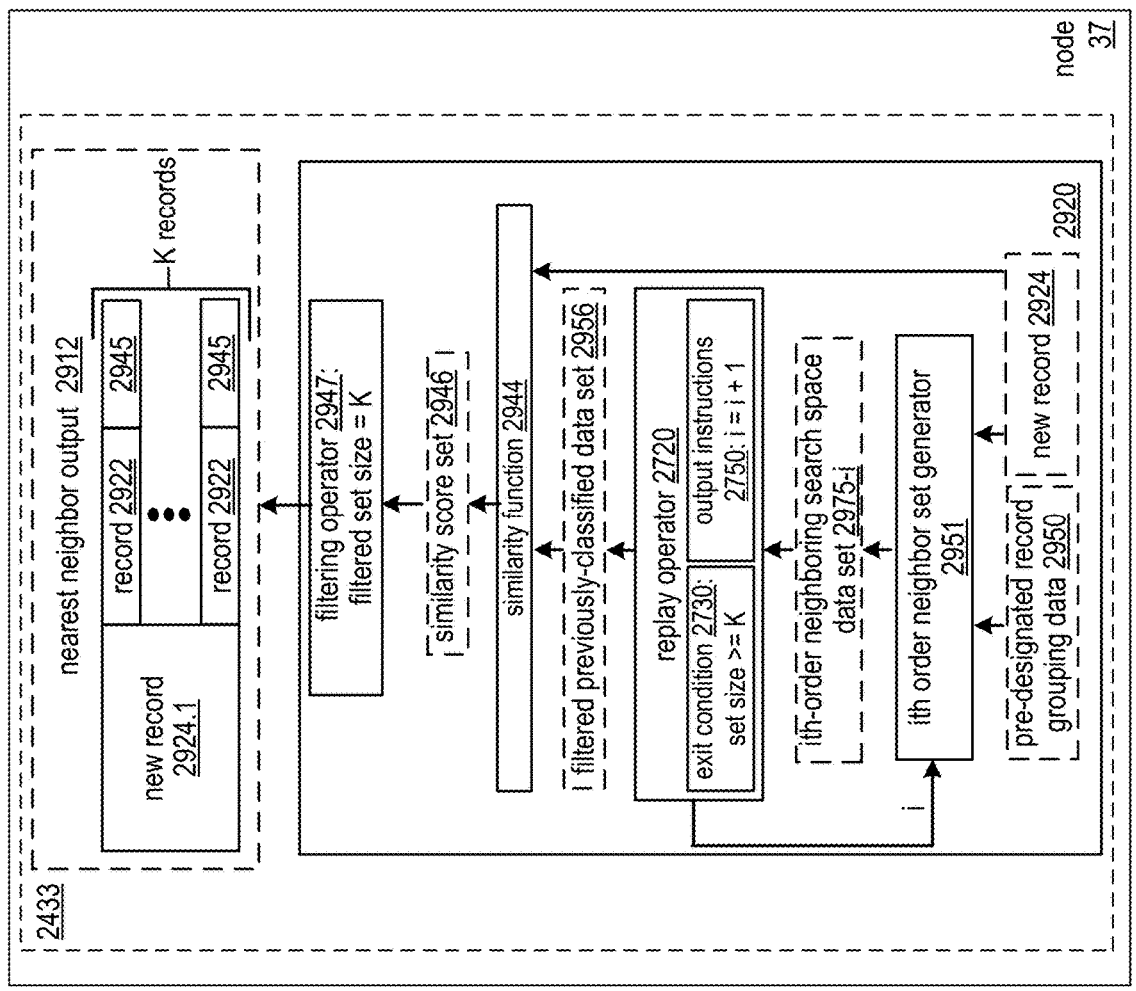
FIG. 29C is a schematic block diagram of a KNN join operator that implements a replay operator to expand a neighboring search space over a plurality of iterations in accordance with various embodiments of the present invention.

FIG. 29C illustrates an embodiment of a KNN-join operator 2920 that implements a neighbor set generator 2951 based on pre-designated record grouping data 2950 to generate a neighboring search space data set 2975 for a given new record 2924. A replay operator 2720 can be implemented to re-generate the neighboring search space data set 2975 by expanding the neighboring search space data set 2975 in subsequent iterations until at least K records are identified in the neighboring search space data set 2975. Then, the resulting neighboring search space data set 2975 is outputted as a filtered previously classified data set 2956 that includes a proper subset of records from the previously classified data set 2952 and/or from the partitioned subset of the plurality of subsets 2952.1-2952.V assigned to the corresponding node. This mechanism can be useful in reducing the number of records 2922, for example, by orders of magnitude that need to be processed in the remainder of the KNN-join operator 2920 for the given new record 2924, while ensuring that the K identified records are guaranteed to be correct. The KNN-join operator 2920 can be utilized to implement the KNN-join operator of FIG. 29A or FIG. 29B. The query operator execution flow of the KNN-join operator of FIG. 29C that includes the replay operator 2720 and/or the ith order neighboring set generator 2951 can be utilized to implement the non-relational function 2831 of FIG. 28C for a custom-join operator 2820 configured to implement the KNN-join operator of FIG. 29C.

For example, the KNN-join operator 2920 of FIG. 29C effectively operates as and/or mimics a hash-join by quickly determining a small subset of possible previously-classified records 2922 that could possibly meet the custom conditional statement 2830 of the join condition. In this case, the small subset of possible previously-classified records are identified as records that could possibly be one of the K closest points to the new record in n-dimensional space based on already having been sorted into neighborhood groupings indicating their "location" in n-dimensional space. In particular, given a point in n-dimensional space denoting the location of a given new record 2924, the K records 2922 with the top K similarity scores 2945 are located with some n-cube that can be centered at that point when the similarity function corresponds to a distance measurement in n-dimensional space, where n is the number of fields of the record 2922 and 2924 included in the set of fields utilized as vector input to a corresponding vector distance function such as a Euclidean distance function.

The embodiment of FIG. 29C therefore requires existing knowledge of the locations of previously-classified records 2922 in the n-dimensional space. Prior to computing the given query of FIG. 29C, for example, when the model is initially created and/or when the previously-classified records 2922 in previously-classified data set 2952 are added to the database system, the previously-classified records 2922 can be segregated into a plurality of predesignated record groupings, which can correspond to a plurality of n-cubes in n-dimensional space. The pre-designated record grouping data 2950 can indicate these plurality of predesignated record groupings and can be used accordingly to determine the neighboring search space data set 2975 for each iteration and corresponding expansion of the neighboring search space data set 2975.

Figure 29D:
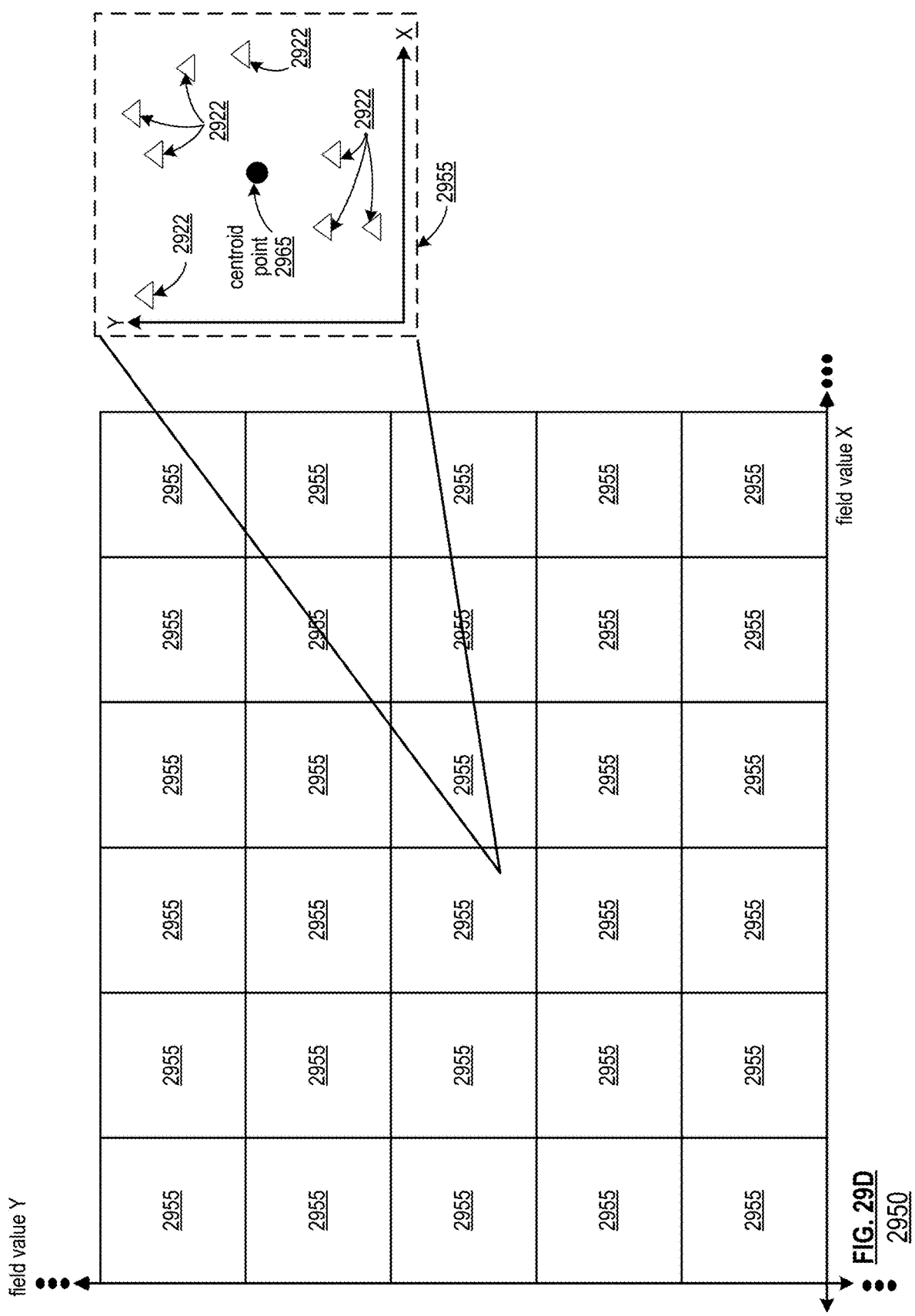
FIG. 29D is a schematic block diagram illustrating a plurality of pre-designated record groupings of previously-classified records in the two-dimensional case in accordance with various embodiments of the present invention.

Such an embodiment is illustrated in FIG. 29D, depicting an example embodiment of a plurality of pre-designated record groupings 2955 indicated by and/or utilized to determine the pre-designated record grouping data 2950. This example illustrates the concept of pre-designated record groupings 2955 as n-dimensional cubes in n-dimensional space by depicting the 2-dimensional example. The 2-dimensional space is characterized by a set of discrete or continuous possible field values X for a first field of records 2922 and 2924 on the horizontal axis and a set of field values discrete or continuous possible field values Y for a second field of records 2922 and 2924 on the vertical axis. Other embodiments can be similarity implemented in n-dimensional space for any value of n when additional fields of records 2922 and 2924 are present.

The plurality of pre-designated record groupings 2955 can span the entire possible n-dimensional space, where each pre-designated record grouping 2955 borders a set of $3^n-1$ neighboring pre-designated record groupings 2955, unless the pre-designated record grouping 2955 is at an edge of the entire possible n-dimensional space. The pre-designated record grouping 2955 each cover distinct portions of n-dimensional space and do not overlap. Each pre-designated record grouping 2955 can be equal in size with respect to the n-dimensional space. Each pre-designated record grouping can be characterized by a centroid point 2965, corresponding to a point in n-dimensional space centering the corresponding pre-designated record grouping 2955. In this example, each centroid point 2965 is characterized by a point (x,y) in two dimensional space.

Each record 2922 is assigned to a pre-designated record grouping 2955 based on which pre-designated record grouping 2955 a corresponding point falls within in n-dimensional space. The corresponding point is determined based on the field values of the corresponding record's fields, where each record's point in this example is a point (x,y) in two dimensional space. Thus, the record is assigned to a pre-designated record grouping 2955 with a centroid point 2965 that is closer to the record than all other centroid points 2965 for all other pre-designated record groupings 2955. In particular, the pre-designated record grouping 2955 with a centroid value that yields the most favorable similarity score 2945 if the similarity function 2944 were performed between the record 2922's point and all centroid points 2956 is selected for assignment of the record 2922.

FIG. 29D illustrates a plurality of records within one pre-designated record grouping 2955 as an illustrative example of their points in n-dimensional space with respect to the corresponding centroid point 2965 of their pre-designated record grouping 2955. However, once each record 2922 is assigned to a pre-designated record grouping 2955, this information can be stored as a record grouping assignment table, which can be implemented as a lookup table, hash table, or relational table. Each entry to the record grouping assignment table can include an identifier of each record 2922 mapped to their respective pre-designated record grouping 2955, without necessarily being depicted in n-dimensional space within their respective pre-designated record grouping 2955, as this additional information does not need to be stored. For example, each of a plurality of (key, value) pairs stored by a hash table that implements the record grouping assignment table includes the identifier or key field value of a given record 2922 as the key and includes the identifier, such as the centroid point 2965, of the corresponding pre-designated record grouping 2955 as the value. This record grouping assignment table can be stored by the database system 10 and can be accessible by one or more nodes 37. For example, this record grouping assignment table is accessed by node 37 of FIG. 29C to determine the pre-designated record grouping data 2950. Alternatively, the node 37 otherwise receives some or all entries from the record grouping assignment table is accessed by node 37, for example, based on the new record 2924, to determine the pre-designated record grouping data 2950.

FIG. 29E illustrates how the pre-designated record groupings 2955 are utilized to generate neighboring search spaces 2975 for a given record that expand radially outward over a plurality of iterations. First, for a given new record 2924, the pre-designated record groupings 2955 that it falls within is determined, for example, in the same fashion as determining the pre-designated record groupings 2955 that each previously-classified record 2922 falls within. This is illustrated in the 2-dimensional example of FIG. 29E, where the n-dimensional point corresponding to the new record 2924 based on its field values of its n fields is determined in n-dimensional space to be closest to the centroid point 2965 one of the pre-designated record groupings 2955, for example, in accordance with similarity function 2944.

Based on identifying the pre-designated record grouping 2955 that includes record 2924, an initial neighborhood search space data set 2975 can be identified via a first iteration of execution of the ith order neighborhood set generator 2951 based on the initial value of i and based on the pre-designated record grouping 2955 of pre-designated record grouping data 2950. As used herein, an ith order neighboring search space 2975.$i$ of a given new record 2924 corresponds to the $(2(i-1)+3)n$ pre-designated record groupings 2955 that have centroid points 2965 closest to the identified pre-designated record grouping 2955 that includes the new record 2924. In the example illustrated in FIG. 29E, each ith order neighboring search space 2975.$i$ of the given new record 2924 in FIG. 29E includes all labeled pre-designated record grouping 2955.0-2955.$i$, where pre-designated record grouping 2955.0 is the identified pre-designated record grouping 2955 that includes record 2924. As illustrated, a $0^{th}$ order neighboring search space 2975 includes the single identified pre-designated record grouping 2955.0; a $1^{st}$ order neighboring search space includes the single identified pre-designated record grouping 2955.0 and the eight pre-designated record groupings 2955.1 that border pre-designated record grouping 2955.0; a $2^{nd}$ order neighboring search space includes the single identified pre-designated record grouping 2955.0, the eight pre-designated record groupings 2955.1 that border pre-designated record grouping 2955.0, the 16 pre-designated record groupings 2955.2 that border pre-designated record groupings 2955.1, expanding radially outward from pre-designated record grouping 2955.0, and so on.

Note that the first iteration of the ith order neighbor set generator 2951 does not necessarily utilize an initial value of i that is equal to zero. In particular, searching pre-designated record grouping 2955.0 may not be sufficient even if it includes K records 2922, as records included in neighboring pre-designated record groupings 2955.1 may be closer to the new record if the new record is not centered within pre-designated record grouping 2955.0. In some cases, the initial value of i is equal to one, where initial search could include searching the $3^n$ pre-designated record groupings 2955, identified one of the pre-designated record grouping 2955 and its $3^n-1$ bordering neighbors. However, given that the given new record 2924 point probably won't be perfectly centered, to guarantee all the K actual closest neighbors will be included, the nearest initial search could include searching the $5^n$ pre-designated record groupings 2955 by setting the initial value of i as 2. Any initial value of i can be selected, and the initial value of i can be a fixed or configurable parameter of the KNN-join operator 2920. The value of i can increment be exactly 1 in each iteration, or can increment by the same or different positive number in subsequent iterations.

In this fashion, the search space expands radially outwards in each subsequent iteration, and this process repeats where i increments, for example, by exactly one, and the ith order neighboring set generator 2951 generates the corresponding search space accordingly based on the new value of i. For example, in the first iteration, the $5^n$ pre-designated record groupings 2955 corresponding to the $2^{nd}$ order neighboring search space 2975.2 are searched first; the $7^n$ pre-designated record groupings 2955 corresponding to the $3^{rd}$ order neighboring search space 2975.3 are searched next if K points were not identified after searching the $2^{nd}$ order neighboring search space 2975.2; the $9^n$ pre-designated record groupings 2955 corresponding to the $4^{rd}$ order neighboring search space 2975.4 are searched next if K points were still not identified after searching the $3^{rd}$ order neighboring search space 2975.3, and so on, until K records 2922 are identified in the given $i^{th}$ order neighboring search space 2975.i, where the filtered previously-classified data set 2956 includes all records 2922 included in the the $i^{th}$ order neighboring search space 2975.i.

In some embodiments, exactly one additional iteration is performed immediately after at least K records are determined to be identified in the given $i^{th}$ order neighboring search space 2975.i to generate a $(i+1)^{th}$ order neighboring search space 2975.i+1, where the filtered previously-classified data set 2956 includes all records 2922 included in the $(i+1)^{th}$ order neighboring search space 2975.i+1 generated via this additional iteration. This can be utilized to ensure that the non-centering of the new record 2924 within its respective pre-designated record groupings 2955.0 is compensated for by expanding the search space past the smallest $i^{th}$ order neighboring search space 2975.i that includes at least K records. In particular, this handles the case where the non-centering of the new record 2924 within its respective pre-designated record groupings 2955.0 causes one of its true K nearest neighbors to be included in the $(i+1)^{th}$ order neighboring search space 2975.i+1, but not the $i^{th}$ order neighboring search space 2975.i, based on being closer to the new record's point in n-dimensional space than one or more of the record included in the $i^{th}$ order neighboring search space 2975.i.

Note that the sizes of pre-designated record groupings 2955 should be configured such that the previously-classified data set 2952 is dense enough with respect to the n-dimensional space to create a useful model, and/or if a reasonably small K, such as K<10 is utilized, the KNN-join can be performed for each given new record 2924 by generating similarity scores 2945 from records 2922 in a very small fraction of the previously-classified data set 2952, such as only 0.0000007% percent of the previously-classified data set 2952 for each new record 2924. In some embodiments, the sizes of pre-designated record groupings 2955 are automatically selected by the query processing system 2510 based on a distribution of field values of the previously-classified records.

In some embodiments, the records 2922 are stored in selected memory devices of a plurality of memory devices of the database system 10 in accordance with their pre-designated record groupings 2955, for example, where records 2922 in the same pre-designated record grouping 2955 are stored in a same memory device, in a same set of memory devices, in memory drives 2425 of a same node 37, and/or in memory drives 2425 of a same set of nodes 37. In some embodiments where the KNN classification is decentralized as discussed in conjunction with FIG. 29B, different nodes have access to different distinct portions of the data set 2952, for example, based on child IO level nodes that store different pre-designated record groupings 2955 on their memory drives 2425. In some cases, a node can determine it does not have access to within a predefined jth order neighboring data set of records for a given new record, and does not return nearest neighbor output for these records, and the K nearest neighbors for these records are presumably accessed and identified by other nodes that do have access to within the predefined jth order neighboring data set of records.

FIGS. 29F and 29G illustrate a method for execution by a query processing system 2510, such as the query processing system 2510 of FIG. 25A and/or FIG. 25C. Some or all of the method of FIGS. 29F and/or 29G can be performed by utilizing the operator flow generator module 2514, the execution plan generating module 2516, and/or the query execution module 2502 of the query processing system 2510 of FIG. 25A. For example, the database system 10 can utilize at least one processing module of one or more nodes 37 of one or more computing devices 18 that are utilized to implement the query execution module 2502 and/or other portions of the query processing system 2510. The one or more nodes can execute operational instructions stored in memory accessible by the one or more nodes, where the execution of the operational instructions causes the one or more nodes 37 to execute, independently or in conjunction, the steps of Figure of FIGS. 29F and/or 29G. In particular, a node 37 can utilize the query processing module 2435 to execute some or all of the steps of FIGS. 29F and/or 29G as illustrated in FIGS. 29A-29C, where multiple nodes 37 implement their own query processing modules 2435 to independently execute the steps of FIGS. 29F and/or 29G. For example, some or all nodes 37 of a query execution plan 2405 can implement query processing module 2435 to facilitate execution of a query via performing at least one operator execution utilizing a KNN-join operator 2920, the similarity function 2944, the filtering operator 2947, and/or the classifier operator 2925 of FIGS. 29A-29E. Some or all of the steps of FIGS. 29F and/or 29G can optionally be performed by any other processing module of the database system 10. Some or all of the steps of FIGS. 29F and/or 29G can performed alternatively or in addition to some or all of the steps of FIG. 25E. Some or all of the steps of FIGS. 29F and/or 29G can be performed to implement some or all of the functionality of the operator flow generator module 2514, execution plan generating module 2516, query execution module 2502, and/or of one or more individual nodes 37 as described in conjunction with FIGS. 25A-25D and/or FIGS. 29A-29E. Some or all of the steps of FIGS. 29F and/or 29G can be performed to implement some or all of the functionality regarding execution of a query via the plurality of nodes in the query execution plan 2405 as described in conjunction with FIGS. 24A-24E. Some or all steps of FIG. 26B can be performed by database system 10 in accordance with other embodiments of the database system 10 and/or nodes 37 discussed herein.

Step 2982 includes determining a query request to implement a K Nearest Neighbors (KNN) algorithm to generate classification data for a set of new records. Step 2984 includes determining a query operator execution flow for the query request that includes a KNN-join operator based on the query request. Step 2986 includes generating a query resultant that indicates classification data for the set of new records by performing a plurality of operator executions in accordance with the query operator execution flow.

In various embodiments, performing at least one operator execution in accordance with the KNN-join operator includes, for each record of the set of new records, performing some or all of the steps of FIG. 29C. Step 2992 includes generating, for each record of the set of new records, a plurality of similarity measures by performing a similarity function on the each record and each of a set of previously-classified records. In various embodiments, the similarity function utilizes a Euclidean distance function. In various embodiments, other distance functions can be utilized. Step 2994 includes identifying, for each record of the set of new records, a proper subset of the set of previously-classified records that includes exactly a predefined number of records with corresponding similarity measures that are most favorable of the plurality of similarity measures. Step 2996 includes joining, for each record of the set of new records, the each record with the proper subset of the set of previously-classified records. Classification data is generated for the each record based on classification data of each of proper subset of the set of previously-classified records.

In various embodiments, the method includes segregating the plurality of previously-classified records into a plurality of pre-designated groups. Each of the plurality of pre-designated groups are characterized by a corresponding centroid set of field values of a plurality of centroid sets of field values. Performing at least one operator execution in accordance with the KNN-join operator further includes, for each record of the set of new records, identifying one of the plurality of pre-designated groups with a similarity measure between the centroid set of field values of the one of the plurality of pre-designated groups and a set of field values of the each record that is more favorable than similarity measures between the centroid set of field values of all other ones of the plurality of pre-designated groups and the set of field values of the each record. Performing at least one operator execution in accordance with the KNN-join operator further includes, for each record of the set of new records, identifying a first set of neighboring pre-designated groups from the one of the plurality of pre-designated groups based on having centroid sets of field values that have similarity measure from the centroid set of field values of the one of the plurality of pre-designated groups that are within a first order similarity threshold. Performing at least one operator execution in accordance with the KNN-join operator further includes, for each record of the set of new records, determining the set of previously-classified records by identifying only records included in the one of the plurality of pre-designated groups and the first set of neighboring pre-designated groups. Each of the plurality of similarity measures are generated by performing the similarity function on the set of field values of the each record and a set of field values of a corresponding one of the set of previously-classified records.

In various embodiments, segregating the plurality of previously-classified records into the plurality of pre-designated groups includes determining the centroid set of field values for each of the plurality of pre-designated groups and assigning each record of the plurality of previously-classified records to one of the plurality of pre-designated groups with a centroid set of field values that are most similar to a set of field values of the each record in accordance with the similarity function.

In various embodiments, performing an operator execution in accordance with the KNN-join operator further includes, for each record of the set of new records, determining whether the set of previously-classified records includes at least the predefined number of records. When the set of previously-classified records includes less than the predefined number of record, a second set of neighboring pre-designated groups from the one of the plurality of pre-designated groups is identified based on having centroid sets of field values that have similarity measure from the centroid set of field values of the one of the plurality of pre-designated groups that are within a second order similarity threshold that is larger than the first order similarity threshold. The set of previously-classified records is expanded to include all records included in the second set of neighboring pre-designated groups.

In various embodiments, performing an operator execution in accordance with the KNN-join operator further includes, for each record of the set of new records, performing an iterative process to extend the set of neighboring pre-designated groups radially from the centroid set of field values of the one of the plurality of pre-designated groups. An $i^{th}$ iteration of the iterative process includes identifying an $i^{th}$ set of neighboring pre-designated groups from the one of the plurality of pre-designated groups based on having centroid sets of field values that have similarity measure from the centroid set of field values of the one of the plurality of pre-designated groups that are within an $i^{th}$ order similarity threshold that is larger than an $(i-1)^{th}$ order similarity threshold. The $i^{th}$ iteration of the iterative process further includes expanding the set of previously-classified records to include all records included in the $i^{th}$ set of neighboring pre-designated groups. The $i^{th}$ iteration of the iterative process further includes determining whether the set of previously-classified records includes at least the predefined number of records in response to expanding the set of previously-classified records. The $i^{th}$ iteration of the iterative process further includes terminating the iterative process when the set of previously-classified records includes at least the predefined number of records, and initiating the $(i+1)^{th}$ iteration of the iterative process when the set of previously-classified records includes less than the predefined number of records. In various embodiments, the iterative process is implemented by utilizing a replay operator of the plurality of operators in the query operator execution flow.

In various embodiments, the set of neighboring pre-designated groups extends radially from the centroid set of field values of the one of the plurality of pre-designated groups in accordance with a dimensionality dictated by a number of fields values in the set of field values. In various embodiments, the number of pre-designated groups identified in the $i^{th}$ set of neighboring pre-designated groups is in accordance with an exponential function. An exponent of the exponential function is equal to, or otherwise based on, a number of fields in the set of fields. A base of the exponential function is equal to, or otherwise based on x+2i, where x is equal to an initial number, such as an odd number. For example, the base is equal to, or otherwise based on, x+2i or (5+2i), for example, where i is equal to zero in a first iteration of the iterative process and is incremented by exactly one in each subsequent iteration of the iterative process.

In various embodiments, the plurality of centroid sets of field values correspond to a plurality of points in multi-dimensional space. The plurality of points are uniformly distributed in the multi-dimensional space, where each one of the plurality of points has a set of closest neighboring points in accordance with the similarity function that each have an equivalent similarity measure from the each one of the plurality of points.

In various embodiments, the query resultant of the query is generated via a set of nodes of the database system that each perform a plurality of operator executions in accordance with the query operator execution flow. A subset of the set of nodes each execute at least one operator execution corresponding to the KNN-join operator by utilizing a distinct set previously-classified records stored by the database system, wherein a plurality of distinct sets of previously-classified records utilized by the subset of the set of nodes are mutually exclusive. In various embodiments, a first node in the subset of the set of nodes generates the plurality of similarity measures for a first record of the set of new records by utilizing a first one of the plurality of distinct sets of previously-classified records. A second node in the subset of the set of nodes generates the plurality of similarity measures for the first record of the set of new records by utilizing a first one of the plurality of distinct sets of previously-classified records.

In various embodiments, the set of new records is stored in memory of the database system. Each node in the subset of the set of nodes determines the set of records by receives a distinct subset of the set of new records based on retrieval of the distinct subset of the set of new records from memory of the database system; by broadcasting the distinct subset of the set of new records to other nodes in the subset of the set of nodes; and/or by receiving a plurality of other distinct subsets of the set of new records from other nodes in the subset of the set of nodes based on each of the other nodes receiving and broadcasting one of the plurality of other distinct subsets of the set of new records. Each node in the subset of the set of nodes performs the at least one operator execution in accordance with the KNN-join operator for each record of the set of new records based on all nodes determining the set of new records as a same set of new records.

In various embodiments, each node in the subset of the set of nodes, for each record of the set of new records: generates a subset of the plurality of similarity measures by performing a similarity function of on the each record with each of their distinct set of previously-classified records; identifies a proper subset of their distinct set previously-classified records stored by the database system that includes exactly the predefined number of records with corresponding similarity measures that are most favorable of the subset of the plurality of similarity measures; and/or sends the proper subset of their distinct set previously-classified records to a parent node in accordance with a query execution plan. The parent node, for each record of the set of new records, determines a set of possible records for the each record that includes records included in each of a plurality of proper subsets of a corresponding one plurality of distinct sets of previously-classified records received from a corresponding one of the subset of the set of nodes. The parent node, for each record of the set of new records, identifies the proper subset of the set of previously-classified records that includes exactly the predefined number of records by selecting the predefined number of records from the set of possible records with corresponding similarity measures that are most favorable.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, a set of memory locations within a memory device or a memory section. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a query processing system of a database system, comprising:
   determining a query request that indicates a plurality of operators, wherein the plurality of operators includes at least one relational algebra operator and further includes at least one non-relational operator;
   generating a query operator execution flow from the query request that indicates a serialized ordering of the plurality of operators to be performed upon a set of relational database rows of at least one relational database table of a relational database after the set of relational database rows is read from memory resources storing the relational database, wherein one relational algebra operator of the at least one relational algebra operator is serially after one non-relational operator of the at least one non-relational operator in the serialized ordering of the plurality of operators; and
   generating a query resultant of the query by facilitating execution of the query via a set of nodes of the database system that each perform a plurality of operator executions in accordance with the query operator execution flow, wherein performance of the plurality of operator executions in accordance with the query operator execution flow includes:
      generating first data blocks based on processing the set of relational database rows read from the memory resources;
      generating second data blocks by performing the one non-relational operator upon the first data blocks; and
      generating third data blocks by performing the one relational algebra operator upon the second data blocks, wherein the query resultant is generated based on generating the third data blocks;
   wherein the at least one non-relational operator includes a plurality of non-relational operators, wherein the plurality of non-relational operator correspond to a plurality of different non-relational operator types, wherein the plurality of non-relational operators are not sequentially ordered in the serialized ordering of the plurality of operators based on the at least one relational algebra operator being in between two of the plurality of non-relational operators in the serialized ordering of the plurality of operators, and wherein performance of the plurality of operator executions in accordance with the query operator execution flow further includes:
   generating fourth data blocks by performing a second non-relational operator of the two of the of the plurality of non-relational operators upon the third data blocks, wherein the query resultant is further generated based on generating the fourth data blocks.

2. The method of claim 1, further comprising:
   receiving the query request from a client device, wherein the client device generated the query request based on user input to the client device in response to a prompt presented via a graphical user interface displayed via a display device of the client device; and
   transmitting the query resultant to the client device for display via the display device.

3. The method of claim 1, wherein the query implements a regression model based on performing the one non-relational operator.

4. The method of claim 1, wherein the query implements an unsupervised clustering model based on performing the one non-relational operator.

5. The method of claim 1, wherein the one non-relational operator is implemented as a replay operator, wherein the execution of the query includes implementing iteration by each of a subset of the set of nodes executing the replay operator, and wherein the relational algebra operator is performed upon output of the replay operator.

6. The method of claim 1, wherein the at least one relational algebra operator is included in a set of Structured Query Language (SQL) operators, wherein the at least one non-relational operator is distinct from the set of SQL operators, and wherein the serialized ordering of the plurality of operators of the query operator execution flow is generated by applying an optimizer of the query processing system.

7. The method of claim 1, wherein a subset of the set of nodes each execute at least one operator execution corresponding to the at least one non-relational operator without coordination.

8. The method of claim 7, wherein the at least one operator execution corresponding to the at least one non-relational operator is executed by each of the subset of the set of nodes based on exchanging at least one data block between the subset of the set of nodes in accordance with a custom-join operator.

9. The method of claim 1, wherein the one non-relational operator is implemented as a linear algebra operator utilized to implement at least one of: a matrix multiplication function, a matrix inversion function, a matrix transpose function, a matrix addition function, a matrix decomposition function, a matrix determinant function, or a matrix trace function, and wherein the relational algebra operator is performed upon output of the linear algebra operator.

10. The method of claim 1, further comprising:
    communicating query execution role assignment data to the set of nodes, wherein the set of nodes utilize the query execution role assignment data to each facilitate their execution of the query in accordance with a query execution plan, wherein a root node of the query execution plan generates the query resultant based on data blocks generated by descendants of the root node in accordance with the execution of the query by the descendants of the root node, wherein a set of IO nodes read the set of relational database rows from the memory resources to produce the first data blocks, wherein a subset of the set of nodes generates the second data blocks from the first data blocks based on executing the at least one non-relational operator, and wherein the data blocks generated by descendants of the root node include the second data blocks and the third data blocks.

11. The method of claim 10, wherein the subset of the set of nodes correspond to a plurality of inner level nodes at an inner level of the query execution plan, and wherein each of the subset of the set of nodes execute every one of the plurality of operators of the query operator execution flow in accordance with the serialized ordering.

12. The method of claim 10, wherein the subset of the set of nodes correspond to a plurality of nodes at multiple levels of the query execution plan, wherein a first plurality of nodes at a first one of the multiple levels each execute a first serialized portion of the query operator execution flow, and wherein a second plurality of nodes at a second one of the multiple levels each execute a second serialized portion of the query operator execution flow.

13. The method of claim 10, wherein a plurality of IO level nodes of the query execution plan each read a distinct set of records stored by the database system, and wherein each node of the subset of the set of nodes each execute operators of the query operator execution flow upon a plurality of distinct sets of records read by a distinct set of IO nodes that are children of the each node in the query execution plan.

14. The method of claim 1, wherein the one relational algebra operator implements a relational join operator, and wherein the one non-relational algebra operator does not implement the relational join operator.

15. The method of claim 1, wherein the one relational algebra operator of the at least one relational algebra operator is serially before a first relational algebra operator of the at least one relational algebra operator in the serialized ordering of the plurality of operators and wherein the one relational algebra operator of the at least one relational algebra operator is serially after a second relational algebra operator of the at least one relational algebra operator in the serialized ordering of the plurality of operators.

16. The method of claim 1, wherein at least one of: the first data blocks are generated based on performing at first at least one other operator of the plurality of operators to upon the set of relational database rows read from the memory resources, or the query resultant is generated based on performing a second at least one other operator of the plurality of operators upon the third data blocks.

17. The method of claim 1, wherein the serialized ordering of the plurality of operators includes a plurality of parallel tracks, and wherein the one relational algebra operator of the at least one relational algebra operator is included in one of the plurality of parallel tracks.

18. A query processing system comprises:
at least one processor; and
a memory that stores operational instructions that, when executed by the at least one processor, cause the query processing system to:
determine a query request that indicates a plurality of operators, wherein the plurality of operators includes at least one relational algebra operator and further includes at least one non-relational operator;
generate a query operator execution flow from the query request that indicates a serialized ordering of the plurality of operators to be performed upon a set of relational database rows of at least one relational database table of a relational database after the set of relational database rows is read from memory resources storing the relational database, wherein one relational algebra operator of the at least one relational algebra operator is serially before one non-relational operator of the at least one non-relational operator in the serialized ordering of the plurality of operators;
generate a query resultant of the query by facilitating execution of the query via a set of nodes of a database system that each perform a plurality of operator executions in accordance with the query operator execution flow, wherein performance of the plurality of operator executions in accordance with the query operator execution flow includes:
generating first data blocks based on processing the set of relational database rows read from the memory resources;
generating second data blocks by performing the one relational operator upon the first data blocks; and
generating third data blocks by performing the one non-relational operator upon the second data blocks, wherein the query resultant is generated based on generating the third data blocks;
wherein the at least one non-relational operator includes a plurality of non-relational operators, wherein the plurality of non-relational operator correspond to a plurality of different non-relational operator types, wherein the plurality of non-relational operators are not sequentially ordered in the serialized ordering of the plurality of operators based on the at least one relational algebra operator being in between two of the plurality of non-relational operators in the serialized ordering of the plurality of operators, and wherein performance of the plurality of operator executions in accordance with the query operator execution flow further includes:
generating fourth data blocks by performing a second non-relational operator of the two of the of the plurality of non-relational operators upon the third data blocks, wherein the query resultant is further generated based on generating the fourth data blocks.

19. A non-transitory computer readable storage medium comprises:
at least one memory section that stores operational instructions that, when executed by a processing module that includes a processor and a memory, causes the processing module to:
determine a query request that indicates a plurality of operators, wherein the plurality of operators includes at least one relational algebra operator and further includes at least one non-relational operator;
generate a query operator execution flow from the query request that indicates a serialized ordering of the plurality of operators to be performed upon a set of relational database rows of at least one relational database table of a relational database after the set of relational database rows is read from memory resources storing the relational database, wherein one relational algebra operator of the at least one relational algebra operator is serially after one non-relational operator of the at least one non-relational operator in the serialized ordering of the plurality of operators;
generate a query resultant of the query by facilitating execution of the query via a set of nodes of a database system that each perform a plurality of operator executions in accordance with the query operator execution flow, wherein performance of the plurality of operator executions in accordance with the query operator execution flow includes:
generating first data blocks based on processing the set of relational database rows read from the memory resources;
generating second data blocks by performing the one non-relational operator upon the first data blocks; and generating third data blocks by performing the one relational algebra operator upon the second data blocks, wherein the query resultant is generated based on generating the third data blocks;

wherein the at least one non-relational operator includes a plurality of non-relational operators, wherein the plurality of non-relational operator correspond to a plurality of different non-relational operator types, wherein the plurality of non-relational operators are not sequentially ordered in the serialized ordering of the plurality of operators based on the at least one relational algebra operator being in between two of the plurality of non-relational operators in the serialized ordering of the plurality of operators, and wherein performance of the plurality of operator executions in accordance with the query operator execution flow further includes:

generating fourth data blocks by performing a second non-relational operator of the two of the of the plurality of non-relational operators upon the third data blocks, wherein the query resultant is further generated based on generating the fourth data blocks.

\* \* \* \* \*